(12) United States Patent
Kang et al.

(10) Patent No.: US 9,319,657 B2
(45) Date of Patent: Apr. 19, 2016

(54) SELECTION OF PICTURES FOR DISPARITY VECTOR DERIVATION

(71) Applicant: QUALCOMM Incorporated, San Diego, CA (US)

(72) Inventors: Jewon Kang, San Diego, CA (US); Ying Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 14/031,791

(22) Filed: Sep. 19, 2013

(65) Prior Publication Data

US 2014/0078251 A1 Mar. 20, 2014

Related U.S. Application Data

(60) Provisional application No. 61/703,190, filed on Sep. 19, 2012, provisional application No. 61/709,839, filed on Oct. 4, 2012.

(51) Int. Cl.
*H04N 19/176* (2014.01)
*H04N 19/70* (2014.01)
*H04N 19/134* (2014.01)
*H04N 13/00* (2006.01)
*H04N 19/597* (2014.01)
(Continued)

(52) U.S. Cl.
CPC ......... *H04N 13/0048* (2013.01); *H04N 19/105* (2014.11); *H04N 19/134* (2014.11); *H04N 19/176* (2014.11); *H04N 19/52* (2014.11); *H04N 19/597* (2014.11); *H04N 19/70* (2014.11)

(58) Field of Classification Search
None
See application file for complete search history.

(56) References Cited

U.S. PATENT DOCUMENTS 8,139,150 B2 * 3/2012 Nakamura ........... H04N 19/597
348/409.1
8,982,183 B2 * 3/2015 Jeon .................... H04N 21/2365
348/43
(Continued)

FOREIGN PATENT DOCUMENTS

WO 2013016611 A1 1/2013
WO 2013030456 A1 3/2013

OTHER PUBLICATIONS

Shen et al., "Selective Disparity Estimation and Variable Size Motion Estimation Based on Motion Homogeneity for Multi-View Coding," IEEE Trans. Broadcasting, vol. 55, No. 4, Dec. 2009, pp. 761-766.*
(Continued)

*Primary Examiner* — Jay Au Patel
*Assistant Examiner* — Reza Aghevli
(74) *Attorney, Agent, or Firm* — Shumaker & Sieffert, P.A.

(57) ABSTRACT

When coding multiview video data, a video encoder and video decoder may select a candidate picture from one of one or more random access point view component (RAPVC) pictures and one or more pictures having a lowest temporal identification value. The video encoder and video decoder may determine whether a block in the selected candidate picture is inter-predicted with a disparity motion vector and determine a disparity vector for a current block of a current picture based on the disparity motion vector. The video encoder and video decoder may inter-prediction encode or decode, respectively, the current block based on the determined disparity vector.

33 Claims, 10 Drawing Sheets

(51) Int. Cl.
*H04N 19/105* (2014.01)
*H04N 19/52* (2014.01)

(56) References Cited

U.S. PATENT DOCUMENTS

| | | | | |
|---|---|---|---|---|
| 2008/0267287 | A1* | 10/2008 | Hannuksela | H04N 21/4384 375/240.12 |
| 2009/0116558 | A1 | 5/2009 | Chen et al. | |
| 2009/0168874 | A1* | 7/2009 | Su | H04N 19/00769 375/240.12 |
| 2009/0190662 | A1* | 7/2009 | Park | H04N 19/597 375/240.16 |
| 2009/0323824 | A1* | 12/2009 | Pandit | H04N 21/2365 375/240.26 |
| 2011/0012994 | A1* | 1/2011 | Park | H04N 21/234327 348/43 |
| 2011/0081133 | A1* | 4/2011 | Chen | G11B 27/005 386/356 |
| 2011/0216833 | A1 | 9/2011 | Chen et al. | |
| 2011/0293020 | A1* | 12/2011 | Lim | H04N 19/597 375/240.25 |
| 2012/0224634 | A1* | 9/2012 | Yamori | H04N 19/597 375/240.16 |
| 2012/0269270 | A1 | 10/2012 | Chen et al. | |
| 2013/0114705 | A1 | 5/2013 | Chen et al. | |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Tech, G., et al., "MV-HEVC Working Draft 1," Joint Collaborative Team on 3D Video Coding Extension Development of ITU-TSG 16 WP 3 and ISO/IEC JTC 1/SC 29/WG 11 1st Meeting: Stockholm, SE, Jul. 16-20, 2012, Document JCT3V-A1004_d0, 20 pp.

Tech, et al., "3D-HEVC Test Model 1," Joint Collaborative Team on 3D Video Coding Extension Development of ITU-TSG 16 WP3 and ISO/IEC JTC 1/SC 29/WG 11, 1st Meeting; Stockholm, SE, Jul. 16-20, 2012, Document JCT3V__A1005_d0, 83 pp.

International Search Report and Written Opinion from International Application No. PCT/US2013/060718, dated Jul. 28, 2014, 13 pps.

Kang J., et al., "3D-CE5.h related: Improvements for disparity vector derivation", 2. JCT-3V Meeting; 102, MPEG Meeting; Oct. 13, 2012-Oct. 19, 2012; Shanghai; (The Joint Collaborative Team on 3D Video Coding Extension Development of ISO/IEC JTC1/SC29NVG11 and ITU-T SG.16); URL: Http://Phenix.Int-Evry.Fr/JCT2/,, No. JCT3V-B0047, Oct. 10, 2012, 4 pages, XP030130228.

Tech G., et al., "3D-HEVC Test Model 1" 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16 ); URL: Http://Phenix.Int-Evry.Fr/JCT21 No. JCT3V-A1005 Sep. 20, 2012, 83 pages, XP030130183.

Zhang L, et al., "3D-CE5.h related: Disparity vector derivation for multiview video and 3DV", 100. MPEG Meeting, Apr. 30, 2012-Apr. 5, 2012, Geneva, (Motion Picture Expert Group or ISO/IEC JTC1/SC29/WG11),, No. m24937, May 1, 2012, 6 pages, XP030053280.

International Preliminary Report on Patentability from International Application No. PCT/US2013/060718, dated Aug. 20, 2015, 8 pps.

Second Written Opinion from International Application No. PCT/US2013/060718, dated Feb. 10, 2015, 6 pps.

Third Written Opinion from International Application No. PCT/US2013/060718, dated Apr. 30, 2015, 6 pps.

\* cited by examiner

SELECTION OF PICTURES FOR DISPARITY VECTOR DERIVATION

This application claims the benefit of:

U.S. Provisional Application 61/703,190 filed 19 Sep. 2012; and

U.S. Provisional application 61/709,839, filed 4 Oct. 2012, the entire content of each of which is incorporated by reference herein.

TECHNICAL FIELD

This disclosure relates to video coding and, more particularly, to techniques for coding multiview and three-dimensional (3D) video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently being finalized, and extensions of such standards. The video devices may transmit, receive, encode, decode, and/or store digital video information more efficiently by implementing such video compression techniques.

Video compression techniques perform spatial (intra picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to multiview video coding, and more particularly, this disclosure describes techniques in which a video coder (e.g., video encoder or video decoder) determines a disparity vector for a current block within a current picture of a current view. The video coder, in some examples, may determine the disparity vector for the current block based on a disparity motion vector of another block, including a block in one of one or more different pictures than the picture that includes the current block in the same view.

The techniques described in this disclosure may significantly reduce the number of pictures, that the video coder needs to access to determine the disparity vector for the current block to derive an accurate disparity vector. For example, there may be two pictures that the video coder needs to access to determine whether a block in these pictures is inter-predicted with a disparity motion vector. If such a disparity motion vector exists, the video coder may utilize the disparity motion vector to derive the disparity vector for the current block.

In one example, the disclosure describes a method for decoding a bitstream that includes multiview video data that includes multiple views. The method includes applying a neighboring block based disparity vector (NBDV) generation process for purposes of deriving a disparity vector for a current block of a current picture, wherein the NBDV generation process relies on motion vectors of neighboring blocks for deriving the disparity vector for the current block of the current picture. Also, applying the NBDV generation process comprises selecting a candidate picture to determine if a block in the candidate picture is inter-view predicted with a block in a view other than a view that includes the candidate picture of the multiview video data, wherein the candidate picture is from one of one or more random access point view component (RAPVC) pictures, and one or more pictures having a lowest temporal identification value, determining whether a video block in the selected candidate picture is inter-predicted with a disparity motion vector, wherein the disparity motion vector refers to the block in the view other than the view that includes the selected candidate picture of the multiview video data, and determining the disparity vector for the current block of the current picture, as part of the NBDV generation, based on the disparity motion vector if the video block in the selected candidate picture of the multiview video data is inter-predicted with the disparity motion vector. The method also includes inter-prediction decoding the current block based on the determined disparity vector.

In one example, the disclosure describes a method for encoding multiview video data that includes multiple views in bitstream. The method includes applying a neighboring block based disparity vector (NBDV) generation process for purposes of deriving a disparity vector for a current block of a current picture, wherein the NBDV generation process relies on motion vectors of neighboring blocks for deriving the disparity vector for the current block of the current picture relative to another view of the multiview video data. Also applying the NBDV generation process comprises selecting a candidate picture to determine if a block in the candidate picture is inter-view predicted with a block in a view other than a view that includes the candidate picture of the multiview video data, wherein the candidate picture is from one of one or more random access point view component (RAPVC)

pictures, and one or more pictures having a lowest temporal identification value, determining whether a video block in the selected candidate picture is inter-predicted with a disparity motion vector, wherein the disparity motion vector refers to the block in the view other than the view that includes the selected candidate picture of the multiview video data, and determining the disparity vector for the current block of the current picture, as part of the NBDV generation, based on the disparity motion vector if the video block in the selected candidate picture of the multiview video data is inter-predicted with the disparity motion vector. The method also includes inter-prediction encoding the current block based on the determined disparity vector.

In one example, the disclosure describes a device coding video data for multiview video. The device includes a video coder configured to apply a neighboring block based disparity vector (NBDV) generation process for purposes of deriving a disparity vector for a current block of a current picture, wherein the NBDV generation process relies on motion vectors of neighboring blocks for deriving the disparity vector for the current block of the current picture relative to another view of the multiview video data. To apply the NBDV generation process, the video coder is configured to select a candidate picture to determine if a block in the candidate picture is inter-view predicted with a block in a view other than a view that includes the candidate picture of the multiview video data, wherein the candidate picture is from one of one or more random access point view component (RAPVC) pictures, and one or more pictures having a lowest temporal identification value, determine whether a video block in the selected candidate picture is inter-predicted with a disparity motion vector, wherein the disparity motion vector refers to the block in the view other than the view that includes the selected candidate picture of the multiview video data, and determine the disparity vector for the current block of the current picture, as part of the NBDV generation, based on the disparity motion vector if the video block in the selected candidate picture of the multiview video data is inter-predicted with the disparity motion vector. The video coder is also configured to inter-prediction code the current block based on the determined disparity vector.

In one example, the disclosure describes a computer-readable storage medium having instructions stored thereon that when executed by one or more processors of a device for video coding for multiview video cause the one or more processors to apply a neighboring block based disparity vector (NBDV) generation process for purposes of deriving a disparity vector for a current block of a current picture, wherein the NBDV generation process relies on motion vectors of neighboring blocks for deriving the disparity vector for the current block of the current picture relative to another view of the multiview video data. The instructions that cause the one or more processors to apply the NBDV generation process comprise instructions that cause the one or more processors to select a candidate picture to determine if a block in the candidate picture is inter-view predicted with a block in a view other than a view that includes the candidate picture of the multiview video data, wherein the candidate picture is from one of one or more random access point view component (RAPVC) pictures, and one or more pictures having a lowest temporal identification value, determine whether a video block in the selected candidate picture is inter-predicted with a disparity motion vector, wherein the disparity motion vector refers to the block in the view other than the view that includes the selected candidate picture of the multiview video data, and determine the disparity vector for the current block of the current picture, as part of the NBDV generation, based on the disparity motion vector if the video block in the selected candidate picture of the multiview video data is inter-predicted with the disparity motion vector. The instructions also cause the one or more processors to inter-prediction code the current block based on the determined disparity vector.

In one example, the disclosure describes a device for coding video data for multiview video, the device comprising means for applying a neighboring block based disparity vector (NBDV) generation process for purposes of deriving a disparity vector for a current block of a current picture, wherein the NBDV generation process relies on motion vectors of neighboring blocks for deriving the disparity vector for the current block of the current picture. The means for applying the NBDV generation process comprises means for selecting a candidate picture to determine if a block in the candidate picture is inter-view predicted with a block in a view other than a view that includes the candidate picture of the multiview video data, wherein the candidate picture is from one of one or more random access point view component (RAPVC) pictures, and one or more pictures having a lowest temporal identification value, means for determining whether a video block in the selected candidate picture is inter-predicted with a disparity motion vector, wherein the disparity motion vector refers to the block in the view other than the view that includes the selected candidate picture of the multiview video data, and means for determining the disparity vector for the current block of the current picture, as part of the NBDV generation, based on the disparity motion vector if the video block in the selected candidate picture of the multiview video data is inter-predicted with the disparity motion vector. The device also includes means for inter-prediction coding the current block based on the determined disparity vector.

The details of one or more examples are set forth in the accompanying drawings and the description below. Other features, objects, and advantages will be apparent from the description and drawings, and from the claims.

DETAILED DESCRIPTION

Figure 1:
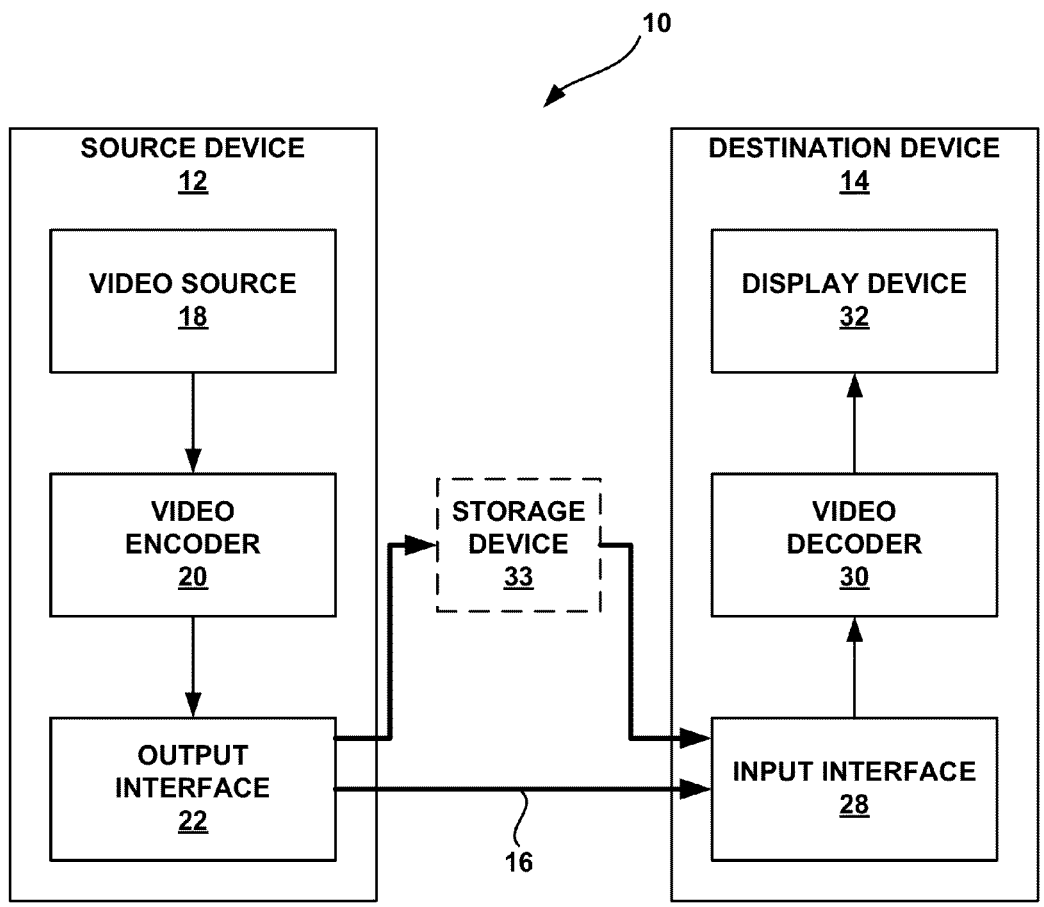
FIG. 1 is a block diagram illustrating an example video encoding and decoding system that may utilize the techniques described in this disclosure.

The techniques described in this disclosure are related to disparity vector derivation, and generally provide for a low-complexity disparity vector derivation scheme that may be utilized in various video coding standards such as the 3D-HEVC (High Efficiency Video Coding). The techniques should not be considered limited to the 3D-HEVC standard and may be applicable to other 3D or multiview video coding standards, or non-standards based video coding techniques for 3D or multiview video.

In multiview video, there are multiple views, and each view includes a plurality of pictures. One picture from a first view and one picture from a second view are displayed at the same time. These two pictures include similar video content, but the video blocks in the pictures are displaced (generally horizontally displaced) relative to one another. For example, the location of a video block in the picture in the first view may be different (generally along the x-axis) then a video block with similar video content in the picture in the second view. This displacement of the video blocks within the two views causes a viewer to perceive 3D video.

A disparity vector provides a measure of the displacement of a video block in a first view relative to the corresponding video block in the second view. For example, the disparity vector for the video block of the picture in the first view may identify the location of the video block of the picture in the second view.

In the techniques described in this disclosure, a video coder (e.g., video encoder or video decoder) may code (e.g., encode or decode) a bitstream that includes multiview video data that includes multiple views. For example, a video coder (e.g., video encoder or video decoder) may apply a neighboring block based disparity vector (NBDV) generation process for purposes of deriving a disparity vector for a current block of a current picture. The NBDV generation process relies on motion vectors of neighboring blocks for deriving the disparity vector for the current block of the current picture relative to another view of based on disparity motion vectors of neighboring blocks.

A disparity motion vector is a vector that identifies a predictive block for coding a current block. Thus, a disparity motion vector is similar to a conventional motion vector in the sense that it is used to identify a predictor block for coding the current video block. The disparity motion vector is different from a conventional motion vector, however, in that it identifies the predictor from a different view associated with the same instance of time. In other words, a motion vector conventionally points to a predictor block in different pictures that precede or follow the picture associated with the block being coded, whereas a disparity motion vector points to a predictor block of a different view associated with the same instance of time as the video associated with block being coded.

In multiview video coding, inter-view prediction is allowed among pictures associated with a same or substantially similar time instance, but are of different views (i.e., within the same access unit). For example, a current picture in a first view may depend upon one or more pictures in at least one of a set of reference views. The set of reference views refer to views other than the first view, which includes the current picture, and whose pictures may be used for inter-prediction of the current picture.

The video coder may include the picture that is in the other view in the reference picture list(s) of the current picture at any location similar to examples where inter-view prediction is not used. For example, a conventional motion vector refers to a block of a picture in the same view, and when the conventional motion vector is used to inter-predict a block, the inter-prediction of the block may be referred to as motion-compensated prediction (MCP). A disparity motion vector refers to a block of a picture in another view, and when the disparity motion vector is used to inter-predict a block, the inter-prediction of the block may be referred to as disparity-compensated prediction (DCP).

The disparity motion vector and the disparity vector should not be confused. The video coder uses the disparity motion vector to identify a video block whose pixel values are used to inter-predict another video block. The video coder need not necessarily use the pixel values of the block referred to by the disparity vector to inter-predict another video block; rather, the disparity vector provides a measure of the displacement of the video block in the other view. In other words, the video block to which the disparity motion vector refers need not be the same as the video block to which the disparity vector refers (although it may be possible that both refer to the same video block in some cases).

Examples of neighboring blocks, used for NBDV, include spatially neighboring blocks (i.e., blocks in the same picture as the block being coded) and temporally neighboring blocks (i.e., blocks in another picture as the block being coded). The temporally neighboring blocks may be "co-located" within a different picture relative to the current picture with the current video block, or may be blocks that spatially neighbor the co-located block within a different picture. The video coder may determine whether any of these neighboring blocks is inter-predicted with a disparity motion vector and utilize the disparity motion vector to determine the disparity vector of the current block. In some examples, in addition to determining whether any of the neighboring blocks is inter-predicted with a disparity motion vector, the video coder may also determine whether a disparity vector was derived for any of the neighboring blocks. In some examples, the video coder may utilize the derived disparity vector for a neighboring block to determine the disparity vector of the current block.

In general, the number of neighboring blocks that the video coder needs to access to determine whether any of the neighboring blocks is inter-predicted with a disparity motion vector may be relatively large. For instance, for temporally neighboring blocks, there may be X number of pictures each with N number of neighboring blocks, resulting in a worst-case-scenario of X*N evaluations that the video coder needs to make to determine whether any of the temporally neighboring blocks is inter-predicted with a disparity motion vector.

The techniques described in this disclosure may limit the number of pictures that the video coder needs to access to identify a disparity motion vector. Such pictures typically could include all temporal reference pictures (within the same view) of the current picture or all pictures of the same view in the decoded picture buffer (DPB). For example, the number of pictures that the video coder accesses and evaluates may be limited to two. In this disclosure, the pictures used to identify the neighboring temporal blocks for the purpose of checking the existence of disparity motion vectors are called candidate pictures. In one example, the video coder may identify up to two candidate pictures, a first candidate picture is the co-located picture used for temporal motion vector prediction (TMVP), which is identified by the syntax elements in the slice header of the current slice. In the same example, the video coder may be configured to determine the second of the two candidate pictures in accordance with the following techniques. The second candidate picture is chosen to be the one that is more likely to use inter-view prediction thus contain more disparity motion vectors. Since the co-located picture used for TMVP will already be accessed for TMVP, only one additional candidate picture needs to be accessed for disparity vector derivation.

The video coder may utilize TMVP as part of advanced motion vector prediction (AMVP) or merge/skip. In AMVP and merge/skip, the video decoder determines a motion vector for the current block based a motion vector of neighboring blocks. For example, the video encoder and the video decoder each construct a list of candidate motion vector predictors, where the motion vector predictors are motion vectors of neighboring blocks. In these examples, the video encoder signals an index into the list of candidate motion vector predictors, and the video decoder identifies the motion vector predictor from the signaled index. The video decoder then determines the motion vector for the current block based on the motion vector predictor. For instance, in merge mode, the video decoder adopts the motion information of the motion vector predictor as the motion information for the current block. In AMVP, the video encoder additionally signals a motion vector difference (MVD) between the current block and the motion vector predictor, information indicating a reference picture list, and a reference index. The video decoder determines the motion vector for the current block based on the MVD and the motion vector predictor (e.g., by adding the MVD to the motion vector predictor to determine the motion vector for the current block).

The list of candidate motion vector predictors that the video encoder and video decoder construct include motion vectors for spatially neighboring blocks and a temporally neighboring block. The motion vector for the temporally neighboring block is referred to as the temporal motion vector predictor (TMVP). Because the temporally neighboring block is located in a picture other than the current picture (e.g., a co-located picture), the video encoder may signal information that indicates in which co-located picture the temporally neighboring block is located. For instance, the video encoder may signal, in the slice header of the current slice, a flag that indicates whether the co-located picture is identified in a first reference picture list (RefPicList0) or a second reference picture list (RefPicList1). The video encoder also signals an index, in the slice header of the current slice, which indicates where the co-located picture is identified in the reference picture list identified by the flag (e.g., RefPicList0 or RefPicList1). Based on flag identifying a reference picture list and the index value into the identified reference picture list, the video decoder may determine the co-located picture that includes the temporally neighboring block whose motion vector forms the TMVP that the video decoder includes the list of candidate motion vector predictors for AMVP and merge/skip mode.

Because the video encoder and video decoder may already identify the co-located picture for purposes of determining the TMVP, the techniques described in this disclosure leverage that already determined co-located picture as a picture that is to be accessed for purposes of deriving the disparity vector for a block. For example, one of the two candidate pictures that is accessed for deriving the disparity vector for a current block may be the co-located picture determined for identifying the TMVP. Because the video encoder and the video decoder may already access the co-located picture for the TMPV, when coding the current block, the video encoder and the video decoder may not need to access this picture again for purpose of determining whether the temporally neighboring block is inter-predicted with a disparity motion vector for deriving the disparity vector of the current block.

The techniques described in this disclosure may be directed to determining the other candidate picture that is to be accessed for purposes of deriving the disparity vector for the current block. For example, there may be up to two candidate pictures that need to be accessed for deriving the disparity vector for the current block. The first candidate picture may be the co-located picture that is already accessed for the TMVP, and the techniques describe the manner in which the video encoder and the video decoder determine the second candidate picture.

The video coder may be configured to construct a reference picture set (RPS). The RPS identifies pictures that can be used to inter-predict the current picture that includes the current video block and that can be used to inter-predict pictures that follow the current picture in output or display order. The output or display order of a picture is defined by a picture order count (POC) value, where a picture with a smaller POC value is outputted or displayed earlier than a picture with a larger POC value. All pictures in a group of pictures may be identified by unique POC values.

In one example, a candidate picture (e.g., the second candidate picture of the two candidate pictures) may be identified from the RPS. In another example, a candidate picture may be identified from the reference picture lists of the current picture. In yet another example, a candidate picture may be identified in the decoded picture buffer (DPB) of the video coder. The detailed descriptions below may assume the candidate picture is only from the RPS, only from the reference picture lists, or only from the DPB, but the same method can be generalized to identify the picture in reference picture lists, RPS or DPB.

In the techniques described in this disclosure, the video coder may determine whether any picture in the reference picture list(s) for the current picture, or more generally in an RPS or DPB of the video coder, is a random access point view component (RAPVC) picture (which is also used to refer to a random access picture). A RAPVC picture is a picture from which video coding can begin (e.g., without any previous data). In HEVC and its extensions a RAPVC picture is identified with one of the NAL unit types assigned to pictures called IRAP pictures (i.e., a NAL unit type equal to BLA_W_LP, BLA_W_RADL, BLA_N_LP, IDR_W_RADL, IDR_N_LP, RSV_IRAP_VCL22, RSV_IRAP_VCL23, or CRA_NUT). For example, no picture that follows the RAPVC picture in coding order (which may be different than display or output order) is inter-predicted with any picture that precedes the RAPVC picture in coding order. In this way, if video coding were to begin on a RAPVC picture, the video coder can code pictures following the RAPVC picture in coding order even if pictures that precede the RAPVC picture in coding order are not available.

If the video coder identifies the RAPVC picture, the video coder may be configured to set the RAPVC picture as a candidate picture that is accessed and evaluated for identifying a disparity motion vector. If there are multiple RAPVC pictures, the video coder may select one of the RAPVC pictures that is closest in terms of display or output order distance relative to the current picture.

If two of the RAPVC pictures have the same temporal distance relative to the current picture based on display or output order, the video coder may select one of these two RAPVC pictures, as a candidate picture, based on the location of the co-located picture, used in TMVP. For example, when two RAPVC pictures are equally close to the current picture, the video coder may set the picture that is opposite in direction than the co-located picture (i.e., opposite in direction than the first candidate picture). Alternatively, the video coder may set the picture that is in the same direction as the co-located picture (i.e., same direction as the first candidate picture).

For instance, if the co-located picture used in TMVP precedes the current picture in display or output order, then the video coder may set the RAPVC picture that follows the current picture in display or output order as the picture that is accessed and evaluated for identifying a disparity motion vector, or that precedes the current picture, as an alternate example. If the co-located picture used in TMVP follows the current picture in display or output order, then the video coder may set the RAPVC picture with the lowest temporal identification value that precedes the current picture in display or output order as the picture that is evaluated for identifying a disparity motion vector, or that follows the current picture, as an alternate example.

If, however, the video coder does not identify a RAPVC picture (e.g., the reference picture list does not include the RAPVC picture, RPS does not include the RAPVC picture, or no RAPVC picture in the DPB), the video coder may be configured to identify one picture with the lowest temporal identification value (temporalId). The temporal identification value indicates the level of temporal sub-layer the current picture belongs to. A sub-bitstream is decodable when pictures with a larger temporalId are extracted out. For example, only pictures with temporal identification values less than or equal to the temporal identification value of the current picture can be used to inter-predict the current picture. Picture with temporal identification values greater than the temporal identification value of the current picture cannot be used to inter-predict the current picture.

In accordance with the techniques described in this disclosure, if the video coder does not identify a RAPVC picture, the video coder may determine which reference pictures in the reference picture list include the lowest temporal identification values. If there is only one picture with the lowest temporal identification value, the video coder may be configured to set this picture as the second candidate picture that is accessed and evaluated for identifying a disparity motion vector.

However, if there are a plurality of reference pictures in the reference picture list that include the lowest temporal identification value, then the video coder may determine which one of these pictures is closest to the current picture in display or output order (i.e., shortest display or output order distance relative to the current picture). The video coder may be configured to set the picture that is closed to the current picture in display or output order as the second candidate picture that is accessed and evaluated for identifying a disparity motion vector.

In some examples, two pictures with the same lowest temporal identification value may be equally close to the current picture and the closest pictures among the rest of the pictures. When two pictures with the lowest temporal identification value are equally close to the current picture, the video coder may set the picture that is opposite in direction than the co-located picture used for TMVP. For example, if the co-located used for TMVP precedes the current picture in display or output order, then the video coder may set the picture with the lowest temporal identification value that follows the current picture in display or output order as the picture to be accessed and evaluated for identifying a disparity motion vector. If the co-located picture used for TMVP follows the current picture in display or output order, then the video coder may set the picture with the lowest temporal identification value that precedes the current picture in display or output order as the picture to be accessed and evaluated for identifying a disparity motion vector. As an alternative example, the video coder may set the picture in the same direction as the co-located picture used for TMVP when two pictures with the lowest temporal identification value as equally close to the current picture.

In this way, the number of candidate pictures that the video coder needs to access may be drastically reduced from the video coder evaluating all possible pictures. Usually, such reduction in the number of candidate pictures to access may potentially have an impact on coding quality; however, disparity vector with similar or higher level of accuracy can be derived due to the fact that the second candidate picture may have more chance to contain disparity motion vectors.

In some current cases, for deriving the disparity vector of the current block, the video coder may determine whether a spatially neighboring block is inter-predicted with a disparity motion vector, and whether a temporally neighboring block, in one of the two candidate pictures, is inter-predicted with a disparity motion vector. In some examples, during the coding of the neighboring blocks, the video coder may have derived a disparity vector for one or more of the neighboring blocks. These derived disparity vectors for the neighboring blocks may be referred to as implicit disparity vectors (IDVs). In some examples, the video coder may potentially use an IDV of a spatial or neighboring block to derive the disparity vector of the current block (i.e., use the disparity vector that was derived for a neighboring block to derive the disparity vector for the current block).

In some cases, it may be possible for there to be an IDV for each of the spatially and temporally neighboring blocks. For instance, there may be an IDV for one or more of the blocks that spatially neighbor the current block. There may also be an IDV for one or more blocks in the candidate pictures that temporally neighbor the current block.

The video coder may store the IDVs for each picture in the DPB so that the IDVs for the temporally neighboring blocks are available for deriving the disparity vector of the current block. However, accessing the IDVs for blocks located in pictures other than the current picture (e.g., IDVs for temporally neighboring blocks) may increase complexity due to the compression utilized in storing the motion information for blocks in picture other than the current picture. The techniques described in this disclosure may remove the IDVs for any picture that is not the current picture.

Therefore the DPB size can be reduced due to the fact that the storage required to store the IDVs are never needed anymore for any of the reference pictures in the DPB. For instance, the IDVs for the temporally neighboring blocks in the candidate pictures may not be available when the video coder is coding the current picture. In this manner, when applying the NBDV generation process, the video coder may determine the disparity vector for the current block without considering any of the IDVs for blocks that are not in the current picture.

FIG. 1 is a block diagram illustrating an example video encoding and decoding system in accordance with one or more examples described in this disclosure. For example, system 10 includes source device 12 and destination device 14. Source device 12 and destination device 14 are configured to implement multiview video coding in which source device 12 and destination device 14 each code pictures of different views. When the pictures of the different views are viewed together, the viewer perceives an image that encompasses a 3D volume, instead of an image that is constrained to the 2D area of the display.

System 10 may operate in accordance with different video coding standards, a proprietary standard, or any other way of multiview coding. For example, video encoder 20 and video decoder 30 may operate according to a video compression standard, such as the include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The recent, publicly available joint draft of the MVC extension is described in "Advanced video coding for generic audiovisual services," ITU-T Recommendation H.264, March 2010. A more recent, publicly available joint draft of the MVC extension is described in "Advanced video coding for generic audiovisual services," ITU-T Recommendation H.264, June 2011. A current joint draft of the MVC extension has been approved as of January 2012.

In addition, there is a new video coding standard, namely High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, referred to as HEVC WD8 is available, as of Sep. 18, 2013, from http://phenix.int-evey.fr/jct/doc_end_user/documents/10_Stockholm/wg11/JCTVC-J1003-v8.zip. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Sep. 18, 2013, is downloadable from http://phenix.int-evey.fr/jct/doc_end_user/documents/12Geneva/wg11/JCTVC-L1003-v34.zip. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which as of Sep. 18, 2013, is available from http://phenix.int-evry.fr/jct/doc_end_user/documents/13_Incheon/wg11/JCTVC-M0432-v3.zip.

For purposes of description, video encoder 20 and video decoder 30 are described in context of the HEVC or the H.264 standard and the extensions of such standards. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein.

The techniques of this disclosure are potentially applicable to several multiview coding and/or 3D video coding standards, including the HEVC-based 3D-Video coding (3D-HEVC). The latest reference software description, as well as the working draft of 3D-HEVC is available as follows: Gerhard Tech, Krzysztof Wegner, Ying Chen, Sehoon Yea, "3D-HEVC Test Model Description draft 1," JCT3V-A1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012. The latest reference software, namely HTM, which as of Sep. 18, 2013, is available from https://hevc.hhi.fraunhofer.de/svn/svn_3DVCSoftware/trunk.

The techniques of this disclosure may also be applicable to the H.264/3D-AVC and H.264/MVC+D video coding standards, or extensions thereof, as well as other coding standards. The techniques of this disclosure may at times be described with reference to or using terminology of a particular multiview coding or 3D video coding standard; however, such description should not be interpreted to mean that the described techniques are limited only to that particular standard.

As shown in FIG. 1, system 10 includes a source device 12 that generates encoded video data to be decoded at a later time by a destination device 14. Source device 12 and destination device 14 comprise any of a wide range of devices, including a wireless handset such as so-called "smart" phones, so-called "smart" pads, or other such wireless devices equipped for wireless communication. Additional examples of source device 12 and destination device 14 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, or the like.

Destination device 14 may receive the encoded video data to be decoded via a link 16. Link 16 comprises any type of medium or device capable of moving the encoded video data from source device 12 to destination device 14. In one example, link 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data is output from output interface 22 to a storage device 33. Similarly, encoded data is accessed from storage device 33 by input interface 28. Examples of storage device 33 include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 corresponds to a file server or another intermediate storage device that holds the encoded video generated by source device 12. In these examples, destination device 14 accesses stored video data from storage device 33 via streaming or download. The file server is any type of server capable of storing encoded video data and transmitting that encoded video data to the destination device 14. Example file servers include a web server (e.g., for a website), an FTP server, network attached storage (NAS) devices, or a local disk drive. Destination device 14 accesses the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions (e.g., via the Internet), encoding of digital video for storage on a data storage medium, decoding of digital video stored on a data storage medium, or other applications. In some examples, system 10 is configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 includes a modulator/demodulator (modem) and/or a transmitter. In source device 12, video source 18 includes one or more of a source such as a video capture device (e.g., a video camera), a video archive containing previously captured video, a video feed interface to receive video from a video content provider, and/or a computer graphics system for generating computer graphics data as the source video, a combination of such sources, or any other source. As one example, if video source 24 is a video camera, source device 12 and destination device 14 may form so-called camera phones or video phones. However, the techniques described in this disclosure are applicable to video coding in general, and may be applied to wireless and/or wired applications.

Video encoder 20 encodes the captured, pre-captured, or computer-generated video. Output interface 22 of source device 12 is configured to transmit the encoded video data to destination device 14. The encoded video data may also (or alternatively) be stored onto storage device 33 for later access by destination device 14 or other devices, for decoding and/or playback.

Destination device 14 includes an input interface 28, a video decoder 30, and a display device 32. In some cases, input interface 28 includes a receiver and/or a modem. Input interface 28 of destination device 14 receives the encoded video data over link 16 or from storage device 33. The encoded video data communicated over link 16, or provided on storage device 33, includes a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 includes an integrated display device and also configured to interface with an external display device. In other examples, destination device 14 is a display device. In general, display device 32 displays the decoded video data to a user, and comprises any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, integrated circuit (IC), software, hardware, firmware or any combinations thereof. In some examples, video encoder 20 and video decoder 30 may be part of a wireless handset device. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Video encoder 20 is configured to encode video data and video decoder 30 is configured to decode video data in accordance with techniques described in this disclosure.

Although not shown in FIG. 1, in some aspects, video encoder 20 and video decoder 30 are each integrated with an audio encoder and decoder, and include appropriate MUX-DEMUX units, or other hardware and software, to handle encoding of both audio and video in a common data stream or separate data streams. If applicable, in some examples, MUX-DEMUX units conform to the ITU H.223 multiplexer protocol, or other protocols such as the user datagram protocol (UDP).

Figure 2:
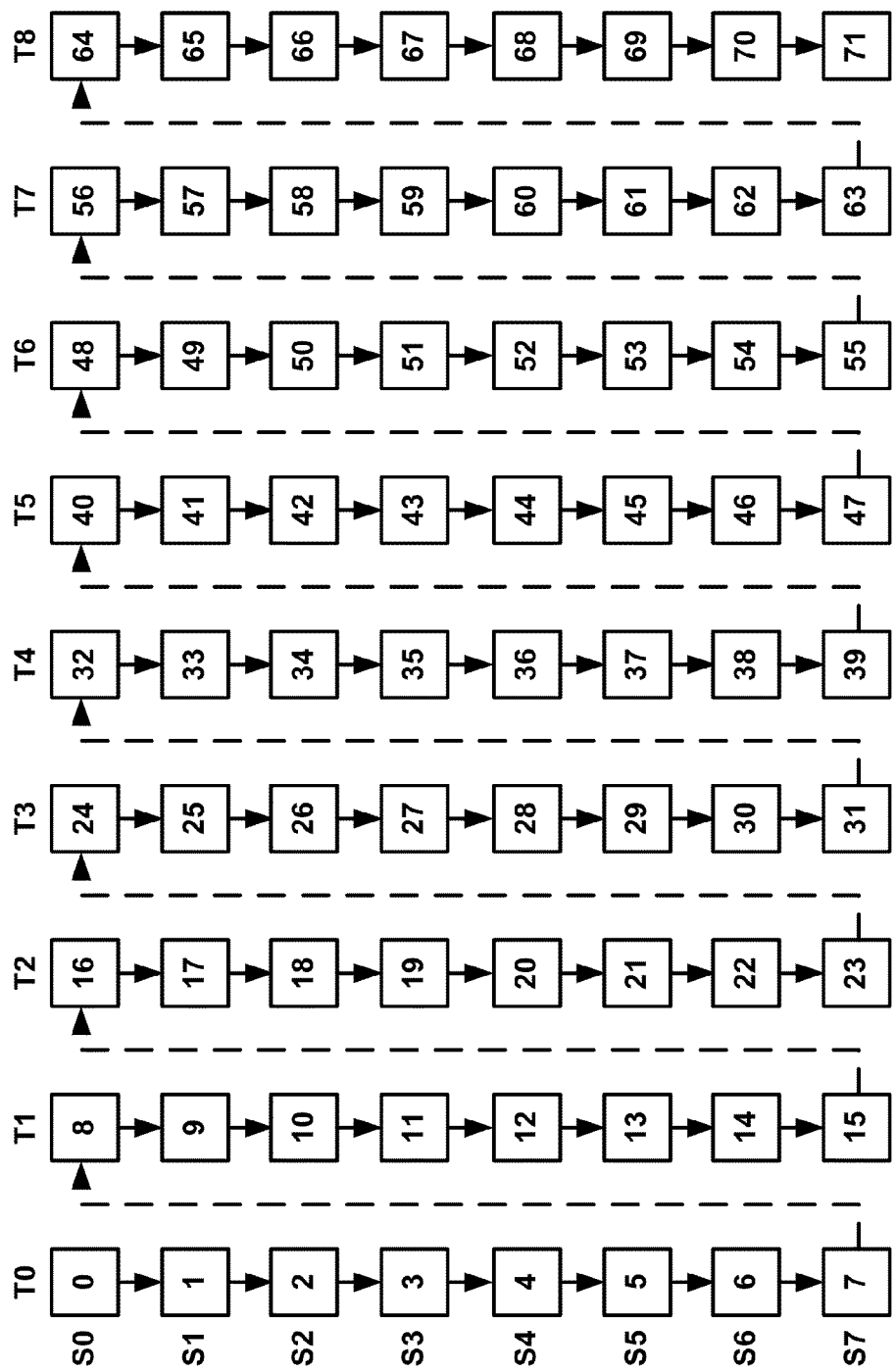
FIG. 2 is a graphical diagram illustrating an example encoding or decoding order, in accordance with one or more examples described in this disclosure.

FIG. 2 is a graphical diagram illustrating an example encoding or decoding order, in accordance with one or more examples described in this disclosure. For example, the decoding order arrangement illustrated in FIG. 2 is referred to as time-first coding. In FIG. 2, S0-S7 each refers to different views of the multiview video. T0-T8 each represents one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e. pictures 8-15), and so forth. In this examples, pictures 0-7 at a same time instance (i.e., time instance T0), and pictures 8-15 are at a same time instance (i.e., time instance T1).

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view can be considered as corresponding to the depth view component within the set of the pictures of the view, and vice-versa (i.e., the depth view component corresponds to its texture view component in the set, and vice-versa). As used in this disclosure, a texture view component and a depth view component that correspond may be considered to be part of a same view of a single access unit. The views including both a texture view component and a depth view component is not required in every example. In some examples, the views may include only the texture view component and no depth view component.

The texture view component includes the actual image content that is displayed. For example, the texture view component may include luma (Y) and chroma (Cb and Cr) components. The depth view component may indicate relative depths of the pixels in its corresponding texture view component. As one example, the depth view component may be similar to a gray scale image that includes only luma values. In other words, the depth view component may not convey any image content, but rather provide a measure of the relative depths of the pixels in the texture view component.

For example, a pixel value corresponding to a purely white pixel in the depth view component may indicate that its corresponding pixel or pixels in the corresponding texture view component is closer from the perspective of the viewer, and a pixel value corresponding to a purely black pixel in the depth view component may indicate that its corresponding pixel or pixels in the corresponding texture view component is further away from the perspective of the viewer. The pixel values corresponding to the various shades of gray in between black and white indicate different depth levels. For instance, a very gray pixel in the depth view component indicates that its corresponding pixel in the texture view component is further away than a slightly gray pixel in the depth view component. Because only one pixel value, similar to gray scale, is needed to identify the depth of pixels, the depth view component may include only one pixel value. Thus, values analogous to chroma components are not needed.

The depth view component using only luma values (e.g., intensity values) to identify depth is provided for illustration purposes and should not be considered limiting. In other examples, any technique may be utilized to indicate relative depths of the pixels in the texture view component.

In accordance with multiview video coding, the texture view components are inter-predicted from texture view components in the same view or from texture view components in one or more different views. The texture view components may be coded in blocks of video data, which are referred to as "video blocks" and commonly called "macroblocks" in the H.264 context. Other video coding standards, such as the HEVC standard, may refer to video blocks as treeblocks or coding units (CUs).

The pictures of any similar time instance may include similar content. However, the video content of different pictures in a similar time instance may be slightly displaced in the horizontal direction relative to one another. For example, if a block is located at (x, y) in picture 0 of view S0, a block located at (x+x', y) in picture 1 of view S1 includes similar video content as the block located at (x, y) in picture 0 of view S0. In this example, the block located at (x, y) in picture 0 of view S0 and the block located at (x+x', y) in picture 1 of view S1 are considered as corresponding blocks. In some examples, a disparity vector for the block located at (x+x', y) in picture 1 of view S1 refers to the location of its corresponding block. For example, the disparity vector for the block located at (x+x', y) is (−x', 0).

In some examples, video encoder 20 or video decoder 30 may utilize the disparity vector of a block in a picture of a first view to identify the corresponding block in a picture of a second view. Video encoder 20 and video decoder 20 may, for example, utilize the disparity vector when performing inter-view motion prediction or inter-view residual prediction. Video encoder 20 and video decoder 30 may, for example, perform inter-view motion prediction by using information of a reference block of a reference picture in a reference view determined by the disparity vector of the current block.

Figure 3:
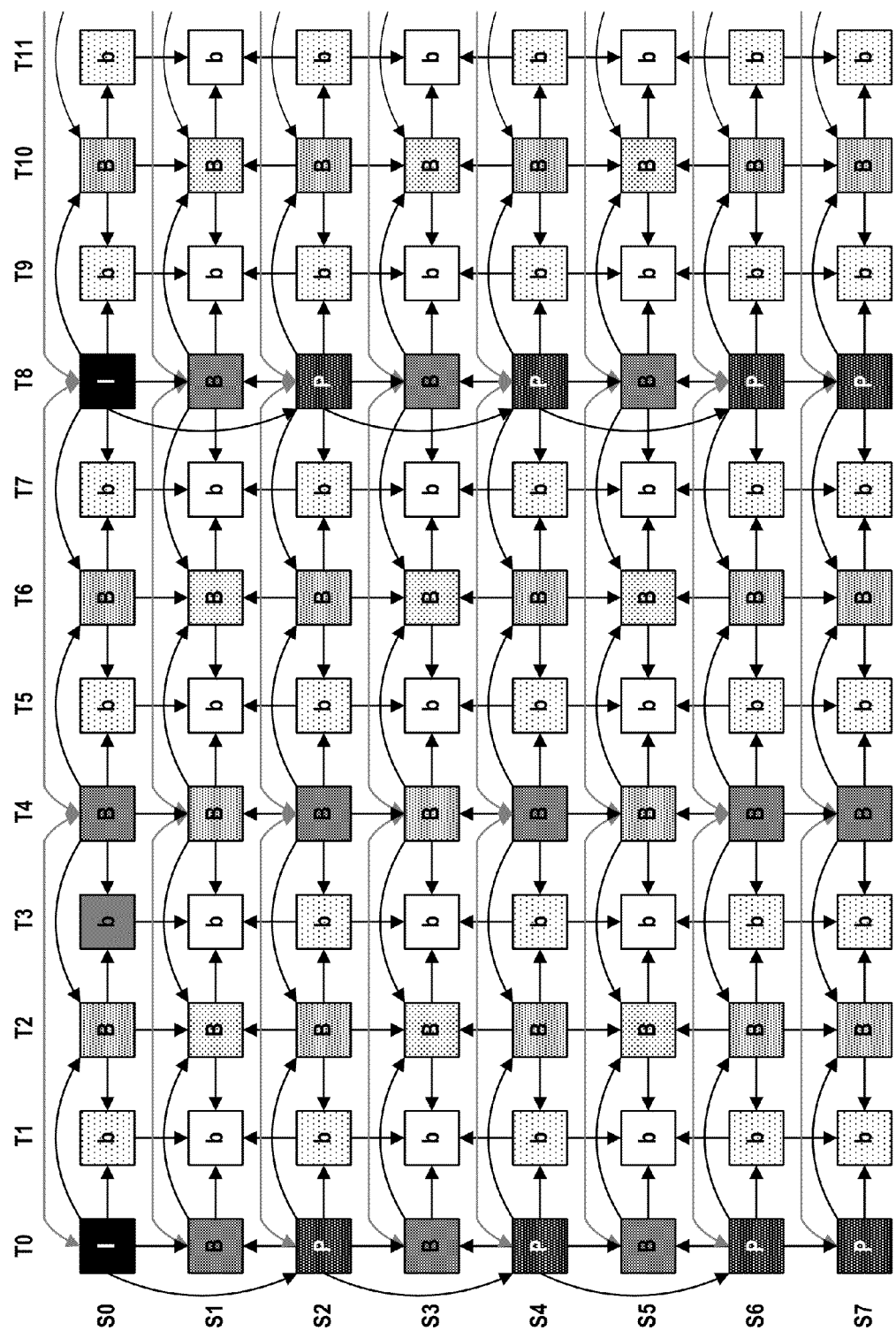
FIG. 3 is a conceptual diagram illustrating an example prediction pattern.

FIG. 3 is a conceptual diagram illustrating an example prediction pattern. In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location. In the example of FIG. 3, capital "B" and lowercase "b" are used to indicate different hierarchical relationships between pictures, rather than different coding methodologies. In general, capital "B" pictures are relatively higher in the prediction hierarchy than lowercase "b" frames.

In FIG. 3, view S0 may be considered as a base view, and views S1-S7 may be considered as dependent views. A base view includes pictures that are not inter-view predicted. Picture in a base view can be inter-predicted with respect to other pictures in the same view. For instance, none of the pictures in view S0 can be inter-predicted with respect to a picture in any of views S1-S7, but some of the pictures in view S0 can be inter-predicted with respect to other pictures in view S0.

A dependent view includes pictures that are inter-view predicted. For example, each one of views S1-S7 includes at least one picture that is inter-predicted with respect to a picture in another view. Pictures in a dependent view may be inter-predicted with respect to pictures in the base view, or may be inter-predicted with respect to pictures in other dependent views.

A video stream that includes both a base view and one or more dependent views may be decodable by different types of video decoders. For example, one basic type of video decoder may be configured to decode only the base view. In addition, another type of video decoder may be configured to decode each of views S0-S7. A decoder that is configured to decode both the base view and the dependent views may be referred to as a decoder that supports multiview coding.

Pictures in FIG. 3 are indicated at the intersection of each row and each column in FIG. 3. The H.264/AVC standard with multiview coding extensions may use the term frame to represent a portion of the video, while HEVC standard may use the term picture to represent a portion of the video. This disclosure uses the term picture and frame interchangeably.

The pictures in FIG. 3 are illustrated using a shaded block including a letter, designating whether the corresponding picture is intra-coded (that is, an I-picture), inter-coded in one direction (that is, as a P-picture), or inter-coded in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video coding, pictures of a multiview video coding video sequence may be predictively encoded with respect to pictures at different temporal locations. For example, the B-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component (e.g., a texture view component) can use the view components in other views for reference. In multiview coding, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the B-picture of view S1 at temporal location T1 is predicted from each of the B-pictures of view S1 at temporal locations T0 and T2, as well as the B-pictures of views S0 and S2 at temporal location T1.

FIG. 3 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 3 are illustrated with full shading, while P-pictures have somewhat lighter shading, and B-pictures (and lowercase b-pictures) have various levels of shading relative to each other, but always lighter than the shading of the P-pictures and the I-pictures.

In general, the prediction hierarchy may be related to view order indexes, in that pictures relatively higher in the prediction hierarchy should be decoded before decoding pictures that are relatively lower in the hierarchy. Those pictures relatively higher in the hierarchy can be used as reference pictures during decoding of the pictures relatively lower in the hierarchy. A view order index is an index that indicates the decoding order of view components in an access unit. The view order indices are implied in the sequence parameter set (SPS) MVC extension, as specified in Annex H of H.264/AVC (the MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, pictures used as reference pictures are decoded before pictures that depend on the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain pictures at equal levels of the hierarchy, the decoding order may not matter relative to each other. For example, the I-picture of view S0 at temporal location T0 may be used as a reference picture for the P-picture of view S2 at temporal location T0, which, in turn, may be used as a reference picture for the P-picture of view S4 at temporal location T0. Accordingly, the I-picture of view S0 at temporal location T0 should be decoded before the P-picture of view S2 at temporal location T0, which in turn, should be decoded before the P-picture of view S4 at temporal location T0. However, between views S1 and S3, a decoding order does not matter, because views S1 and S3 do not rely on each other for prediction. Instead views S1 and S3 are predicted only from other views that are higher in the prediction hierarchy. Moreover, view S1 may be decoded before view S4, so long as view S1 is decoded after views S0 and S2.

In this manner, a hierarchical ordering may be used to describe views S0 through S7. In this disclosure, the notation "SA>SB" means that view SA should be decoded before view SB. Using this notation, S0>S2>S4>S6>S7, in the example of FIG. 2. Also, with respect to the example of FIG. 2, S0>S1, S2>S1, S2>S3, S4>S3, S4>S5, and S6>S5. Any decoding order for the views that does not violate this hierarchical ordering is possible. Accordingly, many different decoding orders are possible, with limitations based on the hierarchical ordering.

In some examples, FIG. 3 may be viewed as illustrating the texture view components. In these examples, to implement inter-view prediction (e.g. inter-view motion prediction or inter-view residual prediction), video encoder 20 or video decoder 30 may in some cases locate a corresponding block using a disparity vector and utilize the motion vector of the corresponding block as a motion vector predictor for the current block that is to be inter-predicted. The techniques described in this disclosure determine the disparity vector of the current block without necessarily needing to derive the depth view component, and without necessarily relying on a global disparity vector.

A video sequence typically includes a series of video pictures from a view (e.g., views illustrated in FIGS. 2 and 3). A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264/MVC standard or largest coding units (LCUs), coding units (CUs), prediction units (PUs), or transform units (TUs), as defined in the HEVC standard. The video blocks may have fixed or varying sizes, and may differ in size according to a specified coding standard. Each video picture may include a plurality of slices. Each slice may include a plurality of blocks.

As an example, the ITU-T H.264 standard supports intra prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view, or refers to a reference picture in another view. The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to (e.g., ITU-T H.264/AVC). For example, whereas H.264 provides nine intra-prediction encoding modes, the HM may provide as many as thirty-three directional/angular intra-prediction encoding modes plus DC and Planar modes.

The working model of the HM describes that a video picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node (i.e., a coded video block). Syntax data associated with a coded bitstream may define a maximum number of times a treeblock may be split, and may also define a minimum size of the coding nodes. Treeblocks are referred to as LCUs in some examples.

A CU includes a coding node and prediction units (PUs) and transform units (TUs) associated with the coding node. A size of the CU corresponds to a size of the coding node and may square in shape. In some examples, the size of the CU ranges from 8×8 pixels up to the size of the treeblock with a maximum of 64×64 pixels or greater. In some examples, each CU contains one or more PUs and one or more TUs. Syntax data associated with a CU describe, for example, partitioning of the CU into one or more PUs. Partitioning modes differ between whether the CU is skip or direct mode encoded, intra-prediction mode encoded, or inter-prediction mode encoded. PUs can be partitioned to be non-square in shape, in some examples. Syntax data associated with a CU also describes, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this is not always the case. The TUs are typically the same size or smaller than the PUs. In some examples, residual samples corresponding to a CU are subdivided into smaller units using a quadtree structure known as "residual quad tree" (RQT). The leaf nodes of the RQT can be referred to as transform units (TUs). Pixel difference values associated with the TUs are transformed to produce transform coefficients, which are quantized, in some examples.

A PU includes data related to the prediction process. For example, when the PU is intra-mode encoded, the PU includes data describing an intra-prediction mode for the PU. As another example, when the PU is inter-mode encoded, the PU includes data defining a motion vector for the PU. The data defining the motion vector for a PU describes, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

A TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

As an example, the HM supports prediction in various PU sizes. Assuming that the size of a particular CU is 2N×2N, the HM supports intra prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In either the H.264 standard or the HEVC standard, following intra-predictive or inter-predictive coding, video encoder 20 calculates residual data for the TUs of the CU, in HEVC or for macroblock in H.264. The PUs comprise pixel data in the spatial domain (also referred to as the pixel domain) and the TUs comprise coefficients in the transform domain following application of a transform (e.g., a discrete cosine transform (DCT)), an integer transform, a wavelet transform, or a conceptually similar transform to residual video data. The residual data may correspond to pixel differences between pixels of the unencoded picture and prediction values corresponding to the PUs in HEVC or prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 26 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, in 3D-HEVC, video encoder 20 and video decoder 30 may inter-predict a current block within a current picture of a first view with reference to a reference block within a reference picture of a second view. Such inter-prediction is referred to as inter-view prediction. The time instance of the current picture and the reference picture may be the same in respective views. In this example, video encoder 20 or video decoder 30 perform inter-view prediction across pictures in a same access unit, where pictures in the same access unit are at the same time instance.

To perform inter-view prediction on the current block, video encoder 20 or video decoder 30 construct reference picture lists that identify reference pictures that can be used for inter-prediction, including pictures that can be used for inter-view prediction. Inter-prediction (or inter-prediction encoding or decoding) refers to predicting a current block in a current picture with respect to a reference block in a reference picture. Inter-view prediction is a subset of inter-prediction in that in inter-view prediction, the reference picture is in a view different than the view of the current picture. Accordingly, for inter-view prediction, video encoder 20 and video decoder 30 add the reference picture in the other view in one or both of the constructed reference picture lists. The reference picture in the other view can be identified at any location within the constructed reference picture lists. As used in this disclosure, when video encoder 20 is performing inter-prediction (e.g., inter-predicting) on a block, video encoder 20 may be considered as inter-prediction encoding a block. When video decoder 30 is performing inter-prediction (e.g., inter-predicting) on a block, video decoder 30 may be considered as inter-prediction decoding a block.

In inter-prediction, a motion vector for the current block identifies a location of the block that is to be used as the reference block for inter-predicting the current block, and a reference index into one or both of the constructed reference picture lists identifies the reference picture that includes the block that is be used as the reference block for inter-predicting the current block. In multiview coding, there are at least two types of motion vectors. A temporal motion vector refers to a temporal reference picture, where a temporal reference picture is a picture within the same view as the picture that includes the block to be predicted, and where the temporal reference picture is displayed earlier or later than the picture that includes the block to be predicted. A disparity motion vector refers to a reference picture in a view other than the view in which the picture that includes the block to be predicted. When video encoder 20 or video decoder 30 utilizes temporal motion vectors, video encoder 20 and video decoder 30 are considered as implementing motion-compensated prediction (MCP). When video encoder 20 or video decoder 30 utilizes disparity motion vectors, video encoder 20 and video decoder 30 are considered as implementing disparity-compensated prediction (DCP), or inter-view prediction.

This disclosure describes techniques for applying a neighboring block based disparity vector (NBDV) generation process for purposes of deriving a disparity vector for a current block of a current picture. For example, the NBDV generation process relies on motion vectors of neighboring blocks (e.g., spatially and temporally neighboring blocks) for deriving the disparity vector for the current block of the current picture. The disparity vector for the current block of the current picture may be relative to another view of multiview video data.

For example, in applying the NBDV generation process, video encoder 20 and video decoder 30 may determine a disparity vector for a current block based on motion information (e.g. a disparity motion vector) of spatial and/or temporal neighboring blocks, and in some cases based on a derived disparity vector for neighboring blocks. In other words, a disparity vector for a current block may be determined by analyzing the motion vectors of one or more spatial and/or temporal neighboring blocks that are coded with DCP, and in some examples, from a derived disparity vector of the neighboring blocks. The techniques of this disclosure may be implemented by one or both of video encoder 20 and video decoder 30. These techniques may, for example, be used in conjunction with HEVC-based multiview video coding and/or HEVC-based 3D video coding.

Again, for DCP, there is a disparity motion vector that refers to a block in another view. For example, a temporal neighboring block may be located in a picture other than the current picture. A disparity motion vector for the temporal neighboring block may refer to a block in a view other than a view that includes the picture that includes the temporal neighboring block. In other words, the disparity motion vector refers to an inter-view reference picture that belongs to one of the set of reference views.

As described above, the disparity motion vector and the disparity vector should not be confused. Video encoder 20 and video decoder 30 use the disparity motion vector to identify a video block of a picture in a different view than the view that includes picture with the block to be predicted, and uses the pixel values of the identified video block to inter-predict the block. Video encoder 20 and video decoder 30 need not necessarily use the pixel values of the block referred to by the disparity vector to inter-predict another video block; rather, the disparity vector provides a measure of the displacement of the video block in the other view Examples of the neighboring blocks includes spatially neighboring blocks (e.g., blocks that neighbor the current video block that are in the same picture as the current video block) or temporally neighboring blocks (e.g., blocks that neighbor or are co-located with the current block but are in the different picture than the current video block). The picture that includes the temporally neighboring block is referred to as a co-located picture. If any of these spatially neighboring blocks or temporally neighboring blocks is inter-predicted with a disparity motion vector, video encoder 20 and video decoder 30 may set the disparity motion vector of one of the neighboring blocks as the disparity vector for the current block. In other words, as part of applying the NBDV generation process, video encoder 20 and video decoder 30 adopt the disparity motion vector of one of the neighboring blocks as the disparity vector of the current block. In this way, video encoder 20 and video decoder 30 may determine the disparity vector for the current block based on the motion vector information of neighboring blocks that are inter-predicted with a disparity motion vector.

If the disparity motion vector of a spatially neighboring block is set as the disparity vector for the current block, the disparity vector is referred to as a spatial disparity vector (SDV). If the disparity motion vector of a temporally neighboring block is set as the disparity vector for the current block, the disparity vector is referred to a temporal disparity vector (TDV).

In some examples, techniques for using neighboring blocks to determine the disparity vector are expanded to include an implicit disparity vector (IDV). The IDV is a disparity vector of a neighboring block that video encoder 20 and video decoder 30 determined from disparity motion vectors of neighboring blocks of the neighboring block. For example, during the coding process (e.g., encoding or decoding), video encoder 20 or video decoder 30 may have determined a disparity vector for a neighboring block (e.g., a spatially or temporally neighboring block) even if the disparity vector for the neighboring block was not subsequently used to inter-predict the neighboring block. This disparity vector for the neighboring block may potentially be the disparity vector for the current block. For example, video encoder 20 and video decoder 30 may adopt the derived disparity vector for the neighboring block as the disparity vector for the current block. If the derived disparity vector of a neighboring block is set as the disparity vector for the current block, the disparity vector is referred to as an implicit disparity vector (IDV).

In this manner, video encoder 20 and video decoder 30 may determine a disparity vector for the current block based on a disparity motion vector for a spatially neighboring block, a disparity motion vector for a temporally neighboring block, or a derived disparity vector for a spatially neighboring block or a temporally neighboring block. As described in more detail, in some examples, the techniques may not rely on the derived disparity vector of a temporally neighboring block to derive the disparity vector for the current block. For instance, in applying the NBDV generation process, video encoder 20 and video decoder 30 may determine the disparity vector for the current block without considering any of the IDVs for blocks that are not in the current picture. Determining the disparity vector for the current block, with the techniques described in this disclosure, may promote coding efficiencies because video encoder 20 and video decoder 30 do not need to first construct the depth view component to determine depth, and then utilize the depth information to determine the disparity vector for the current block.

For instance, for a multiview video sequence, different views represent different projections of the same real world scene, which are synchronously captured with multiple cameras. The movement of an object in the real world scene is projected into all views according to the scene geometry. The geometry of a scene may be adequately represented by depth data or disparity vectors. In multiview video coding, disparity motion compensation is utilized where disparity motion vector may be chosen as the final motion vector in terms of rate-distortion. In addition, neighboring blocks may share almost the same motion information in video coding. Moreover, there may be a high correlation between the motion of current block and that of temporal blocks in reference pictures. Therefore, if the spatial/temporal neighboring blocks utilize inter-view prediction, its disparity motion vector can be treated as a good disparity vector predictor for current block.

Video encoder 20 and video decoder 30 may define several spatial and temporal neighboring blocks. Video encoder 20 and video decoder 30 may check the spatial and temporal neighboring blocks in a pre-defined order based on the priority of the correlation between the motion information of them and that of current block. Once a disparity motion vector (i.e., a motion vector points to an inter-view reference picture in the other view) is identified, video encoder 20 and video decoder 30 may convert the disparity motion vector to a disparity vector. In some examples, the techniques described in this disclosure may be dependent with the camera parameters.

Video encoder 20 and video decoder 30 may utilize the determined disparity vector for the current block for various purposes. As one example, video encoder 20 and video decoder 30 may utilize the disparity vector to identify the block to which the disparity vector refers, and identify the motion vector for the block to which the disparity vector refers. Video encoder 20 and video decoder 30 may utilize the motion vector for the block to which the disparity vector refers for predicting the motion vector of the current block, as part of inter-view motion prediction. The concept of inter-view motion prediction is described in more detail below. As another example, video encoder 20 and video decoder 30 may utilize the residual pixel values of the block that is referred to by the disparity vector for inter-predicting the residual values of the current block, as part of inter-view residual prediction. The disparity vector may be utilized for other coding tools as well.

To determine which disparity motion vector should be set as the disparity vector for the current block, video encoder 20 and video decoder 30 may evaluate the disparity motion vectors in a certain order. For instance, video encoder 20 and video decoder 30 may first determine whether any of the spatially neighboring blocks are inter-predicted with a disparity motion vector, and if so, set the disparity motion vector of the spatially neighboring block as the disparity vector for the current block and end the process of determining the disparity vector for the current block. If none of the spatially neighboring blocks are inter-predicted with a disparity motion vector, video encoder 20 and video decoder 30 may determine whether temporally neighboring blocks in one or more candidate pictures are inter-predicted with a disparity motion vector, and if so, set the disparity motion vector of the temporally neighboring block as the disparity vector for the current block and end the process of determining the disparity vector for the current block. If none of the temporally neighboring blocks are inter-predicted with a disparity motion vector, video encoder 20 and video decoder 30 may determine whether a disparity vector for one of the neighboring blocks exists, and set that disparity vector as the disparity vector for the current block.

There may be various drawbacks to the example techniques described above. As one example, determining whether a disparity vector for a neighboring block exists (i.e., whether the disparity vector for the current block is an IDV) requires multiple calls to memory because the respective memory of video encoder 20 and video decoder 30 (referred to as a decoded picture buffer (DPB)) may store the disparity vectors for the neighboring blocks. Such multiple calls to memory leads to more memory consumption than desirable.

As another example, if video encoder 20 and video decoder 30 elects not to determine whether a disparity vector for a neighboring block exists (to save memory consumption), then the number of candidate pictures that video encoder 20 and video decoder 30 needs to access and evaluate to determine whether video blocks within these candidate pictures are inter-predicted with a disparity motion vector rises drastically (i.e., potentially all available pictures, and several blocks within each of the pictures would need to be accessed and evaluated).

In accordance with this disclosure, in applying the NBDV generation process for determining the disparity vector for the current block, video encoder 20 and video decoder 30 may identify a limited number of pictures that video encoder 20 and video decoder 30 access and evaluate to determine whether a block within the pictures is inter-predicted with a disparity motion vector. Also, within the identified pictures, video encoder 20 and video decoder 30 may access and evaluate a limited number of blocks to determine whether any of the blocks in the pictures are inter-predicted with a disparity motion vector.

Video encoder 20 and video decoder 30 may utilize these techniques in examples where the IDV is not used and examples where the IDV is used. For instance, in some examples, video encoder 20 and video decoder 30 may remove the IDV information for any picture that is not the current picture (e.g., information of derived disparity vectors for all blocks in pictures that are not the current picture). In these examples, in applying the NBDV generation process, video encoder 20 and video decoder 30 may not consider any of the IDVs of temporally neighboring blocks (e.g., blocks that are not in the current picture) for deriving the disparity vector of the current block. However, the techniques described in this disclosure may be applicable to examples where IDVs of pictures other than the current picture are maintained.

For example, in applying the NBDV generation process, video encoder 20 and video decoder 30 may be limited to identifying only two candidate pictures. In this example, video encoder 20 may select a first candidate picture, and signal information in a slice header of a current slice from which video decoder 30 can determine the first candidate picture. Video decoder 30 may identify the first candidate picture from information signaled in the slice header, and evaluate this first candidate picture to determine whether a block within this first candidate picture is inter-predicted with a disparity motion vector.

For instance, as described in more detail below, video encoder 20 and video decoder 30 may determine a temporal motion vector predictor (TMVP) as part of advanced motion vector prediction (AMVP) or merge/skip. The TMVP is a motion vector for a block in a picture other than the current picture, and this picture other than the current picture may be in the same view as the current picture. In some examples, video encoder 20 and video decoder 30 may utilize the TMVP to determine the motion vector for the current block, if the TMVP is selected as the motion vector predictor that is to be used for determining the motion vector of the current picture.

The picture that includes the block whose motion vector may be used as the TMVP is referred to as a co-located picture. In some examples, as part of coding the current block of the current picture, video encoder 20 and video decoder 30 may have needed to identify the co-located picture to identify the TMVP. The techniques described in this disclosure may leverage the condition that video encoder 20 and video decoder 30 may already need to identify the co-located picture by assigning the co-located picture as the first candidate picture. For instance, to determine the TMVP, video encoder 20 and video decoder 30 may already need to determine the motion information of one or more temporally neighboring blocks in the co-located picture. Therefore, video encoder 20 and video decoder 30 may not need to re-access and reevaluate the temporally neighboring blocks of the co-located picture to determine whether the temporally neighboring blocks are inter-predicted with a disparity motion vector.

In some examples, video encoder 20 may signal information that video decoder 30 utilizes to determine the co-located picture, which may also be referred to as the first candidate picture used for disparity vector derivation. For instance, video encoder 20 may signal a flag that identifies a reference picture list (e.g., one of RefPicList0 and RefPicList1) and an index value into the identified reference picture list. Video decoder 30 utilizes the flag and index value to identify the co-located picture, which is also one of the two candidate pictures used for disparity vector derivation.

In general, the manner in which video encoder 20 and video decoder 30 select the first candidate picture may be immaterial to the techniques described in this disclosure, and, in general, video encoder 20 and video decoder 30 may utilize any known or yet to be developed technique to select the first candidate picture. In some examples, one limitation of the first candidate picture may be that the first candidate picture is a temporal reference picture. For example, the first candidate picture may be a reference picture identified in one of the reference picture lists (e.g., RefPicList0 or RefPicList1) that video decoder 30 constructs for inter-predicting blocks within a picture, and the first candidate picture may be in the same view as the view that includes the block to be inter-predicted.

The techniques described in this disclosure are directed to the manner in which video encoder 20 and video decoder 30 may identify the second candidate picture that video encoder 20 and video decoder 30 access and evaluate to determine whether a block in the second candidate picture is inter-view predicted with a block in a view other than the view that includes the second candidate picture. Again, the purpose of determining whether a candidate picture includes a block that is inter-view predicted with a block in a view other than a view that includes the candidate picture is to use the motion vector for the block (which is a disparity motion vector) to determine the disparity vector of the current block.

For example, video encoder 20 and video decoder 30 determine one or more candidate pictures (e.g., the first and second candidate pictures) that include the temporal neighboring blocks that are to be accessed and evaluated to determine whether a temporal neighboring block is inter-predicted with a disparity motion vector. The disparity motion vector of the temporal neighboring block may refer to an inter-view reference picture belonging to one of a set of reference views. As described in more detail, video encoder 20 and video decoder 30 may receive information for one of the candidate pictures, and may determine the other candidate picture using the techniques described in this disclosure.

For instance, as described in more detail, for the other candidate picture, video encoder 20 and video decoder 30 may select the candidate picture from a group of pictures to determine if a temporal neighboring block in the candidate picture contains a disparity motion vector that refers to an inter-view reference picture belong to one of the sets of reference views based on the properties of each of the pictures of the group of pictures. The properties of the pictures that video encoder 20 and video decoder 30 utilize to determine the candidate picture include one or more of: whether the picture is a random access picture, the temporal level of the picture, and the display order of the picture.

It should be understood that the techniques described in this disclosure are not limited to examples where the first candidate picture is identified by information signaled in the slice header. In general, one or more of the techniques described in this disclosure may be extended to examples where a first candidate picture is not identified, and may be extended to examples where a first candidate picture is identified, but not necessarily in the slice header. The techniques may also be extended to examples where video encoder 20 and video decoder 30 identify additional candidate pictures (i.e., the first candidate picture or other candidate pictures) utilizing techniques other than techniques described in this disclosure for identifying the second candidate picture.

For purposes of illustration only, the techniques described in this disclosure are described with respect to video encoder 20 signaling information indicative of a first candidate picture as part of the slice header, and video decoder 30 identifying the first candidate picture from the information signaled as part of the slice header. However, the techniques may generally be directed to a manner in which video encoder 20 and video decoder 30 identify a candidate picture that is accessed and evaluated to determine whether one of its blocks is inter-predicted with a disparity motion vector. These techniques may be applicable regardless of whether video encoder 20 signals information for another candidate picture and regardless of whether video encoder 20 and video decoder 30 implement other techniques to identify additional candidate pictures for access and evaluation.

As described above, the disparity motion vector for a block in another picture that is used to determine the disparity vector of the current block is referred to as a temporal disparity vector (TDV). Accordingly, the techniques described in this disclosure for applying the NBDV generation process may be considered as identifying a candidate picture that is evaluated for TDVs to determine the disparity vector of the current block. A first of the candidate pictures is identified by information signaled in the slice header (e.g., the co-located picture used for TMVP), and a second of the candidate pictures is identified in accordance with the techniques described in this disclosure.

The techniques for identifying the second candidate picture may be implicit techniques. For example, unlike the first candidate picture, to identify the second candidate picture, video encoder 20 may not need to signal information to video decoder 30 identifying the second candidate picture. Rather, video encoder 20 and video decoder 30 may implement substantially similar techniques, respectively, with substantially similar information to identify the second candidate picture. In this way, because video encoder 20 and video decoder 30 implement substantially similar techniques for identifying the second candidate picture, video encoder 20 and video decoder 30 may identify the same second candidate picture without video encoder 20 signaling information identifying the second candidate picture that video decoder 30 receives.

Once both the first and second candidate pictures are identified, video encoder 20 may first evaluate the first candidate picture (e.g., the co-located picture used for TMVP) to identify a TDV (i.e., a block in the first candidate picture that is inter-predicted with a disparity motion vector). It should be understood that video encoder 20 and video decoder 30 may have already evaluated the blocks within the co-located picture as part of determining the TMVP. Accordingly, the following description may be somewhat similar to the manner in which video encoder 20 and video decoder 30 determine the TMVP, but is described in the context of evaluating blocks for the purposes of determining whether the blocks are inter-predicted with a disparity motion vector for disparity vector derivation for the current block.

In the NBDV generation process, there may be a limited number of blocks that video encoder 20 evaluates in the first candidate picture, as described in more detail, which again may be part of determining the TMVP in some examples. If a TDV exists in the first candidate picture, video encoder 20 utilizes the TDV as the disparity vector for the current block, and implements various coding tools such as inter-view motion prediction or inter-view residual prediction using the disparity vector of the current block.

If no TDV exists in the first candidate picture, video encoder 20 evaluates the second candidate picture to identify a TDV (i.e., a block in the second candidate picture that is inter-predicted with a disparity motion vector). As above, there may be a limited number of blocks that video encoder 20 evaluates in the second candidate picture, as described in more detail. If a TDV exists in the second candidate picture, video encoder 20 utilizes the TDV as the disparity vector for the current block, and implements various coding tools such as inter-view motion prediction or inter-view residual prediction using the disparity vector of the current block.

In some examples, video encoder 20 may evaluate a first block in the first candidate picture, and if the first block is not inter-predicted with a disparity motion vector, may evaluate a first block in the second candidate picture. If the first block in the second candidate picture is not inter-predicted with a disparity motion vector, video encoder 20 may evaluate a second block in the first candidate picture. If the second block in the first candidate picture is not inter-predicted with a disparity motion vector, video encoder 20 may evaluate a second block in the second candidate picture. At any time, if video encoder 20 determines that a block in one of the first or second candidate pictures is inter-predicted with a disparity motion vector, video encoder 20 may cease the evaluation of blocks in the candidate pictures, and use disparity motion vector to derive the disparity vector for the current block. Moreover, in some examples, video encoder 20 may start with the second candidate picture, and then proceed to the first candidate picture. Other permutations and combinations may be possible.

Video decoder 30 may implement substantially similar techniques as those of video encoder 20 to determine the disparity vector for the current block. For example, video decoder 30 may first evaluate the first candidate picture for a TDV (in the same way as video encoder 20). If no TDV exists, video decoder 30 may evaluate the second candidate picture for a TDV (in the same way as video encoder 20). In this manner, both video encoder 20 and video decoder 30 may determine the same disparity vector for the current block without video encoder 20 needing to signal the disparity vector to video decoder 30. Because video encoder 20 and video decoder 30 determine the same disparity vector for the current block, video decoder 30 may be able to decode the current block in the same way that video encoder 20 encoded the current block (i.e., decoding with the reciprocal of the encoding scheme of video encoder 20).

It should be noted that determining the TDV for determining the disparity vector of the current block is not necessary in every example. For instance, as described above, video encoder 20 and video decoder 30 may first evaluate spatially neighboring blocks within the same picture as the block to be inter-predicted, and if a disparity motion vector for a spatially neighboring block is identified (i.e., a SDV is identified), video encoder 20 and video decoder 30 may not proceed with determining a TDV. In some cases, video encoder 20 and video decoder 30 may identify an IDV, if no SDV is identified, prior to determining whether a TDV exists. If no SDV and no IDV exists, then video encoder 20 and video decoder 30 may proceed with determining whether a TDV exists. Again, because video encoder 20 and video decoder 30 implement the same techniques for identifying the disparity vector, video encoder 20 need not signal information indicating the disparity vector of the current block to video decoder 30.

As described above, video encoder 20 signals information identifying a first candidate picture (e.g., the co-located picture used for TMVP) for determining a TDV in a slice header to video decoder 30, and video encoder 20 and video decoder 30 may implement the example techniques described in this disclosure to identify a second candidate picture for determining a TDV. For example, video encoder 20 and video decoder 30 may identify the second candidate picture from a group of pictures to determine if a temporal neighboring block in the second candidate picture is inter-predicted (e.g., contains) a disparity motion vector that refers to an inter-view reference picture belonging to one set of reference views. The second candidate picture may be a picture stored in a decoded picture buffer (DPB) of respective video encoder 20 and video decoder 30. For example, the pictures stored in the DPB of video decoder 30, when video decoder 30 is to decode the current picture that includes the current block, may be same pictures as stored in the DPB of video encoder 20 when video encoder 20 encoded the current picture that includes the current block.

In accordance with the techniques described in this disclosure for applying the NBDV generation process, to identify the second candidate picture for determining a TDV, video encoder 20 and video decoder 30 may implement a hierarchical scheme. For instance, video encoder 20 and video decoder 30 may select the candidate picture from a group of pictures based on properties of each of the pictures of the group of pictures. Examples of the properties include one or more of whether the picture is a random access picture (e.g., a random access point view component (RAPVC) picture, temporal level of the picture, and the display order of the picture, all of which are described in more detail below).

In this hierarchical scheme, video encoder 20 and video decoder 30 may determine whether a picture stored in the respective DPB is a random access point view component (RAPVC) picture, which is also an example of a random access picture, and if there is a RAPVC picture in respective DPBs, video encoder 20 and video decoder 30 may identify the RAPVC picture as the second candidate picture. A RAPVC picture is described in more detail below.

In some examples, rather than evaluating all of the pictures in respective DPBs to determine whether a RAPVC picture exists, video encoder 20 and video decoder 30 may evaluate pictures identified in a reference picture set (RPS) to determine whether a RAPVC exists within the pictures identified in the RPS. A reference picture set identifies pictures that can be used to inter-predict the current picture and pictures that follow the current picture in decoding order. All pictures in the RPS, that can be used to inter-predict the current picture, are available in the respective DPBs of video encoder 20 and video decoder 30. However, not all pictures in the respective DPBs of video encoder 20 and video decoder 30 are identified in the RPS.

Video encoder 20 may signal information indicative of the pictures that belong to the RPS to video decoder 30. From the signaled information indicating which pictures belong to the RPS, video decoder 30 may determine which pictures in the RPS are reference pictures that can be used to inter-predict only pictures following the current picture in decoding order and which pictures in the RPS are reference pictures that can be used to inter-predict the current picture.

Video encoder 20 and video decoder 30 may construct respective reference picture lists (e.g., RefPicList0 or RefPicList0 and RefPicList1) based on the pictures identified in the RPS that can be used to inter-predict the current picture. Video encoder 20 and video decoder 30 inter-predict encode or inter-predict decode, respectively, the current picture based on pictures identified in the reference picture lists. Not all pictures in the RPS that can be used to inter-predict the current picture need to be included in the reference picture lists.

In some examples, video encoder 20 and video decoder 30 may determine whether a RAPVC picture exists in the entire RPS. In some example, video encoder 20 and video decoder 30 may determine whether a RAPVC picture exists among the pictures, identified in the RPS, which can be used for inter-predicting the current picture, rather than among all pictures in the RPS. In some examples, video encoder 20 and video decoder 30 may determine whether a RAPVC picture exists in the constructed reference picture lists (e.g., RefPicList0 and RefPicList1). In any of these examples, if video encoder 20 and video decoder 30 identify a RAPVC picture, video encoder 20 and video decoder 30 may select the RAPVC picture as the second candidate picture.

In some cases, video encoder 20 and video decoder 30 may identify more than one RAPVC picture in the DPB, in the entire RPS, among the pictures, identified in the RPS, that can be used for inter-predicting the current picture, or in the reference picture lists (e.g., in a reference picture list other than the reference picture list that includes the first candidate picture, in the same reference picture list that includes the first candidate picture, or in both reference picture lists). In these cases, it may be unclear which one of the RAPVC pictures should be the second candidate picture. If a situation arises where video encoder 20 and video decoder 30 identify more than one RAPVC picture, video encoder 20 and video decoder 30 may determine the relative output or display order distances between the identified RAPVC pictures and the current picture. The relative output or display order distance, in this disclosure, refers to the difference in the display or output times. For example, if the difference in the time between when a first picture is displayed or outputted and the current picture is displayed or outputted is greater than the different in time between when a second picture is displayed or outputted and the current picture, then the first picture is considered to be at a greater distance away from the current picture than the second picture.

As described above, the picture order count (POC) value of a picture indicates the display or output time of the picture. In cases where video encoder 20 and video decoder identify two or more RAPVC pictures, video encoder 20 and video decoder 30 may determine the relative distances between the identified RAPVC pictures and the current picture. Video encoder 20 and video decoder 30 may select the RAPVC picture with the shortest distance relative to the current picture as the second candidate picture.

As an illustrative example, assume that video encoder 20 and video decoder 30 identify a first RAPVC picture and a second RAPVC picture among the pictures identified in the RPS or the reference picture lists (as two examples) that can be used to inter-predict the current picture. Also, assume that the POC value for the first RAPVC picture is 5, the POC value for the second RAPVC picture is 8, and the POC value for the current picture is 6. In this example, the first RAPVC picture is considered to be closer in distance to the current picture than the second RAPVC picture because the distance between the first RAPVC picture and the current picture is one picture (i.e., 6−5 equals 1) and the distance between the second RAPVC picture and the current picture is two pictures (i.e., 8−6 equals 2).

In some cases, when video encoder 20 and video decoder 30 identify more than two RAPVC pictures, it may be possible that two of the RAPVC pictures are equally distant from the current picture and have the shortest distance among all of the identified RAPVC pictures. In this case, video encoder 20 and video decoder 30 may need to determine which of the two equally distant RAPVC pictures to select as the second candidate picture. It should be understood that for there to be two RAPVC pictures that are equally distant from the current picture, one RAPVC picture comes earlier than the current picture in display or output order and the other RAPVC picture comes later than the current picture in display or output order.

In the situation where there are two equally distant RAPVC pictures, video encoder 20 and video decoder 30 may select the RAPVC picture, between the two equally distant RAPVC pictures, that is in the opposite direction from the first candidate picture. For example, if the first candidate picture (the one identified in the slice header) is earlier than the current picture in output or display order (as indicated by respective POC values), video encoder 20 and video decoder 30 may select the RAPVC picture that comes after the current picture in output or display order as the second candidate picture. Similarly, if the first candidate picture is later than the current picture in output or display order, video encoder 20 and video decoder 30 may select the RAPVC picture that comes prior to the current picture in output or display order as the second candidate picture. Other techniques to select one RAPVC picture among two equally distant RAPVC pictures are possible (e.g., selecting the RAPVC picture that is in the same direction as the first candidate picture as the second candidate picture), and utilizing the location of the first candidate picture to select one RAPVC picture among two equally distant RAPVC pictures is provided for purposes of illustration only.

A random access point view component (RAPVC) picture is based on the random access concept of the HEVC standard extended to multiview and 3DV extensions. Detailed definitions of the random access point access units, as well as random access view component are available in the MV-HEVC working draft specification: JCT3V-A1004, which is incorporated by reference herein in its entirety. The JCT3V-A1004 document is available as follows: Gerhard Tech, Krzysztof Wegner, Ying Chen, Miska Hannuksela, "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, and available as of Sep. 18, 2013 from http://phenix.int-evry.fr/jct2/doc_end_user/current document.php?id=209.

In general, a RAPVC picture is a picture from which video coding can begin. For example, no picture that follows the RAPVC picture in decoding order (which may be different than display or output order) is inter-predicted with any picture that precedes the RAPVC picture in decoding order. In this way, if video encoding or video decoding were to begin on a RAPVC picture, video encoder 20 can encode pictures following the RAPVC picture in decoding order and video decoder 30 can decode pictures following the RAPVC picture in decoding order even if pictures that precede the RAPVC picture in decoding order are not available.

In the multiview or 3D extensions of HEVC (e.g., 3D-HECV), whether a view component is a random access point or not (i.e., whether a picture is a RAPVC picture or not) may depend on the network abstraction layer (NAL) unit type of the view component. If the NAL unit type belongs to those defined in the HEVC standard for random access point (RAP) pictures, video encoder 20 and video decoder 30 may determine that the view component is a random access point view component (or for simplicity, random access point picture of the current view).

In some examples, the random access functionality may only apply to the temporal prediction in a way that certain predictions in the temporal dimension (thus inside a view) are disabled or constrained similarly as in HEVC base specification (i.e., WD 10). However, inter-view prediction for a RAPVC picture is still possible, and may be typical, to improve the coding efficiency, similar to the anchor picture in H.264/MVC. In other words, a RAPVC picture may not be inter-predicted with another picture in the same view, but may be inter-view predicted with another picture in another view. The display or output time of the picture in the other view used to inter-view predict the RAPVC picture is generally the same as the display or output time of the RAPVC picture. In examples where a RAPVC picture is inter-view predicted, the RAPVC picture may be a P or B picture (i.e., inter-view predicted with one other picture making it a P picture, or inter-view predicted with two other pictures making it a B picture).

In the above example, to select the second candidate picture (the information for the first candidate picture being identified in the slice header), video encoder 20 and video decoder 30 determine whether one or more RAPVC pictures are available in the entire DPB, identified in the RPS, identified in the RPS among pictures in the RPS that are identified as being used to inter-predict the current picture, or identified in a reference picture list (e.g., in a reference picture list other than the reference picture list that includes the first candidate picture, in the same reference picture list that includes the first candidate picture, or in both reference picture lists). However, in some examples, it may be possible that no such RAPVC picture exists.

If video encoder 20 and video decoder 30 are not able to identify a RAPVC picture, video encoder 20 and video decoder 30 may evaluate temporal identification values of pictures stored in the DPB to select the second candidate picture. For example, only pictures with temporal identification values less than or equal to the temporal identification value of the current picture can be used to inter-predict the current picture. Pictures with temporal identification values greater than the temporal identification value of the current picture cannot be used to inter-predict the current picture.

The temporal identification values may be useful for picture extraction purposes. For example, if all pictures with the highest temporal identification values are removed (i.e., to reduce bandwidth consumption), then there may be no effect on video coding because these pictures cannot be used to inter-predict any of the remaining pictures. Similarly, if all pictures with the two highest temporal identification values are removed (i.e., to further reduce bandwidth consumption), then there may be no effect on video coding because these picture cannot be used to inter-predict any of the remaining pictures. However, the removal of such pictures may affect video quality.

In accordance with the techniques described in this disclosure, if no RAPVC picture is available, video encoder 20 and video decoder 30 may identify the pictures in the DPB with the lowest temporal identification values. In some examples, rather than evaluating all pictures in the DPB, video encoder 20 and video decoder 30 may identify pictures identified in the RPS with the lowest temporal identification values. In some examples, rather than evaluating all pictures in the RPS, video encoder 20 and video decoder 30 may identify pictures with the lowest temporal identification values from among the pictures in the RPS that can be used to inter-predict the current picture. In some examples, rather than evaluating all pictures in the RPS that can be used to inter-predict the current picture, video encoder 20 and video decoder 30 may identify pictures in the reference picture list or lists with the lowest temporal identification values.

Again, the RPS identifies pictures that can be used to inter-predict the current picture and pictures following the current picture in decoding order. Among the pictures identified in the RPS, some pictures may be used to inter-predict the current picture and pictures following the current picture in decoding order, and some picture may be used to inter-predict only pictures following the current picture in decoding order. Also, video encoder 20 and video decoder 30 may be configured to construct reference picture lists (RefPicList0 and RefPicList1), and use one or more of the pictures in RefPicList0 and RefPicList1 to inter-predict blocks of the current picture.

In some examples, there may be only one picture with the lowest temporal identification value, and video encoder 20 and video decoder 30 may select this picture as the second candidate picture. However, in some cases, video encoder 20 and video decoder 30 may identify multiple pictures with the lowest temporal identification value (e.g., multiple pictures with the temporal identification value of 0). In these cases, similar to the RAPVC picture examples above, video encoder 20 and video decoder 30 may identify the picture from among the pictures with lowest temporal identification value that is closest in relative output or display order distance to the current picture based on POC values. If there is only one picture from among the pictures with the lowest temporal identification value that is closest to the current picture in display or output order, video encoder 20 and video decoder 30 may select the picture with lowest temporal identification value that is closest to the current picture in display or output order as the second candidate picture.

In some cases, when video encoder 20 and video decoder 30 identify more than two pictures with the lowest temporal identification value, it may be possible that two of the pictures with the lowest temporal identification value are equally distant from the current picture and have the shortest distance among all of the pictures with the lowest temporal identification value. In this case, similar to the above example with respect to RAPVC pictures, video encoder 20 and video decoder 30 may need to determine which of the two equally distant pictures with the lowest temporal identification value to select as the second candidate picture. Similar to above, it should be understood that for there to be two pictures with the lowest temporal identification value that are equally distant from the current picture, one picture with the lowest temporal identification value comes earlier than the current picture in display or output order and the other picture with the lowest temporal identification value comes later than the current picture in display or output order.

In the situation where there are two equally distant pictures with the lowest temporal identification values, video encoder 20 and video decoder 30 may select the picture, between the two equally distant pictures with the lowest temporal identification value, that is in the opposite direction from the first candidate picture. For example, if the first candidate picture (e.g., the co-located picture used for TMVP) is earlier than the current picture in output or display order (as indicated by respective POC values), video encoder 20 and video decoder 30 may select the picture with the lowest temporal identification value that comes after the current picture in output or display order as the second candidate picture. Similarly, if the first candidate picture is later than the current picture in output or display order, video encoder 20 and video decoder 30 may select the picture with lowest temporal identification value that comes prior to the current picture in output or display order. Other techniques to select one picture among two equally distant pictures with the lowest temporal identification value are possible (e.g., selecting the picture in the same direction as the first candidate picture as the second candidate picture), and utilizing the location of the first candidate picture to select one picture among two equally distant pictures with the lowest temporal identification value is provided for purposes of illustration only.

As described above, certain pictures in the multiview coding are random access point view component (RAPVC) pictures as defined by the NAL unit type. The HEVC base standard (WD10) defined various types of pictures. The following is an overview of the different types of pictures.

There are four picture types that can be identified by the NAL unit type in HEVC. These are the instantaneous decoding refresh (IDR) picture, the clean random access (CRA) picture, the temporal layer access (TLA) picture and the coded picture that is not an IDR, CRA or TLA picture. The NAL unit type may be part of a NAL unit header, as described in more detail with respect to FIG. 5.

The IDR and the coded pictures are picture types inherited from the H.264/AVC specification. The CRA and the TLA picture types are new in HEVC and not available in the H.264/AVC specification. The CRA picture is a picture type that facilitates decoding beginning from any random access point in the middle of a video sequence that is more efficient than inserting IDR pictures.

In HEVC, the bitstream starting from these CRA pictures may be conforming bitstreams. The TLA picture is a picture type that can be used to indicate valid temporal layer switching points. In multiview coding, a RAPVC picture may be similar to a CRA picture in HEVC. However, a CRA picture in HEVC may not be inter-predicted, but a RAPVC picture may be inter-predicted with a picture in another view, and not inter-predicted with a picture in the same view.

For example, in video applications, such as broadcasting and streaming, users may want to switch channels or jump to specific parts of the video with minimum delay. Switching channels or jumping to specific parts of the video may be enabled by having random access pictures at regular intervals in the video bitstreams. For example, a user may be able to skip to a random access picture or, when a user changes channels, the video content of the changed to channel may start at a random access picture.

The IDR picture, specified in both H.264/AVC and HEVC may be used for random access. However, there may be limitations with using the IDR picture for random access. For example, an IDR picture starts a coded video sequence and, when video encoder 20 and video decoder 30 encoder or decode, respectively, an IDR picture, video encoder 20 and video decoder 30 empty (i.e., clean out) respective DPBs. Because the respective DPBs are empty, video encoder 20 and video decoder 30 may not be able to use pictures following the IDR in decoding order to inter-predict picture prior to the IDR picture (i.e., picture following the IDR in decoding order cannot use pictures prior to the IDR picture as a reference picture).

In some cases, bitstreams relying on IDR pictures for random access may have significantly lower coding efficiency (e.g., 6%). To improve the coding efficiency, the CRA pictures in HEVC, which is similar to the RAPVC pictures in multiview coding (e.g., 3D-HEVC), allows pictures that follow the CRA picture in decoding order, but precede the CRA picture in output order to use pictures decoded before the CRA picture as reference.

Figure 4:
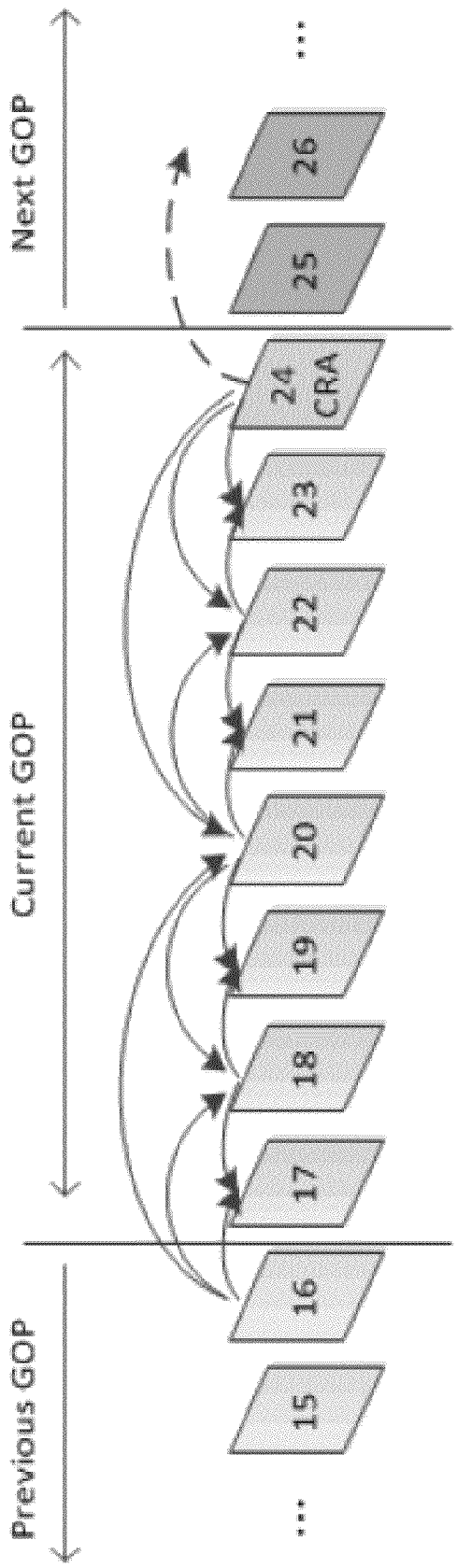
FIG. 4 is a conceptual diagram illustrating an example of picture types.

FIG. 4 is a conceptual diagram illustrating an example of picture types. For instance, FIG. 4 illustrates pictures identified by their display order. The display order is identified by picture order count (POC) values. For example, in FIG. 4, the picture with POC value 24 is the CRA picture, and belongs to a Group of Pictures (GOP). The GOP also includes pictures with POC values 17-23. Pictures with POC values 17-23 follow the CRA picture (i.e., the picture with POC value 24) in decoding order (i.e., pictures with POC values 17-23 are inter-predicted by the CRA picture with POC value 24 or inter-predicted by pictures that were inter-predicted by the CRA picture with POC value 24). However, the pictures with POC values 17-23 precede the CRA picture with POC value 24 in output order (i.e., the pictures with POC values 17-23 are displayed earlier than the CRA picture with POC value 24).

In this example, pictures with POC values 17-23 are referred to as leading pictures of the CRA with POC value 24, and can be correctly decoded if video decoder 30 starts decoding from an IDR or a CRA picture before the current CRA picture (i.e., the picture with POC value 24). However, video decoder 30 may not be able to properly decode pictures with POC values 17-23 if video decoder 30 starts decoding from the CRA picture with POC value 24. In these cases, video decoder 30 discards the leading pictures (i.e., pictures with POC values 17-23) during the random access decoding.

Furthermore, to prevent error propagation from reference pictures that may not be available depending on where video decoder 30 starts decoding, all pictures in the next GOP that follow the CRA picture with POC value 24 in both decoding order and output order do not use any picture that precedes the CRA picture with POC value 24 either in decoding order or output order as reference. For example, if video decoder 30 starts decoding from the CRA picture with POC value 24, video decoder 30 discards pictures with POC values 17-23. In this case, because pictures with POC values 17-23 are not available, the pictures that follow the CRA picture with POC value 24 in both decoding and output order do not use any of the pictures with POC values 17-23 as a reference picture.

Similar random access functionalities are supported in H.264/AVC with the recovery point supplemental enhancement information (SEI) message. Not all video decoders that conform to the H.264/AVC standard may support the recovery point SEI message.

In HEVC, a bitstream starting with a CRA picture is considered as a conforming bitstream. As described above, when a bitstream starts with a CRA picture, the leading pictures of the CRA picture may refer to unavailable reference pictures and hence cannot be correctly decoded. However, also as described above, HEVC specifies that the leading pictures of the starting CRA picture are not output, hence the name "clean random access."

For establishment of bitstream conformance requirement, HEVC specifies a decoding process to generate unavailable reference pictures for decoding of the non-output leading pictures. However, video decoder 30 does not necessarily have to follow that decoding process, as long as video decoder 30 can generate identical output compared to when the decoding process is performed from the beginning of the bitstream. Moreover, in HEVC, a conforming bitstream may contain no IDR pictures at all, and consequently may contain a subset of a coded video sequence or an incomplete coded video sequence. It should be understood that, in HEVC, a conforming bitstream may contain no IDR pictures at all, and consequently may contain a subset of a coded video sequence or an incomplete coded video sequence.

Besides the IDR and CRA pictures, there are other types of random access point pictures (e.g., broken link access (BLA) pictures). For each of the major types of the random access point pictures, there might be sub-types, depending on how a random access point picture could be potentially treated by systems. Each sub-type of random access point picture has a different NAL unit type.

In the techniques described this disclosure, a RAPVC picture for multiview coding may be similar to the CRA picture in the HEVC standard. However, other examples of RAPVC picture are possible. For instance, the RAPVC picture may be similar to a TLA or a BLA picture. It may be possible for the RAPVC picture to be similar to an IDR picture.

As described above, if video encoder 20 and video decoder 30 determine that a RAPVC picture is not available, video encoder 20 and video decoder 30 may select the second candidate picture based on the temporal identification values. The following describes the manner in which video encoder 20 indicates the temporal identification values of the pictures, and the manner in which video decoder 30 determines the temporal identification values of the pictures. Video encoder 20 and video decoder 30 may store the temporal identification values of the pictures in respective DPBs along with the pictures.

Figure 5:
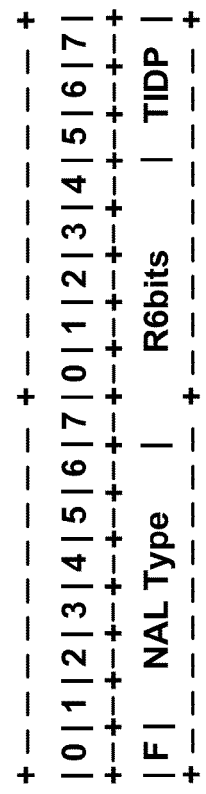
FIG. 5 is a conceptual diagram illustrating an example of a network abstraction layer (NAL) unit header.

FIG. 5 is a conceptual diagram illustrating an example of a network abstraction layer (NAL) unit header. In HEVC, a two-byte NAL unit header was introduced with the anticipation that this design is sufficient to support the HEVC scalable and 3D Video Coding (3DV) extensions (including 3D-HEVC), as well as other future extensions. For instance, the NAL unit header illustrated in FIG. 5 may be applicable to the HEVC base standard, as well as for multiview extensions such as 3D-HEVC or 3DV.

As illustrated in FIG. 5, the first byte of NAL unit header is similar to H.264/AVC NAL unit header. In H.264/AVC, the nal_ref_idc (NRI) was a two bit fixed code word. These two bits of nal_ref_idc were used to support different transport priority signaling for supporting data partitioning. In HEVC and extensions, the removal of data partitioning allowed the NRI to be reduced by one 1-bit. Furthermore, indicating a reference picture is enabled by more NAL unit types. So NRI is completely removed from the NAL unit header, which, in turn, allowed the size of the nal_unit_type (NALType) field to increase from five to six bits, providing for twice as many NAL unit types compared with H.264/AVC and six reserved bits for extensibility.

As described above, whether a picture is a RAPVC picture or not may be based on the NAL unit type. Video encoder 20 may include the NAL unit type in the NAL unit header, and video decoder 30 may parse the NAL unit header to determine the NAL unit type. Video decoder 30 may then determine whether the picture is a RAPVC picture or not based on the NAL unit type.

As illustrated in FIG. 5, the NALType field is a six bit value starting from the second bit in the NAL unit header to the seventh bit in the NAL unit header, and follows the forbidden_zero bit (F) which is the first bit in the NAL unit header. The forbidden_zero (F) bit is generally zero to prevent start code emulations in MPEG-2 systems legacy environments.

The second part of the NAL unit header includes two syntax elements: reserved_zero_6 bits (R6 bits, 6 bits) temporal id_plus_1 (TIDP, 3 bits). For example, as illustrated in FIG. 5, the R6 bits is six bits from the eighth bit to the thirteenth bit in the NAL unit header. With TemporalId (TIDP), temporal scalability is supported (with the temporal identifier ranging from 0 to 6 inclusive). Video coding layer (VCL) NAL units with can be decoded successfully without accessing any NAL units that have larger TemporalId values.

As illustrated in FIG. 5, video encoder 20 may include the temporal identification value (plus one) as the last three bits in the NAL unit header. Video decoder 30 may determine the temporal identification value of a picture by parsing the last three bits in the NAL unit header, and then subtracting one. The temporal identification values may range from zero to six, and pictures with higher temporal identification value cannot be used to inter-predict pictures with a lower temporal identification value.

In the techniques described in this disclosure, to select the second candidate picture, video encoder 20 and video decoder 30 may parse the NAL unit headers associated with various pictures such as all pictures in the DPB, all pictures in the RPS (which is a subset of pictures in the DPB), all pictures in the RPS that can be used to inter-predict the current picture (which is a subset of pictures identified in the RPS), or all pictures in the reference picture lists (e.g., in a reference picture list other than the reference picture list that includes the first candidate picture, in the same reference picture list that includes the first candidate picture, or in both reference picture lists) to identify RAPVC pictures (i.e., parse the NAL-Type bits in the NAL unit header). If video encoder 20 and video decoder 30 identify only one RAPVC picture, video encoder 20 and video decoder 30 may select that RAPVC picture as the second candidate picture, and if video encoder 20 and video decoder 30 identify multiple RAPVC pictures, video encoder 20 and video decoder 30 may identify one of these RAPVC picture as the second candidate picture based on relative distances to the current picture, and possibly, based on the location of the first candidate picture relative to the current picture, as described above.

If video encoder 20 and video decoder 30 determine that no RAPVC picture is available based on the NALType bits in the NAL unit header, video encoder 20 and video decoder 30 may parse the NAL unit headers associated with various pictures to identify pictures with the lowest temporal identification values (i.e., parse the TIDP bits in the NAL unit headers to identify pictures with lowest temporal identification values). If video encoder 20 and video decoder 30 identify only one picture with the lowest temporal identification value, video encoder 20 and video decoder 30 may select that picture as the second candidate picture, and if video encoder 20 and video decoder 30 identify multiple pictures with the lowest temporal identification value, video encoder 20 and video decoder 30 may select one of these pictures with the lowest temporal identification value as the second candidate picture based on relative distances to the current picture, and possibly, based on the location of the first candidate picture relative to the current picture, as described above.

As described above, in some examples, video encoder 20 and video decoder 30 may utilize the determined disparity vector for the current block of inter-view residual prediction. In video coding, video encoder 20 signals the difference (i.e., residual) between the current block and the block that is to be used for inter-prediction. Video decoder 30 utilizes the residual to reconstruct the current block from the block used for inter-prediction. In some examples, it may be possible to further reduce the amount of residual information that needs to be signaled. For example, video encoder 20 may further subtract the residual values of the block referred to by the determined disparity vector from the difference between the current block and the block that is used for inter-prediction. This additional subtraction may reduce the amount of residual information that video encoder 20 needs to signal.

For example, video decoder 30 may determine the residual of the current block, which is difference in the pixel values of the current block and the block used for inter-prediction based on the block referred to by the disparity vector of the current block (i.e., via inter-view residual prediction). After video decoder 30 determines the residual for the current block, video decoder 30 may add the residual values to the pixel values of the block used to inter-predict the current block to determine the pixel values of the current block (i.e., inter-prediction decode the current block).

As also described above, in some examples, video encoder 20 and video decoder 30 may utilize the determined disparity vector for the current block for inter-view motion prediction. Inter-view motion prediction refers to identifying the block to which the determined disparity vector refers, and utilizing the motion information of the block to which the determine disparity vector refers as a predictor for predicting the motion information of the current block. For example, the motion vector or vectors of the block to which the determined disparity vector refers may be candidates for advanced motion vector prediction (AMVP) mode or merge/skip mode lists.

In merge/skip mode and AMVP mode, video encoder 20 and video decoder 30 each construct a list of candidate motion vector predictors. Video encoder 20 and video decoder 30 may implement substantially similar techniques to construct respective lists of candidate motion vector predictors such that the candidate motion vector predictors identified in the list are the same for both video encoder 20 and video decoder 30.

For example, in merge/skip mode and AMVP mode, video encoder 20 and video decoder 30 construct the list of candidate motion vector predictors based on motion information of spatially and temporally neighboring blocks. In some examples, video encoder 20 and video decoder 30 may include the motion information of the block referred to by determined disparity vector as another candidate in the list of candidate motion vector predictors. If there is no motion vector for block referred to by the disparity vector, video encoder 20 and video decoder 30 may convert the disparity vector to a disparity motion vector and add the disparity motion vector the list of candidate motion vector predictors.

For both merge/skip mode or AMVP mode, video encoder 20 signals an index into the list of candidate motion vector predictors that video decoder 30 receives. Video decoder 30 then identifies the motion information (e.g., reference pictures and motion vector or vectors) from the signaled index into the list of candidate motion vector predictors, and determines the motion vector for the current block based on the identified motion information.

For example, in merge/skip mode, video decoder 30 receives an index into the list of candidate motion vector predictors and identifies motion information stored in the list of candidate motion vector predictors based on the signaled index. Video decoder 30 determines the reference index, the reference picture list associated with the reference index, and the motion vector from the identified motion information. Video decoder 30 then adopts the determined reference index, the reference picture list associated with the reference index, and the motion vector from the identified motion information as the motion information for the current block. In other words, the current block inherits the motion information of the block identified by the index into the list of candidate motion vector predictors.

In some examples, in merge/skip mode, if the block identified by the index into the list of candidate motion vector predictors refers to a temporally neighboring block, video decoder 30 may not adopt the reference index and reference picture list associated with the reference index. Video decoder 30 may utilize any known technique or any technique that is to be developed to determine the reference index into the reference picture list (e.g., select index zero into one or both of the reference picture lists).

In this way, video decoder 30 may determine the motion information for the current block in merge/skip mode. Again, the motion information for the block identified by the disparity vector may be one of the candidates in the list of candidate motion vector predictors that is identifiable by the index into the list of candidate motion vector predictors. In merge mode, video decoder 30 may also receive residual data between the current block and the block referred to by the determined motion information, and video decoder 30 may utilize the residual data to determine the pixel values of the current block. In skip mode, video decoder 30 may not receive residual data between the current block and the block referred to by the determined motion information. In this example, video decoder 30 may assume the residual data to be zero (i.e., set the pixel values of the current block to be equal to those of the block referred to by the determined motion information).

AMVP mode may be similar to merge/skip mode; however, in addition to receiving an index to the list of candidate motion vector predictors, video decoder 30 may also receive a reference index values for reference picture list(s) from video encoder 20 and motion vector difference(s). The motion vector difference may be the difference in the motion vector between the motion vector of the block identified by the index into the list of candidate motion vector predictors and the actual motion vector of the current block.

For example, video decoder 30 may determine the motion vector of the block identified by the index into the list of candidate motion vector predictors. Video decoder 30 may add or subtract the value of the motion vector of the block identified by the index into the list of candidate motion vector predictors with the signaled motion vector difference to determine the motion vector for the current block. In addition, video decoder 30 may determine the reference picture to which the determined motion vector refers based on the signaled information indicating the reference picture list and the signaled index into that reference picture list.

In this way, video decoder 30 may determine the motion information for the current block in AMVP mode. Similar to merge/skip mode, video encoder 20 and video decoder 30 may include the motion information for the block identified by the determined disparity vector of the current block as one of the candidates in the list of candidate motion vector predictors.

As described above, for merge/skip mode and AMVP mode, video encoder 20 and video decoder 30 construct a list of candidate motion vector predictors. The following describes example ways in which to construct a list of candidate motion vector predictors. As described in more detail, video encoder 20 and video decoder 30 may evaluate the motion information of spatially and temporally neighboring blocks. In some examples, if the motion information of a spatial neighboring block is used to determine the motion information for the current block, the motion information of the spatial neighboring block may be referred to as a spatial motion vector predictor (SMVP). If the motion information of a temporal neighboring block is used to determine the motion information for the current block, the motion information of the temporal neighboring block may be referred to as a temporal motion vector predictor (TMVP). In some examples, video encoder 20 and video decoder 30 may scale the motion vector information of the temporally neighboring block based on the POC value if the motion information of a temporal neighboring block is to be included in the list of candidate motion vector predictors.

Figure 6:
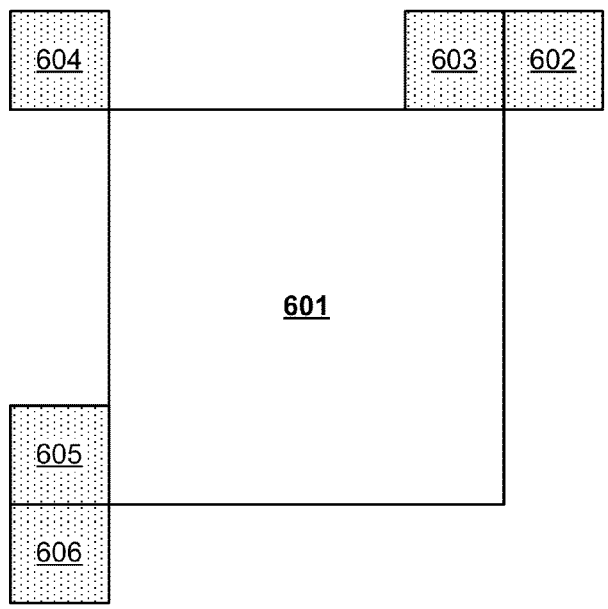
FIG. 6 is a conceptual diagram illustrating a current block and five spatial neighboring blocks.

FIG. 6 shows an example of a current block 601 and five spatial neighboring blocks (602, 603, 604, 605, and 606). In single view video coding, motion information of the five spatial neighbors may be used, for example, to construct an advance motion vector prediction (AMVP)/merge mode candidate list for merge mode or AMVP. Additionally, a temporal neighbor of block 601 may also be used to construct these candidate lists. The temporal neighbor (not shown in FIG. 6) may, for example, be a co-located block in a picture of a different temporal instance, or a co-located block in a picture of the same time instance, but in the a different view. To avoid confusion, the term co-located picture is used to refer to the picture that includes the temporally neighboring block.

In multiview coding, the motion information of spatial neighbors and temporal neighbors can be used to generate the AMVP/merge mode candidate list as in single view coding, but in multiview video coding temporal neighboring blocks may also be found in any reference pictures, including temporal reference pictures of the same view and an inter-view reference picture of a second view. As mentioned above, these pictures of the second view can be used to predict blocks of video data in a first view using a disparity motion vector. According to the techniques of this disclosure, motion information of the five spatial neighboring blocks shown in FIG. 6 as well as motion information of temporal neighboring blocks may be used to determine disparity vectors for a current block of a current picture (e.g. block 601 in FIG. 6).

As will be made clear in the description below, which spatial neighboring blocks and which temporal neighboring blocks are used for determining a disparity vector for the current block can be derived in a flexible manner. A disparity vector for the current block may also be derived in a fixed manner for a given multiview codec. The one or more spatial neighboring blocks may include spatial neighboring blocks which are to be accessed by existing coding tools in two-dimensional (2D) video codecs. In some implementations, the spatial neighboring blocks considered and the order in which the neighboring blocks are considered may be the same as the spatial neighboring blocks for deriving a candidate list as part of an AMVP process defined in HEVC, or be the same as the spatial neighboring blocks for deriving a candidate list for as part of a merge process defined in HEVC. As one example, referring back to FIG. 6 when constructing a candidate list for merge/skip or AMVP, video encoder 20 and video decoder may consider the candidates in the order of block 605 first, then block 603, then block 602, then block 606, and finally block 604.

In FIG. 6, a luma location (xP, yP) specifies the top-left luma sample of block 601 relative to the top-left sample of the current picture that includes block 601. Accordingly, the top-left luma same of a current block, referred to in this examples as PU "N", relative to the top-left sample of the current picture is (xN, yN). Variables nPSW and nPSH denote the width and height of block 601 for luma. In this example, (xN, yN), with N being replaced by 606, 605, 604, 603, and 602 to identify one of blocks 602-606 is defined as (xP−1, yP+nPSH), (xP−1, yP+nPSH−1), (xP+nPSW, yP−1), (xP+nPSW−1, yP−1) or (xP−1, yP−1), respectively. In this manner, video decoder 30 determines the location of the spatially neighboring blocks. According to the techniques of this disclosure, motion information of these spatially neighboring blocks (e.g. blocks 602-606) can be evaluated as part of determining a disparity vector for block 601.

The following description explains ways in which video encoder 20 or video decoder 30 can identify temporal neighboring blocks. If those temporal neighboring blocks were coded using DCP, then the disparity motion vectors used to code the temporal neighboring blocks may be used to determine a disparity vector for the current block. Video encoder 20 and video decoder 30 may identify temporal neighboring blocks by first identifying temporal pictures, and then within the identified temporal pictures, identifying co-located or neighboring blocks. Multiple temporal pictures may be identified, and thus, multiple temporal neighboring blocks may also be identified.

However, in accordance with the techniques described in this disclosure, rather than identifying multiple temporal pictures, video encoder 20 and video decoder 30 may identify two candidate pictures. As described above, the first candidate picture may be a picture whose information is identified in the slice header (e.g., the co-located picture used for TMVP). The second candidate picture may be a RAPVC picture, potentially from a plurality of RAPVC pictures. If a RAPVC picture is not available, then the candidate picture may be the picture with the lowest temporal identification value, possibly from a plurality of pictures that each has the lowest temporal identification value.

In one example, the same picture used for temporal motion vector prediction (TMPV) in HEVC may be used as a first candidate picture for identifying a temporal neighboring block in accordance with the techniques of this disclosure. In HEVC, the picture parameter set (PPS) includes a flag enable_temporal_mvp_flag. When a particular picture with a temporal identification value equal to zero refers to a PPS having enable_temporal_mvp_flag equal to zero, video encoder 20 and video decoder 30 may mark all pictures in the DPB as "unused for temporal motion vector prediction," and no motion vector from picture before that particular picture in decoding order would be used as a temporal motion vector predictor in decoding of the current picture or a picture following the current picture in decoding order.

The co-located picture (which may also be the first candidate picture) used for temporal motion vector prediction in HEVC may be indicated by the collocated_ref_idx index value in one of the reference picture lists for the picture that includes current block to be inter-predicted. The collocated_ref_idx index value may identify a picture in the same view as the picture that includes the block to be inter-predicted, or a picture in a different view as the picture that includes the block to be inter-predicted. In either of these examples, the picture identified by the collocated_ref_idx index value may include one or more temporally neighboring blocks. Video encoder 20 signals a flag (e.g., collocated_from_l0_flag) that indicates whether the co-located picture is identified in RefPicList0 or RefPicList1. For example, if the flag value is 1, then video decoder 30 determines that the co-located picture is identified in RefPicList0, and if the flag value is 0, then video decoder 30 determine that the co-located picture is identified in RefPicList1.

In some examples, for a B slice, video encoder 20 and video decoder 30 may construct a combined list (RefPicListC) based on the finally constructed reference picture lists (RefPicList0 and RefPicList1). Video encoder 20 and video decoder 30 may further modify the combined reference picture list if the modification syntax is present.

A temporal picture, however, is not limited to being the same picture used for temporal motion vector prediction in HEVC. A temporal picture can be any picture in the decoded picture buffer (DPB). A temporal picture typically refers to a picture in the reference picture lists of the current picture or in the decoded picture buffer that belongs to the same view as the current picture. In some cases a temporal picture can also be an inter-view reference picture of the current picture. For example, temporal pictures may include all entries or a subset of entries of reference picture list 0 (RefPicList0) if the current slice is inter-coded and may include all entries or a subset of entries of RefPicList0 and RefPicList1 if the current slice is coded as a B slice.

Once video encoder 20 and video decoder 30 identify the temporal pictures (i.e., candidate pictures) using one or more of the techniques described above, video encoder 20 and video decoder 30 can identify one or more temporal neighboring blocks in the candidate pictures. Video encoder 20 and video decoder 30 may, for example, identify as a temporal neighboring block the co-located block in the temporal picture. A co-located block generally refers to a block that has the same relative location in a temporal picture as the current block has in a current picture.

For example, video encoder 20 and video decoder 30 may determine the location of a co-located largest coding unit (CLCU) in the candidate picture. The CLCU may encompass the same area in the candidate picture that the current block encompasses in the current picture. However, in some examples, the CLCU may encompass a larger area in the candidate picture than the area that the current block encompasses in the current picture. In other words, the CLCU and the current block may encompass the same area in respective pictures, but, in some examples, the CLCU may encompass additional area in the candidate picture.

In some examples, video encoder 20 and video decoder 30 may determine whether the block that is in the center-bottom-right of the CLCU in the candidate picture is inter-predicted with a disparity motion vector, and if so, set that disparity motion vector as the disparity vector for the current block. If, however, the center-bottom-right block of the CLCU in the candidate picture is not inter-predicted with a disparity motion vector, video encoder 20 and video decoder 30 may determine whether a block to the bottom-right of the CLCU is inter-predicted with a disparity motion vector. If so, video encoder 20 and video decoder 30 may set the disparity motion vector as the disparity vector for the current.

In some examples, rather than starting with the center-bottom-right, video encoder 20 and video decoder 30 may start with the block on the bottom-right of the CLCU in the candidate picture, and if the bottom-right block is not inter-predicted with a disparity motion vector, video encoder 20 and video decoder 30 may proceed with the center-bottom-right block. Other examples of neighboring blocks may be possible, and the techniques described in this disclosure should not be considered limited to center-bottom-right block and the bottom-right block. In some examples, video encoder 20 and video decoder 30 may evaluate only the center-bottom-right block within the CLCU and the bottom-right block to the CLCU in the candidate picture.

In some examples, if the neither of these blocks are inter-predicted with a disparity motion vector, video encoder 20 and video decoder 30 may evaluate the next candidate picture. For instance, video encoder 20 and video decoder 30 may start with the first candidate picture and determine whether a neighboring block (i.e., the center-bottom-right block encompassed by the CLCU or the bottom-right block of the CLCU) is inter-predicted with a disparity motion vector. If so, video encoder 20 and video decoder 30 may set the disparity motion vector as the disparity vector of the current block. If not (no disparity motion vector for the neighboring blocks), video encoder 20 and video decoder 30 may evaluate the second candidate picture in a substantially similar manner, where video encoder 20 and video decoder 30 identified the second candidate picture utilizing the example techniques described in this disclosure.

In some examples, video encoder 20 and video decoder 30 may evaluate the center-bottom-right block encompassed by the CLCU of the first candidate picture to determine if the block is inter-predicted with a disparity motion vector. If the block is not inter-predicted with a disparity motion vector, video encoder 20 and video decoder 30 may evaluate the center-bottom-right block encompassed by the CLCU of the second candidate picture to determine if the block is inter-predicted with a disparity motion vector. If the block is not inter-predicted with a disparity motion vector, video encoder 20 and video decoder 30 may evaluate the bottom-right block of the CLCU of the first candidate picture to determine if the block is inter-predicted with a disparity motion vector. If the block is not inter-predicted with the disparity motion vector, video encoder 20 and video decoder 30 may evaluate the bottom-right block of the CLCU of the second candidate picture.

Other permutations and combinations may be possible. For example, video encoder 20 and video decoder 30 may start with the second candidate picture and then proceed to the first candidate picture. As another example, video encoder 20 and video decoder 30 may start with the bottom-right block and then proceed to the center-bottom-right block of the CLCU. Other examples are possible and are contemplated by the techniques of this disclosure.

As described above, video encoder 20 and video decoder 30 may construct a list of candidate motion vector predictors as part of AMVP or merge/skip mode. To construct the list of candidate motion vector predictors, video encoder 20 and video decoder 30 may have stored the motion information. Video encoder 20 and video decoder 30 may apply compression techniques to reduce the amount of motion information that needs to be stored, as well as reduce the memory bandwidth spent on storing and loading motion information for merge/skip mode and AMVP mode. The manner in which video encoder 20 and video decoder 30 store the motion information for spatially neighboring block is described in more detail with respect to FIG. 7.

For temporally neighboring blocks, video encoder 20 and video decoder 30 compress the motion vector by a factor of 16, as one example. For instance, video encoder 20 and video decoder 30 may downsample the motion vector field by a factor of four in both the horizontal and vertical direction. This results in the same motion vector for each 16×16 region. For example, a block size may be 4×4. With compression by a factor of 16, each 4×4 block within the 16×16 region is assigned the same motion vector. In this way, video encoder 20 and video decoder 30 may store one motion vector for the 16 4×4 blocks within a 16×16 region, which results in fewer information that needs to be stored and fewer information that needs to be retrieved, as compared storing motion vectors for all 16 4×4 blocks.

Figure 7:
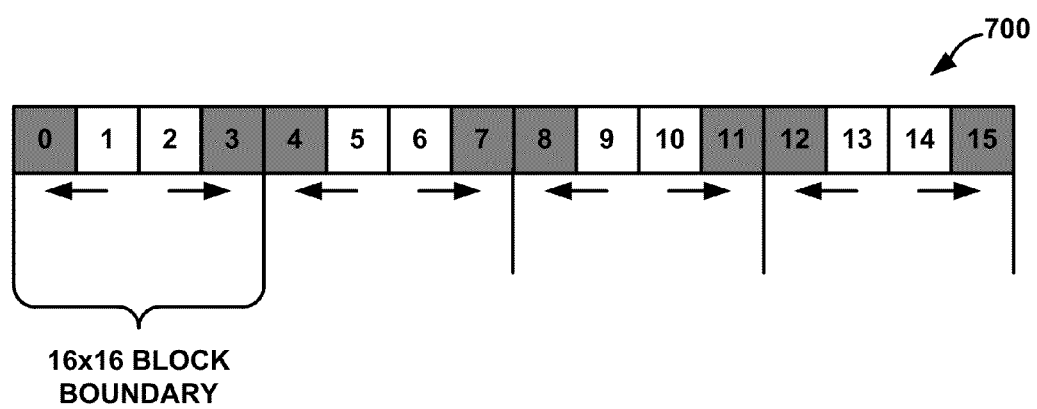
FIG. 7 is a conceptual diagram illustrating a manner in which motion vector information is stored.

FIG. 7 is a conceptual diagram illustrating a manner in which motion vector information is stored. FIG. 7 illustrates line buffer 700. Line buffer 700 stores motion vector for blocks that spatially located above the current block that is to be predicted. Blocks 0-15 in FIG. 7 are each 4×4 blocks.

The motion vector information includes the inter-prediction direction, reference picture index, and motion vector (MV). In some examples, video decoder 30 does not store the motion vector information for each one of blocks 0-15 in line buffer 700. Rather, video decoder 30 stores the motion vector information for two of every four blocks within line buffer 700. This results in 2:1 motion vector information compression for one line, and results in less information that needs to be stored in line buffer 700.

For example, the motion vector information for each one of blocks 0-3 may be different. In this example, although the motion vector information for block 0 and block 1 is different, when storing, the block 0 and block 1 share the same motion vector information, and video decoder 30 stores one set of motion vector information for both of blocks 0 and 1 in line buffer 700. In FIG. 7, the video decoder 30 stores the motion vector information for block 0 as the motion vector information for both block 0 and block 1. In this case, the motion vector information for block 1 may be lost, and the motion vector information for block 0 is preserved.

Similarly, in this example, although the motion vectors for blocks 2 and 3 are different, when storing, blocks 2 and 3 share the same motion vector information, and video decoder 30 may store one set of motion vector information for both of block 2 and block 3 in the line buffer. In some examples, video decoder 30 stores the motion vector information for block 3 as the motion vector for the both blocks 2 and 3. In this case, the motion vector information for block 2 is lost, and the motion vector information for block 3 is preserved.

In other words, for motion vector information compression for line buffer reduction, video decoder 30 does not store the motion vector information for both block 0 and block 1 in line buffer 700. Rather, video decoder 30 stores the motion vector information of block 1 in line buffer 700, and the motion vector information of block 0 may be lost. Similarly, video decoder 30 stores the motion vector information of block 3 in line buffer 700, and the motion vector information of block 2 may be lost.

In FIG. 7, the darkened blocks indicate the blocks whose motion vector information is stored. The arrows indicate the block whose motion vector information is now represented by the stored motion vector information. As illustrated, because the motion vector information for half of the blocks is lost and represented by motion vector information for the other half of the blocks, only half the memory is required in line buffer 700 as compared to the case where the motion vector information for all of the blocks is stored.

In 3D-HEVC, in some cases, deriving the disparity vector based on the IDV may require memory bandwidth two times larger than that for the original compressed vectors. The additional memory bandwidth may be because of the flag of IDV that needs to be stored for every access unit. Also, if the IDV is for a previously coded picture, video encoder 20 and video decoder 30 may need to unnecessarily access the DPB to retrieve the IDV information. Accordingly, in some examples, video encoder 20 and video decoder 30 may not rely on the IDVs of blocks in pictures other than the current picture for deriving the disparity vector, and may remove the IDVs of blocks in picture other than current picture from the DPB.

The techniques described with respect to FIG. 7 are one way for implementing motion vector information compression for spatial neighboring blocks, and downsampling is one way for implementing motion vector information compression for temporal neighboring blocks. There may be other ways for implementing motion vector information compression, and the techniques described in this disclosure are not limited to any specific way for implementing motion vector information compression.

As described above, the techniques described in this disclosure are directed to the manner in selecting candidate pictures based on whether a picture is a RAPVC picture and/or based on the temporal identification value of a picture. The following describes an example manner in which to determine the candidate pictures that may require more processing than the techniques described in this disclosure.

In these other techniques (i.e., techniques not in accordance with the techniques described in this disclosure), video encoder 20 and video decoder 30 may construct a candidate picture list. All the reference picture from the current view may be treated as candidate pictures, in contrast to the techniques described in this disclosure where two pictures may be candidate pictures. In these other techniques, video encoder 20 and video decoder 30 may first insert the co-located reference picture in the candidate picture list, followed by the rest of candidate pictures in the ascending order of reference index. When the reference pictures with the same reference index in both reference picture lists are available, the one in the same reference picture list of the co-located picture precedes the other one.

Figure 8:
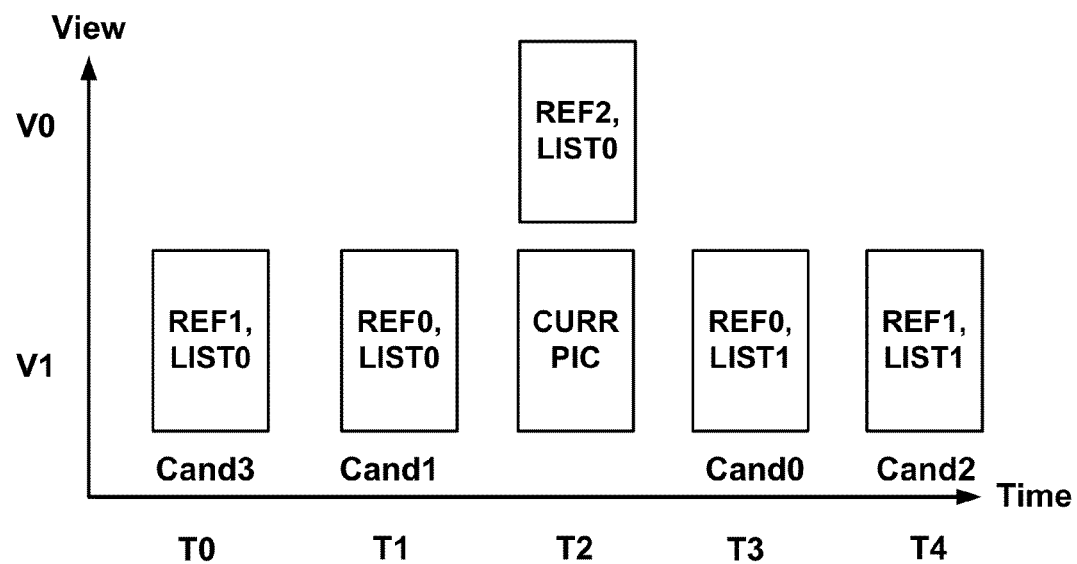
FIG. 8 is a conceptual diagram illustrating an example of a candidate picture list construction process in accordance with some other techniques.

FIG. 8 is a conceptual diagram illustrating an example of a candidate picture list construction process in accordance with techniques that are not necessarily techniques that video encoder 20 and video decoder 30 implement. As illustrated, the current picture is located in view V1 at time T2. The current picture includes the current block to be inter-predicted. The current picture includes two types of reference pictures (i.e., temporal reference pictures in view V1, and inter-view reference picture in view V0). The co-located picture at time T3, view V1 is denoted by Ref0, List1 (as signaled by video encoder 20). In these other techniques, the final candidate picture list will be picture at T3, followed by picture at T1, followed by picture at T4, and then picture at T0, and all of them are from view V1.

In these other techniques, for each candidate picture in the candidate picture list, video encoder 20 and video decoder 30 may evaluate three candidate regions for deriving the temporal neighboring blocks. The first region is the co-located region of the current PU or current CU (i.e., of the current block), and is referred to as CPU. The second region is the largest coding unit (LCU) covering the co-located region of the current PU (i.e., of the current block), and is referred to as CLCU. The third region is bottom-right 4×4 block of the CPU, and is referred to as BR.

In these other techniques, because smaller block in a 16×16 block share the same motion information as a result of motion compression, video encoder 20 and video decoder 30 may evaluate only one sample block for a disparity motion vector to determine the disparity vector for the current block. If a region covers more than one 16×16 block, video encoder 20 and video decoder 30 may evaluate all of the 16×16 blocks in the region in raster scan order.

In some examples, including for the example techniques described in this disclosure, video encoder 20 and video decoder 30 may first check spatially neighboring blocks to determine whether any of the spatially neighboring blocks are inter-predicted with a disparity motion vector. If no spatially neighboring blocks are inter-predicted with a disparity motion vector, video encoder 20 and video decoder 30 may proceed with temporal neighboring blocks of the picture identified in the candidate list of pictures. For example, for each candidate picture in the candidate picture list, video encoder 20 and video decoder 30 may first check the CPU, CLCU, and BR for the first non-base view, or BR, CPU, CLCU for the second non-base view.

In the techniques described in this disclosure, the number of candidate pictures to evaluate may be limited to two pictures (i.e., the candidate picture list includes two pictures), which reduces the number of pictures that need to be accessed and evaluated as compared to some other techniques. Moreover, rather than checking three regions within each of the candidate pictures, video encoder 20 and video decoder 30 may evaluate two regions (e.g., the center-bottom-right and bottom-right blocks within the candidate pictures) to determine whether either is inter-predicted with a disparity motion vector, which reduces the number of regions to evaluate.

As described above, a disparity motion vector of a spatial neighboring block that is used to determine the disparity vector for the current block is referred to as a spatial disparity vector (SDV), and a disparity motion vector of a temporal neighboring block that is used to determine the disparity vector for the current block is referred to as a temporal disparity vector (TDV). As also described above, in some examples, video encoder 20 and video decoder 30 may utilize a derived disparity vector of a neighboring block as the disparity vector for the current block, such a derived disparity vector is referred to as an implicit disparity vector (IDV). In general, the techniques for determining the disparity vector from neighboring blocks are referred to as neighboring block based disparity vector (NBDV) generation.

As described above, the techniques described in this disclosure may be considered as part of the NBDV generation. For instance, in the NBDV generation, motion vector of neighboring blocks are accessed and evaluated for purposes of deriving a disparity vector for a current block of a current picture by determining whether these blocks are inter-predicted with disparity motion vectors.

The techniques described in the disclosure may be for the NBDV generation, but where the candidate pictures that are accessed and evaluated being limited to two candidate pictures (e.g., a first candidate picture that is the co-located picture for the TMVP, and a second candidate picture that is selected using the techniques described in this disclosure). For example, in applying the NBDV generation process, video encoder 20 and video decoder 30 may select a candidate picture to determine if a block in the candidate picture is inter-view predicted with a block in a view other than a view that includes the candidate picture of the multiview video data. The disparity vector for the current block determined from the techniques described in this disclosure may be part of the NBDV generation.

Referring back to the IDV, assume that a block is inter-predicted with motion compensation prediction (MCP). In this example, the block may not include an explicit disparity motion vector generated by disparity compensation prediction (DCP). However, during the inter-prediction of this block, video encoder 20 and video decoder 30 may have derived a disparity vector using the techniques described in this disclosure for inter-view motion prediction or inter-view residual prediction (as two example coding tools). Video encoder 20 and video decoder 30 may not discard this derived disparity vector, which is referred to as the implicit disparity vector (IDV). Rather, video encoder 20 and video decoder 30 may store the IDV for inter-prediction of subsequent blocks. However, in some examples, video encoder 20 and video decoder 30 may discard the IDVs for blocks of a picture other than the current picture.

In some examples, to determine the disparity vector for the current block, video encoder 20 and video decoder 30 may implement the following steps. If in any of the following steps, video encoder 20 and video decoder 30 determine a disparity vector, video encoder 20 and video decoder 30 may cease the steps for determining the disparity vector for the current block.

Referring to FIG. 4, video encoder 20 and video decoder 30 may first evaluate the five spatial neighboring blocks in order of blocks 605, 603, 602, 606, and 604 to determine whether any of these blocks are inter-predicted with a disparity motion vector. As soon as video encoder 20 and video decoder 30 identify a block that is inter-predicted with a disparity motion vector, the disparity motion vector is converted to a disparity vector for the current block. If the spatial neighboring blocks contain IDVs, video encoder 20 and video decoder 30 may mark as the IDV flags for these blocks as "IDV used" and may store the associated values.

If no disparity motion vector is found, video encoder 20 and video decoder 30 may determine whether TMVP is enabled. When TMVP is enabled, if the current coding mode is AMVP, the reference picture with the target reference index (collocated_ref_idx) in the target reference picture list (flag value of collocated_from_l0_flag), as signaled by video encoder 20, is used as the co-located picture. Video encoder 20 and video decoder 30 identify two blocks in the co-located picture (i.e., the bottom right block of the co-located block (BR) and the center block of the co-located block (CB)). Video encoder 20 and video decoder 30 evaluate these blocks in the following order.

Video encoder 20 and video decoder 30 may first evaluate the BR block to determine whether the BR block is inter-predicted with a disparity motion vector. If so, the disparity motion vector is converted to the disparity vector of the current block. Otherwise, if the BR block is inter-predicted as the skip mode and contains an IDV (i.e., the flag of IDV is equal to 1), video encoder 20 and video decoder 30 mark the BR block as "IDV used" and store the associated IDV.

If the IDV flag is not equal to 1 for the BR block (and in some examples, even if the IDV flag is equal to 1 for the BR block), video encoder 20 and video decoder 30 may evaluate the CB block to determine whether the CB block is inter-predicted with a disparity motion vector. If so, video encoder 20 and video decoder 30 convert the disparity motion vector to the disparity vector of the current block. Otherwise, if the CB block is inter-predicted as skip mode and contains an IDV (i.e., the flag of IDV is equal to 1), video encoder 20 and video decoder 30 mark the CB block as "IDV used" and store the associated IDV.

If the current coding mode is skip/merge, video encoder 20 and video decoder 30 may utilize the two co-located reference pictures in each reference picture list, if applicable, with the reference index set equal to the one of the left neighboring block or zero. For each of the co-located picture in the RefPicList0 and RefPicList1, video encoder 20 and video decoder 30 may perform the above steps in order.

If one of the five spatial neighboring blocks is inter-predicted as a skip mode and contains an IDV (i.e., the flag marked as "IDV used"), video encoder 20 and video decoder 30 convert he IDV to the disparity vector of the current block. The checking order may be blocks 606, 605, 602, 603, and then 604 (FIG. 6). If TMVP is enabled, there may be one block in the co-located picture. In this case, video encoder 20 and video decoder 30 may mark the BR or CB block as "IDV used," and cover the associated IDV to the disparity vector of the current block.

In accordance with the techniques described in this disclosure, video encoder 20 and video decoder 30 may implement an algorithmic process for applying the NBDV generation process, which includes selecting candidate pictures that video encoder 20 and video decoder 30 access and evaluate to determine if a block in the candidate picture is inter-view predicted with a block in a view other than a view that includes the candidate picture (e.g., whether a block in these candidate pictures are inter-predicted with a disparity motion vector). For example, the first candidate picture may be a picture whose information video encoder 20 signals to video decoder 30 in a slice header. Video decoder 30 may include information of this first candidate picture in a list of candidate pictures.

Video encoder 20 and video decoder 30 may respectively implement the techniques described in this disclosure to identify a second candidate picture. For example, video encoder 20 and video decoder 30 may identify one of a random access point view component (RAPVC) picture and a picture with a lowest temporal identification value. In some examples, video encoder 20 and video decoder 30 may first determine if a RAPVC picture is available in the DPB, among pictures identified in a reference picture list, among pictures identified in a reference picture set (RPS), or among pictures identified in the RPS that can be used to inter-predict the current picture.

If one RAPVC picture is available, video encoder 20 and video decoder 30 may select the RAPVC picture as the second candidate picture (e.g., include the RAPVC picture in the list of candidate pictures). In some examples, video encoder 20 and video decoder 30 may prefer a RAPVC picture that is inter-predicted.

If more than one RAPVC picture is available, video encoder 20 and video decoder 30 may determine the relative distances of the RAPVC pictures to the current picture based on display or output order, and select the RAPVC picture that is closest to the current picture as the second candidate picture. If two RAPVC pictures are equally distant to the current picture, video encoder 20 and video decoder 30 may select the picture based on the position of the first candidate picture to the current picture.

If no RAPVC pictures are available, video encoder 20 and video decoder 30 may select a picture from the DPB, among pictures identified in a reference picture list, among pictures identified in the RPS, among picture identified in the RPS that can be used to inter-predict the current picture with the lowest temporal identification value, or among picture identified in a reference picture list. If there is only one picture with the lowest temporal identification value, video encoder 20 and video decoder 30 may select that picture as the second candidate picture. If there are more than one picture with the lowest temporal identification value, video encoder 20 and video decoder 30 may select the picture with the lowest temporal identification value that is closest to the current picture in terms of display or output order. If two pictures with the lowest temporal identification value are equally distance to the current picture, video encoder 20 and video decoder 30 may select the picture based on the position of the first candidate picture to the current picture.

After video encoder 20 and video decoder 30 select the two candidate pictures, video encoder 20 and video decoder 30 may evaluate the selected candidate pictures to determine whether a block in the candidate pictures is inter-predicted with a disparity motion vector. The disparity motion vector refers to a block in a view other than the view that includes the selected candidate pictures. For example, video encoder 20 and video decoder 30 may start with the first candidate picture, and determine whether a block in the first candidate picture is inter-predicted with a disparity motion vector. If a block in the first candidate picture is inter-predicted with a disparity motion vector, video encoder 20 and video decoder 30 may determine the disparity vector for the current block based on the disparity motion vector (e.g., convert the disparity motion vector to the disparity vector).

If, from among the blocks that are evaluated, there is no block in the first candidate picture that is inter-predicted with a disparity vector, video encoder 20 and video decoder 30 may evaluate blocks in the second candidate picture. If a block in the second candidate picture is inter-predicted with a disparity motion vector, video encoder 20 and video decoder 30 may determine the disparity vector for the current block based on the disparity motion vector (e.g., convert the disparity motion vector to the disparity vector). In this example, video encoder 20 and video decoder 30 started with the first candidate picture, and then proceed to the second candidate picture if a disparity motion vector was not found.

In some examples, video encoder 20 and video decoder 30 may start with the second candidate picture, and then proceed to the first candidate picture if a disparity motion vector is not found. In some examples, video encoder 20 and video decoder 30 may start with one block in the first or second candidate picture, and if that block is not inter-predicted with a disparity motion vector, may proceed to a block in the other one of the first or second candidate picture, rather than evaluating all blocks in one of the candidate pictures before proceeding to the next picture.

In accordance with the techniques described in this disclosure, video encoder 20 and video decoder 30 need not necessarily evaluate every single block within the candidate pictures. Rather, video encoder 20 and video decoder 30 may evaluate a pre-determined pattern of blocks within the candidate pictures to determine whether a block, within the pre-determined pattern of blocks, is inter-predicted with a disparity motion vector. In some examples, the search pattern may be any pattern reduced from all blocks in the largest coding unit (LCU) covering the co-located region (CLCU) and co-locate region of the current block (e.g., current PU or CU), referred to as CPU.

For example, the current block may be encompassed within an LCU or may be an LCU within the current picture. The CLCU refers to the portion in the candidate picture that encompasses the same area in the candidate picture that the LCU that includes the current picture encompasses in the current picture. In other words, the CLCU and LCU are located in the same relative position within respective pictures, where the CLCU is in the candidate picture and the LCU is in the current picture.

The CPU is similar to the CLCU, but encompasses the same region in the candidate picture that the current picture encompasses in the current picture. In some examples, the CPU may be part of the CLCU similar to the current block (e.g., a current PU or CU) being part of the LCU in the current picture.

In some examples, video encoder 20 and video decoder 30 may evaluate the four corner blocks of both the CLCU and CPU in the candidate pictures to determine whether any of these blocks is inter-predicted with a disparity motion vector. In some examples, video encoder 20 and video decoder 30 may evaluate the center block of the CLCU and CPU in the candidate pictures to determine whether any of these blocks is inter-predicted with a disparity motion vector.

In some examples, video encoder 20 and video decoder 30 may evaluate only the top-left and bottom-right blocks (e.g., −45 degree diagonal blocks) of the CLCU and CPU in the candidate pictures to determine whether any of these blocks is inter-predicted with a disparity motion vector. In some examples, video encoder 20 and video decoder 30 may evaluate only the top-right and bottom-left blocks (e.g., 45 degree diagonal blocks) of the CLCU and CPU in the candidate pictures to determine whether any of these blocks is inter-predicted with a disparity motion vector.

In some examples, video encoder 20 and video decoder 30 may evaluate the 45 degree diagonal blocks of the CLCU, and evaluate the −45 degree diagonal blocks of the CPU. In some examples, video encoder 20 and video decoder 30 may evaluate the −45 degree diagonal blocks of the CLCU, and evaluate the 45 degree diagonal blocks of the CPU. In some examples, video encoder 20 and video decoder 30 may evaluate only the bottom-right blocks of the CLCU and the CPU.

Figure 9:
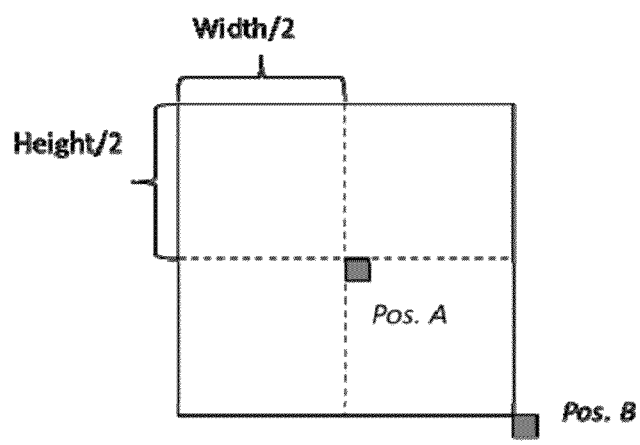
FIG. 9 is a conceptual diagram illustrating a co-located region in a candidate picture.

In some examples, as illustrated in FIG. 9, video encoder 20 and video decoder 30 may evaluate a center-bottom-right block (pos. A) in FIG. 9 and a bottom-right block (pos. B) in FIG. 9. The center-bottom-right block is the block where the coordinates of the top-left corner of the center-bottom-right block is the center of the area encompassing the center-bottom-right block, and the bottom-right corner of the center-bottom-right block extends rightward and downward from the center of the area encompassing the center-bottom-right block.

FIG. 9 is a conceptual diagram illustrating a co-located region in a candidate picture. The block illustrated in FIG. 9 may be the CLCU or the CPU. In some examples, video encoder 20 and video decoder 30 may first evaluate the center-bottom-right block to determine whether the center-bottom-right block is inter-predicted with a disparity motion vector. If the center-bottom-right block is not inter-predicted with a disparity motion vector, video encoder 20 and video decoder 30 may then evaluate the bottom-right block to determine whether the bottom-right block is inter-predicted with a disparity motion vector. In some examples, video encoder 20 and video decoder 30 may first evaluate the bottom-right block, and then evaluate the center-bottom-right block if the bottom-right block is not inter-predicted with a disparity motion vector.

In some examples, video encoder 20 and video decoder 30 may only evaluate the center-bottom-right block and the bottom-right block of a CPU, and not of the CLCU. In these examples, no further access to the CLCU may be needed.

It should be understood that the above examples of the blocks that video encoder 20 and video decoder 30 evaluate are provided for purposes of illustration only, and should not be considered limiting. For example, the order in which video encoder 20 and video decoder 30 evaluate the blocks in the candidate pictures may be a function of various conditions such as a view_id of the current view, a coding mode, or other such conditions. Moreover, video encoder 20 and video decoder 30 may implement any combination or permutation of the above example techniques. In some examples, video encoder 20 and video decoder 30 may implement a subset of the example techniques (e.g., evaluate four corner blocks of the CPU, but not of the CLCU, or vice-versa, as one example).

Furthermore, as described above, video encoder 20 and video decoder 30 may first identify the candidate pictures, and then evaluate blocks within the candidate pictures to determine whether a block in the candidate pictures is inter-predicted with a disparity motion vector which can be converted to the disparity vector of the current block. In some examples, video encoder 20 and video decoder 30 may first identify blocks that are to be evaluated, and then determine whether the blocks to be evaluated are blocks within pictures that meet the criteria of the first and second candidate pictures.

In this way, the techniques described in this disclosure may be considered as simplifying the process of determining TDVs for the NBDV generation process. For example, there may be fewer candidate pictures that video encoder 20 and video decoder 30 need to identify as compared to some other techniques. Also, video encoder 20 and video decoder 30 may need to evaluate a subset of blocks in the selected candidate pictures to determine whether any of these blocks is inter-predicted with a disparity motion vector.

In some examples, by implementing the techniques described in this disclosure, there may be no need for video encoder 20 and video decoder 30 to consider IDVs for applying the NBDV generation process, and thus no IDVs need to be stored and accessed. However, the techniques described in this disclosure may still be applicable even if IDVs are identified and stored. In some examples, where IDVs are identified and stored, the techniques described in this disclosure may limit the IDVs that need to be stored to only for IDVs for the current picture or for pictures in the same access unit as the current picture. In this case, the IDVs may not need to be stored in any of the pictures or view components in the DPB. However, the IDVs may be stored for spatial neighboring blocks.

Some cases, if the IDV is not used, more TDVs may need to be checked. In the techniques described in this disclosure, to limit the number of TDVs that need to be checked, video encoder 20 and video decoder 30 may access and evaluate up to two candidate pictures (i.e., a number of candidate pictures that are accessed and evaluated is limited to two). Moreover, the above techniques describe the manner in which video encoder 20 and video decoder 30 select the first and second candidate pictures. In some examples, video encoder 20 and video decoder 30 may select the second candidate picture that is different than the first candidate picture so that different pictures are accessed and evaluated.

Figure 10:
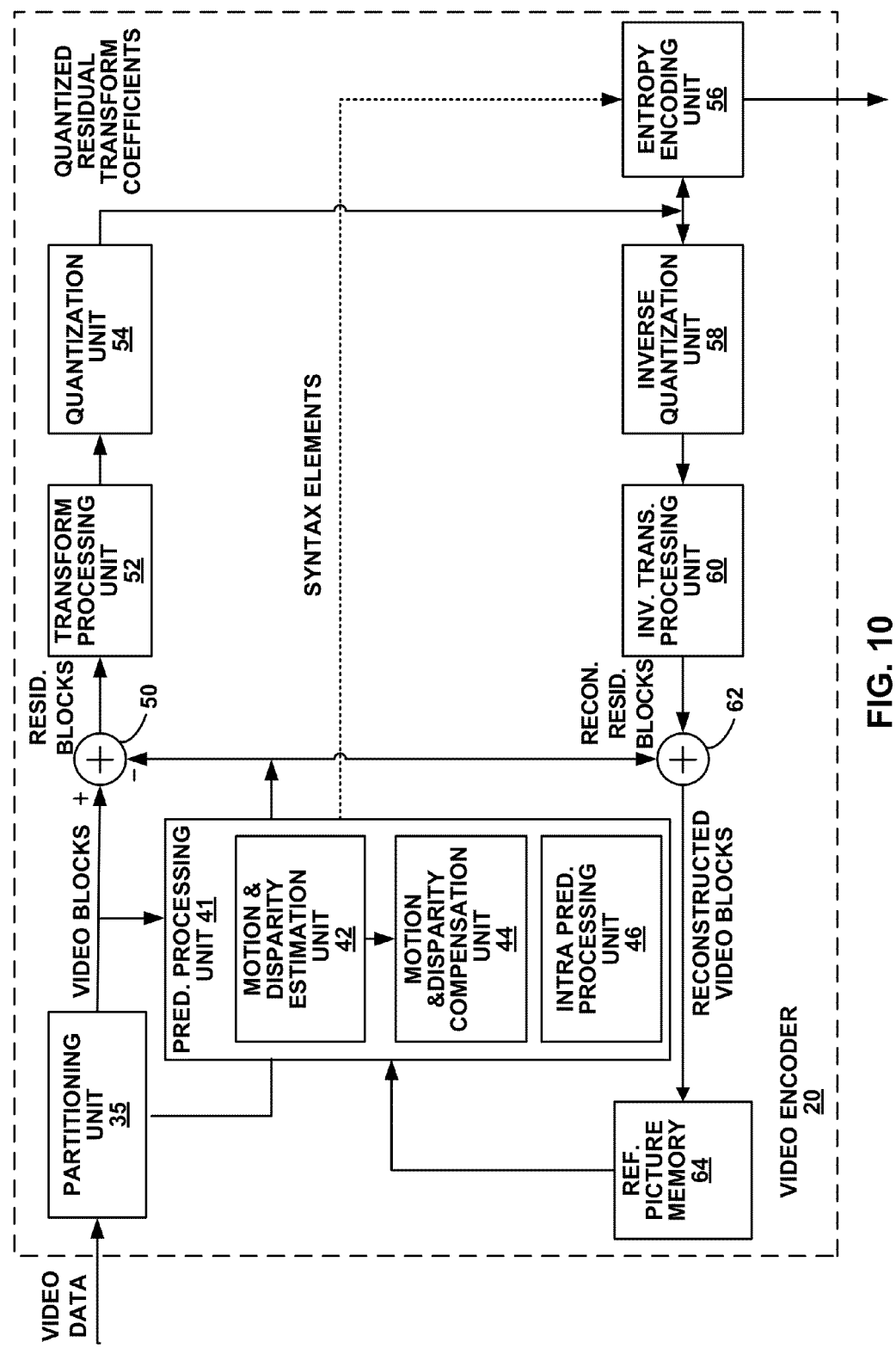
FIG. 10 is a block diagram illustrating an example video encoder that may implement the techniques described in this disclosure.

FIG. 10 is a block diagram illustrating an example video encoder 20 that may implement the techniques described in this disclosure. Video encoder 20 may perform intra-coding (i.e., intra-prediction encoding) and inter-coding (i.e., inter-prediction encoding) of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. For multiview video coding, inter-coding also relies on prediction across different views to reduce or remove redundancy in video within frames or pictures of a video sequence that are displayed at the same time. Intra-mode (I mode) may refer to any of several spatial based compression modes. Inter-modes, such as uni-directional prediction (P mode) or bi-prediction (B mode), may refer to any of several temporal or view-based compression modes.

In the example of FIG. 10, video encoder 20 includes a partitioning unit 35, prediction processing unit 41, reference picture memory 64, summer 50, transform processing unit 52, quantization unit 54, and entropy encoding unit 56. Prediction processing unit 41 includes motion and disparity estimation unit 42, motion and disparity compensation unit 44, and intra-prediction processing unit 46. Reference picture memory 64 is one example of a decoded picture buffer (DPB) of video encoder 20.

For video block reconstruction, video encoder 20 also includes inverse quantization unit 58, inverse transform processing unit 60, and summer 62. A deblocking filter (not shown in FIG. 10) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 10, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-coding modes or one of a plurality of inter-coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion and disparity estimation unit 42 and motion and disparity compensation unit 44 within prediction processing unit 41 perform inter-predictive coding and/or interview coding of the current video block relative to one or more predictive blocks in one or more reference pictures and/or reference views to provide temporal or view compression.

Motion and disparity estimation unit 42 may be configured to determine the inter-prediction mode and/or interview prediction mode for a video slice according to a predetermined pattern for a video sequence. The predetermined pattern may designate video slices in the sequence as P slices, or B slices. Motion and disparity estimation unit 42 and motion and disparity compensation unit 44 may be highly integrated, but are illustrated separately for conceptual purposes. Motion and disparity estimation, performed by motion and disparity estimation unit 42, is the process of generating motion vectors, which estimate motion for video blocks. A motion vector, for example, may indicate the displacement of a PU of a video block within a current video frame or picture relative to a predictive block within a reference picture. Disparity estimation, performed by motion and disparity estimation unit 42, is the process of generating disparity motion vectors, which may be used to predict a currently coded block from a block in a different view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 42 may perform a motion search relative to the full pixel positions and fractional pixel positions and output a motion vector with fractional pixel precision.

Motion and disparity estimation unit 42 calculates a motion vector (for motion compensated prediction) and/or a disparity motion vector (for disparity compensated prediction) for a PU of a video block in an inter-coded or interview predicted slice by comparing the position of the PU to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 42 sends the calculated motion vector and/or disparity vector to entropy encoding unit 56 and motion compensation unit 44.

Motion compensation and/or disparity compensation, performed by motion and disparity compensation unit 44, may involve fetching or generating the predictive block based on the motion vector determined by motion estimation and/or disparity estimation, possibly performing interpolations to sub-pixel precision. Upon receiving the motion vector and/or disparity for the PU of the current video block, motion and disparity compensation unit 44 may locate the predictive block to which the motion vector and/or disparity vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 44 may also generate syntax elements associated with the video blocks and the video slice for use by video decoder 30 in decoding the video blocks of the video slice.

In some examples, prediction processing unit 41 may be configured to generate the reference picture set (RPS) or reference picture list(s) for the current picture. As described above, the RPS includes pictures that can be used to inter-predict the current picture and the pictures following the current picture in decoding order. Also, among the pictures in the RPS, some pictures may be used to only inter-predict pictures following the current picture in decoding order, and the other pictures may be used to inter-predict the current picture and the pictures following the current picture in decoding order.

As described above, the techniques described in this disclosure may be utilized as part of inter-view motion prediction and inter-view residual prediction based on the disparity vector determined in accordance with the techniques described in this disclosure. In some examples, prediction processing unit 41 may be configured to implement the inter-view motion prediction and inter-view residual prediction techniques described in this disclosure. For example, prediction processing unit 41 may construct the list of candidate motion vector predictors for AMVP and merge mode.

For some blocks, prediction processing unit 41 may select an intra-prediction mode instead of an inter-prediction mode. Intra-prediction processing unit 46 may intra-predict a current block, as an alternative to the inter-prediction performed by motion and disparity estimation unit 42 and motion and disparity compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied by transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion and disparity estimation unit 42 and motion and disparity compensation unit 44 as a reference block to inter-predict a block in a subsequent video frame or picture.

In this manner, video encoder 20 represents an example of a video encoder that encodes a bitstream that includes multi-view video data that includes multiple views. For example, video encoder 20 may apply a neighboring block based disparity vector (NBDV) generation process for purposes of deriving a disparity vector for a current block of a current picture. The NBDV generation process may rely on motion vectors of neighboring blocks for deriving the disparity vector for the current block of the current picture relative to another view of the multiview video data.

Video encoder 20 may construct a list of candidate pictures. The first candidate picture in the list may be a picture whose information video encoder 20 signals in the slice header of a slice of the current picture that video decoder 30 can use to identify the first candidate picture. The second candidate picture in the list may be a picture that video encoder 20 selects utilizing the techniques described in this disclosure.

For example, to apply the NBDV generation process, video encoder 20 may select a candidate picture to determine if a block in the candidate picture is inter-view predicted with a block in a view other than a view that includes the candidate picture of the multiview video data. The candidate picture may be from one of one or more random access point view component (RAPVC) pictures, and one or more pictures having a lowest temporal identification value. This candidate picture may be one of two candidate pictures, where video encoder 20 generates for output (i.e., signals) information indicative of the other candidate picture in a slice header (e.g., the co-located picture used for TMVP as part of AMVP or merge/skip mode). These two candidate pictures may be pictures in a list of candidate pictures, and may be different from one another. For instance, a number of candidate pictures may be limited to no more than two candidate pictures including the first candidate picture and the second candidate picture.

In some examples, video encoder 20 may select the candidate picture from one of the one or more RAPVC pictures identified in at least one of a decoded picture buffer (DPB), a reference picture set (RPS), pictures among the RPS that can be used to inter-predict the current picture, and a reference picture list of the current picture (e.g., in a reference picture list other than the reference picture list that includes the first candidate picture, in the same reference picture list that includes the first candidate picture, or in both reference picture lists). In some examples, video encoder 20 may select the candidate picture from one of the one or more pictures having the lowest temporal identification value identified in at least one of the DPB, RPS, the pictures among the RPS that can be used to inter-predict the current picture, and the reference picture list of the current picture (e.g., in a reference picture list other than the reference picture list that includes the first candidate picture, in the same reference picture list that includes the first candidate picture, or in both reference picture lists).

Video encoder 20 may determine whether a video block in the selected candidate picture is inter-predicted with a disparity motion vector. Video encoder 20 may determine a disparity vector for a current block of a current picture, as part of the NBDV generation, based on the disparity motion vector if the video block in the selected candidate picture is inter-predicted with the disparity motion vector.

Video encoder 20 may inter-prediction encode the current block based on the determined disparity vector. For example, video encoder 20 may inter-prediction encode the current block as part of inter-view motion prediction, or part of inter-view residual prediction.

In some examples, to select the candidate picture, video encoder 20 may determine whether one or more RAPVC pictures are available (e.g., available in a first or second reference picture list). Video encoder 20 may select the candidate picture from the one or more RAPVC pictures if the one or more RAPVC pictures are available. Video encoder 20 may select the candidate picture from one or more pictures having the lowest temporal identification value in the first or second reference picture list if the one or more RAPVC pictures are not available.

If there is only one RAPVC picture or only one picture having the lowest temporal identification value, video encoder 20 may select that RAPVC picture or that picture having the lowest temporal identification value as the candidate picture. If there are a plurality of RAPVC pictures or a plurality of pictures having the lowest temporal identification value, video encoder 20 may select a RAPVC picture from the plurality of RAPVC pictures or a picture having the lowest temporal identification value from the plurality of pictures having the lowest temporal identification value, as the candidate picture, that is closest in distance based on display or output order to the current picture.

If there are two RAPVC pictures or two pictures having the lowest temporal identification value that are equally distant from the current picture, video encoder 20 may select the RAPVC picture from the two RAPVC pictures or select the picture having the lowest temporal identification value from the two pictures having the lowest temporal identification value based on a position of another candidate picture relative to the current picture. For example, if the other candidate picture is after the current picture in display or output order, video encoder 20 may select the RAPVC picture or the picture having the lowest temporal identification value that is before the current picture in display or output order as the candidate picture (or alternatively, that is after the current picture in display or output order). If the other candidate picture is before the current picture in display or output order, video encoder 20 may select the RAPVC picture or the picture having the lowest temporal identification value that is after the current picture in display or output order as the candidate picture (or alternatively, that is before the current picture in display or output order).

In some examples, video encoder 20 may not rely on the temporal identification value to select the second candidate picture, and may instead select the picture from the reference picture list (e.g., the first or second reference picture list) that is closest to the current picture based on the POC values. If two pictures are equally close, video encoder 20 may select the picture to the left of the current picture as the candidate picture. Alternatively, video encoder 20 may select the picture to the right of the current picture as the candidate picture.

Figure 11:
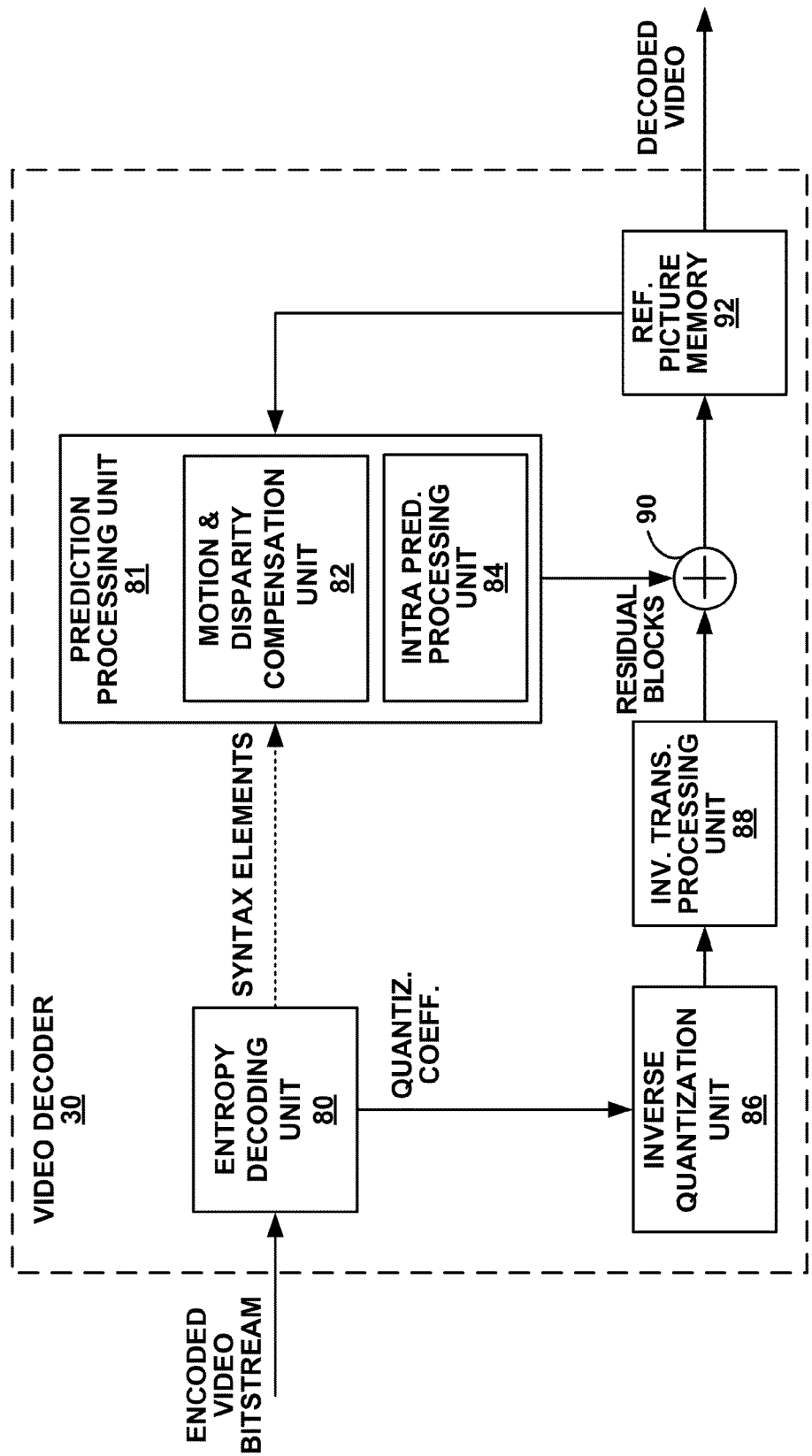
FIG. 11 is a block diagram illustrating an example video decoder that may implement the techniques described in this disclosure.

FIG. 11 is a block diagram illustrating an example video decoder 30 that may implement the techniques described in this disclosure. In the example of FIG. 11, video decoder 30 includes an entropy decoding unit 80, prediction processing unit 81, inverse quantization unit 86, inverse transform processing unit 88, summer 90, and reference picture memory 92. Reference picture memory 92 is one example of the decoded picture buffer (DPB) of video encoder 30.

Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 10.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B or P) slice or interview predicted slice, motion and disparity compensation unit 82 of prediction processing unit 81 produces predictive blocks for a video block of the current video slice based on the temporal motion vectors, disparity motion vectors and other syntax elements received from entropy decoding unit 80. The predictive blocks may be produced from one of the reference pictures within one of the reference picture lists. Video decoder 30 may construct the reference frame lists, RefPicList0 and RefPicList1, using default construction techniques based on reference pictures stored in reference picture memory 92.

Motion and disparity compensation unit 82 determines prediction information for a video block of the current video slice by parsing the motion vectors and other syntax elements, and uses the prediction information to produce the predictive blocks for the current video block being decoded. For example, motion and disparity compensation unit 82 uses some of the received syntax elements to determine a prediction mode (e.g., intra- or inter-prediction) used to code the video blocks of the video slice, an inter-prediction or interview prediction slice type (e.g., B slice or P slice), construction information for one or more of the reference picture lists for the slice, motion vectors and/or disparity vectors for each inter-encoded video block of the slice, inter-prediction status for each inter-coded video block of the slice, and other information to decode the video blocks in the current video slice.

In some examples, motion and disparity compensation unit 82 may determine the signaled syntax elements indicating motion vectors using a motion vector prediction process. The motion vector prediction processes may include an AMVP mode and a merge mode. Motion and disparity compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion and disparity compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion and disparity compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 represents an example of a video decoder for multiview coding configured to implement the example techniques described in this disclosure. For example, video decoder 30 may decode a bitstream that includes multiview video data that includes multiple views.

Video decoder 30 may construct a list of candidate pictures. The first candidate picture in the list may be a picture whose information video encoder 20 signals in the slice header of a slice of the current picture that video decoder 30 can use to determine the first candidate picture. The second candidate picture in the list may be a picture that video decoder 30 selects utilizing the techniques described in this disclosure.

For example, to apply the NBDV generation process, video decoder 30 may select a candidate picture to determine if a block in the candidate picture is inter-view predicted with a block in a view other than a view that includes the candidate picture of the multiview video data. The candidate picture may be from one of one or more random access point view component (RAPVC) pictures, and one or more pictures having a lowest temporal identification value. This candidate picture may be one of two candidate pictures, where video decoder 30 receives information indicative of the other candidate picture in a slice header (e.g., the co-located picture used for TMVP as part of AMVP or merge/skip mode). These two candidate pictures may be pictures in a list of candidate pictures, and may be different from one another. For instance, a number of candidate pictures may be limited to no more than two candidate pictures including the first candidate picture and the second candidate picture.

In some examples, video decoder 30 may select the candidate picture from one of the one or more RAPVC pictures identified in at least one of a decoded picture buffer (DPB), a reference picture set (RPS), pictures among the RPS that can be used to inter-predict the current picture, and a reference picture list of the current picture (e.g., in a reference picture list other than the reference picture list that includes the first candidate picture, in the same reference picture list that includes the first candidate picture, or in both reference picture lists). In some examples, video decoder 30 may select the candidate picture from one of the one or more pictures having the lowest temporal identification value identified in at least one of the DPB, RPS, the pictures among the RPS that can be used to inter-predict the current picture, and the reference picture list of the current picture (e.g., in a reference picture list other than the reference picture list that includes the first candidate picture, in the same reference picture list that includes the first candidate picture, or in both reference picture lists).

Video decoder 30 may determine whether a video block in the selected candidate picture is inter-predicted with a disparity motion vector. Video decoder 30 may determine a disparity vector for a current block of a current picture, as part of the NBDV generation, based on the disparity motion vector if the video block in the selected candidate picture is inter-predicted with the disparity motion vector.

Video decoder 30 may inter-prediction decode the current block based on the determined disparity vector. For example, video decoder 30 may inter-prediction decode the current block as part of inter-view motion prediction, or part of inter-view residual prediction.

In some examples, to select the candidate picture, video decoder 30 may determine whether one or more RAPVC pictures are available (e.g., available in a first or second reference picture list). Video decoder 30 may select the candidate picture from the one or more RAPVC pictures if the one or more RAPVC pictures are available. Video decoder 30 may select the candidate picture from one or more pictures having the lowest temporal identification value in the first or second reference picture list if the one or more RAPVC pictures are not available.

If there is only one RAPVC picture or only one picture having the lowest temporal identification value, video decoder 30 may select that RAPVC picture or that picture having the lowest temporal identification value as the candidate picture. If there are a plurality of RAPVC pictures or a plurality of pictures having the lowest temporal identification value, video decoder 30 may select a RAPVC picture from the plurality of RAPVC pictures or a picture having the lowest temporal identification value from the plurality of pictures having the lowest temporal identification value, as the candidate picture, that is closest in distance based on display or output order to the current picture.

If there are two RAPVC pictures or two pictures having the lowest temporal identification value that are equally distant from the current picture, video decoder 30 may select the RAPVC picture from the two RAPVC pictures or select the picture having the lowest temporal identification value from the two pictures having the lowest temporal identification value based on a position of another candidate picture relative to the current picture. For example, if the other candidate picture is after the current picture in display or output order, video decoder 30 may select the RAPVC picture or the picture having the lowest temporal identification value that is before (or after) the current picture in display or output order as the candidate picture. If the other candidate picture is before the current picture in display or output order, video decoder 30 may select the RAPVC picture or the picture having the lowest temporal identification value that is after (or before) the current picture in display or output order as the candidate picture.

In some examples, video decoder 30 may not rely on the temporal identification value to select the second candidate picture, and may instead select the picture from the reference picture list (e.g., the first or second reference picture list) that is closest to the current picture based on the POC values. If two pictures are equally close, video decoder 30 may select the picture to the left of the current picture as the candidate picture. Alternatively, video decoder 30 may select the picture to the right of the current picture as the candidate picture.

Figure 12:
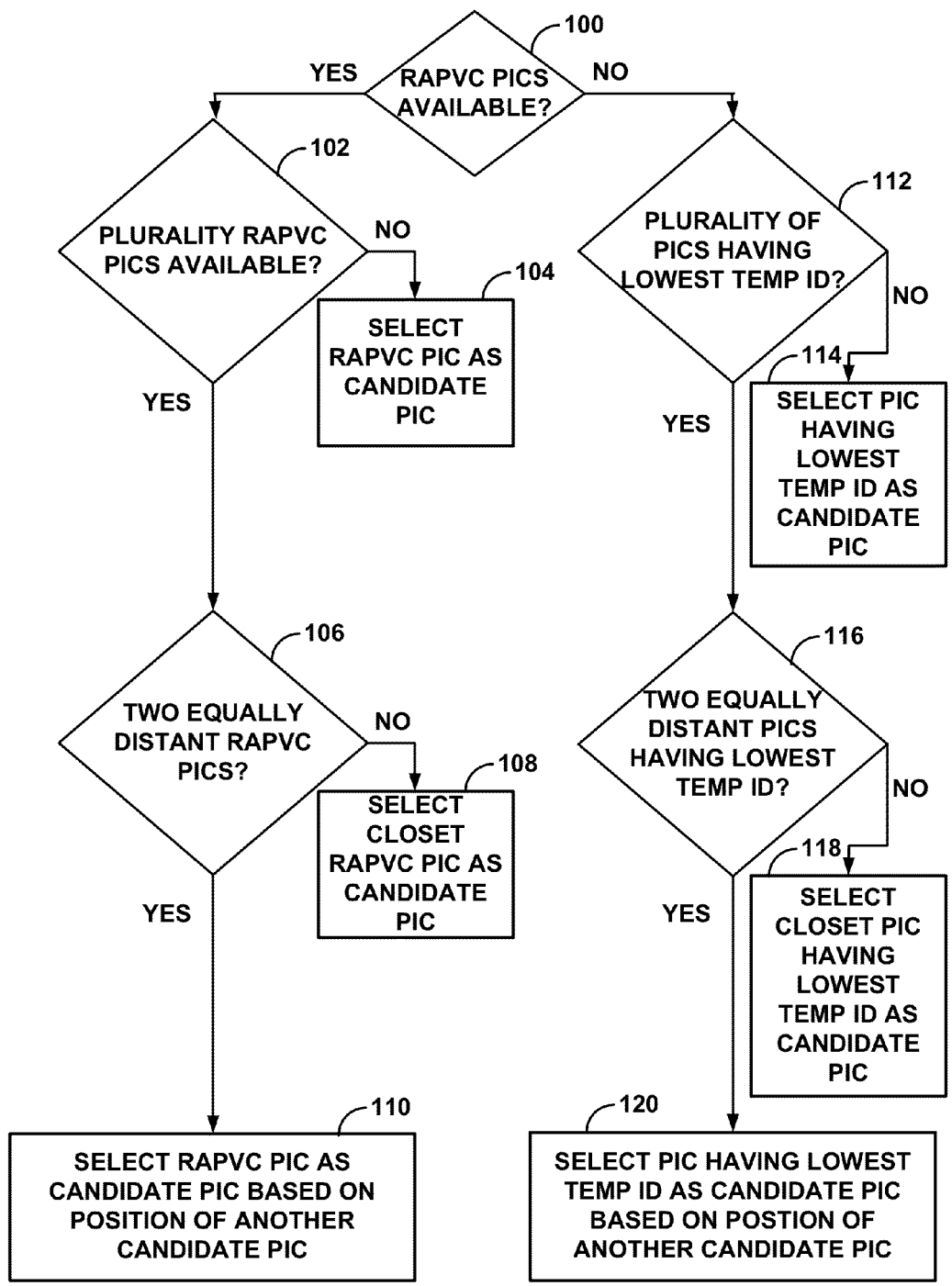
FIG. 12 is a flowchart illustrating an example operation in accordance with one or more example techniques described in this disclosure.

FIG. 12 is a flowchart illustrating an example operation in accordance with one or more example techniques described in this disclosure. The techniques described with respect to FIG. 12 may be implemented by video encoder 20 and/or video decoder 30. For ease of description, the term video coder is used to generically refer to video encoder 20 and video decoder 30. For example, the video coder may be configured to apply a neighboring block based disparity vector (NBDV) generation process for multiview video. In these examples, the term code or coding may refer to encode or encoding, when being performed by video encoder 20, or may refer to decode or decoding, when being performed by video decoder 30.

The video coder may determine whether one or more RAPVC pictures are available (100). For example, the video coder may determine whether RAPVC pictures are available in the DPB, in the RPS, among pictures in the RPS that can be used to inter-predict the current picture, or among pictures in reference picture lists (RefPicList0 and/or RefPicList1) (e.g., in a reference picture list other than the reference picture list that includes the first candidate picture, in the same reference picture list that includes the first candidate picture, or in both reference picture lists).

If one or more RAPVC pictures are available (YES of 100), the video coder may determine whether there are a plurality of RAPVC pictures that are available (102). If only one RAPVC picture is available (NO of 102), the video coder may select that RAPVC as a candidate picture. If there are a plurality of RAPVC pictures that are available (YES of 102), the video coder may determine whether there are two RAPVC pictures that are equally distant from the current picture (106). If there are not two RAPVC pictures that are equally distant from the current picture (NO of 106), the video coder may select the RAPVC picture that is closest to the current picture as a candidate picture (108). If there are two RAPVC pictures that are equally distant from the current picture (YES of 106), the video coder may select the RAPVC picture as the candidate picture based on the position of another candidate picture (e.g., the co-located picture used for TMVP as part of AMVP or merge/skip mode) to the current picture (110).

If one or more RAPVC pictures are not available (NO of 100), the video coder may determine whether there are a plurality of pictures having the lowest temporal identification value (e.g., in a first or second reference picture list) (112). If there is only one picture having the lowest temporal identification value (NO of 112), the video coder may select that picture having the lowest temporal identification value as a candidate picture. If there are a plurality of pictures having the lowest temporal identification value (YES of 112), the video coder may determine whether there are two pictures having the lowest temporal identification value that are equally distant from the current picture (116). If there are not two pictures having the lowest temporal identification value that are equally distant from the current picture (NO of 116), the video coder may select the picture having the lowest temporal identification value that is closest to the current picture as a candidate picture (118). If there are two pictures having the lowest temporal identification value that are equally distant from the current picture (YES of 116), the video coder may select the picture having the lowest temporal identification value as the candidate picture based on the position of another candidate picture (e.g., the co-located picture used for TMVP as part of AMVP or merge/skip mode) to the current picture (120).

In some examples, the video coder may not rely on the temporal identification value to select the second candidate picture, and may instead select the picture from the reference picture list that is closest to the current picture based on the POC values. If two pictures are equally close, the video coder may select the picture to the left of the current picture as the candidate picture. Alternatively, the video coder may select the picture to the right of the current picture as the candidate picture.

Once the video coder selects a candidate picture, the video coder may determine whether a block in the selected candidate picture is inter-predicted with a disparity motion vector. The video coder may determine a disparity vector for the current block, as part of the NBDV generation, based on the disparity motion vector if the block in the selected candidate picture is inter-predicted with the disparity motion vector.

The video coder may inter-prediction code the current block based on the determined disparity vector. In examples where the video coder is video encoder 20, video encoder 20 may inter-prediction encode the current block based on the determined disparity vector. In examples where the video coder is video decoder 30, video decoder 30 may inter-prediction decode the current block based on the determined disparity vector.

Figure 13:
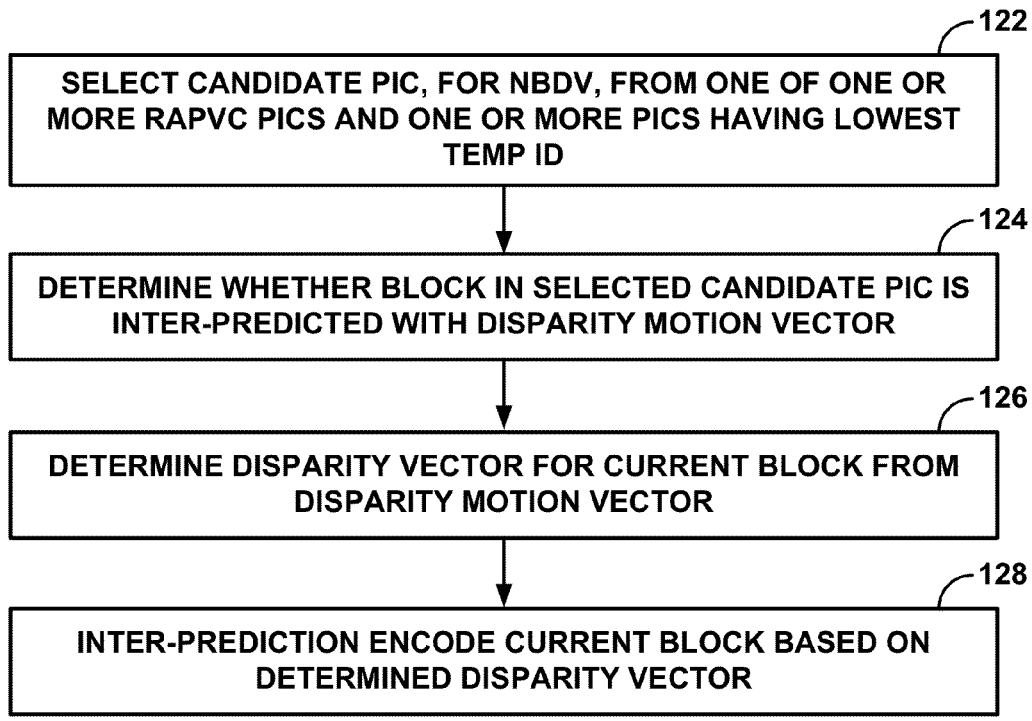
FIG. 13 is a flowchart illustrating an example operation of a video encoder in accordance with one or more example techniques described in this disclosure.

FIG. 13 is a flowchart illustrating an example operation of a video encoder in accordance with one or more example techniques described in this disclosure. For purposes of illustration, the techniques described with respect to video encoder 20. For example, FIG. 13 illustrates an example for encoding a bitstream that includes multiview video data that includes multiple views. In these examples, video encoder 20 may apply a neighboring block based disparity vector (NBDV) generation process for purposes of deriving a disparity vector for a current block of a current picture. The NBDV generation process relies on motion vectors of neighboring blocks for deriving the disparity vector for the current block of the current picture relative to another view of the multiview video data.

To apply the NBDV generation process, video encoder 20 may select a candidate picture to determine if a block in the candidate picture is inter-view predicted with a block in a view other than a view that includes the candidate picture of the multiview video data. The candidate picture is from one of one or more RAPVC pictures or one or more pictures having a lowest temporal identification value (122). For example, video encoder 20 may implement the example technique illustrated in FIG. 12 to select the candidate picture.

Video encoder 20 may determine whether a video block in the selected candidate picture is inter-predicted with a disparity motion vector (124). The disparity motion vector refers to the block in the view other than the view that includes the selected candidate picture of the multiview video data. Video encoder 20 may determine the disparity vector for a current block of a current picture, as part of the NBDV generation, based on the disparity motion vector if the video block in the selected candidate picture of the multiview video data is inter-predicted with the disparity motion vector (126). Video encoder 20 may inter-prediction encode the current block based on the determined disparity vector (128).

Figure 14:
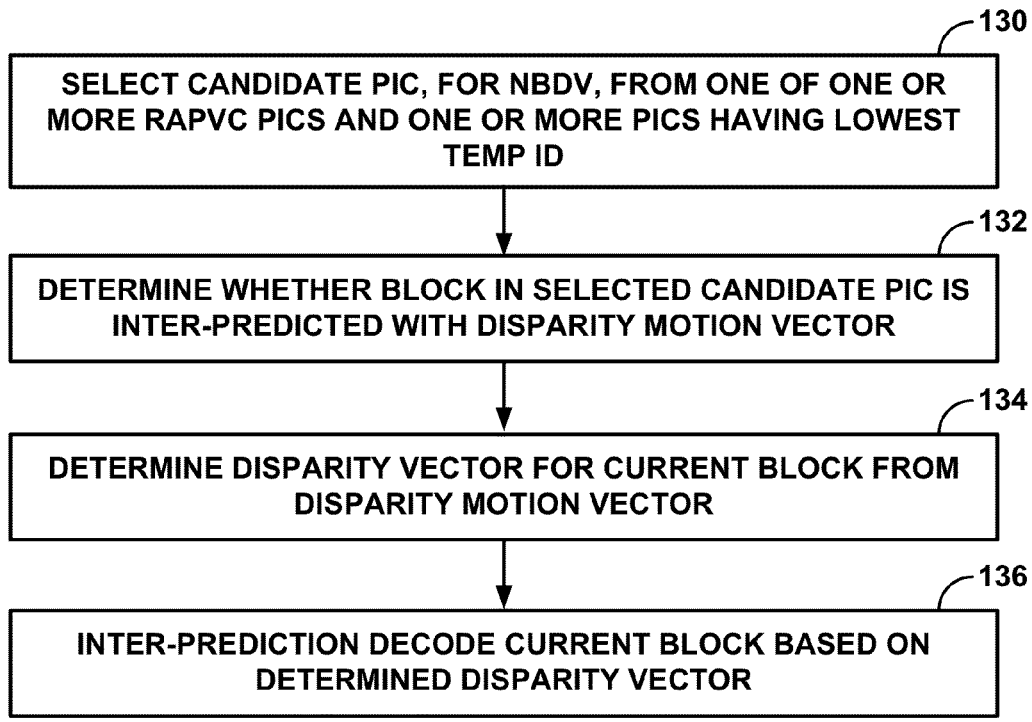
FIG. 14 is a flowchart illustrating an example operation of a video decoder in accordance with one or more example techniques described in this disclosure.

FIG. 14 is a flowchart illustrating an example operation of a video decoder in accordance with one or more example techniques described in this disclosure. For purposes of illustration, the techniques described with respect to video decoder 30. For example, FIG. 14 illustrates an example for decoding a bitstream that includes multiview video data that includes multiple views. In these examples, video decoder 30 may apply a neighboring block based disparity vector (NBDV) generation process for purposes of deriving a disparity vector for a current block of a current picture. The NBDV generation process relies on motion vectors of neighboring blocks for deriving the disparity vector for the current block of the current picture relative to another view of the multiview video data.

To apply the NBDV generation process, video decoder 30 may select a candidate picture to determine if a block in the candidate picture is inter-view predicted with a block in a view other than a view that includes the candidate picture of the multiview video data. The candidate picture is from one of one or more RAPVC pictures or one or more pictures having a lowest temporal identification value (130). For example, video decoder 30 may implement the example technique illustrated in FIG. 12 to select the candidate picture.

Video decoder 30 may determine whether a video block in the selected candidate picture is inter-predicted with a disparity motion vector (132). The disparity motion vector refers to the block in the view other than the view that includes the selected candidate picture of the multiview video data. Video decoder 30 may determine a disparity vector for a current block of a current picture, as part of the NBDV generation, based on the disparity motion vector if the video block in the selected candidate picture is inter-predicted with the disparity motion vector (134). Video decoder 30 may inter-prediction decode the current block based on the determined disparity vector (136).

In some examples, the techniques may be for coding a current picture in a first view which depends on at least one of a set of reference views of bitstream that includes coded picture from multiview views. In this example, the techniques, being performed by video encoder 20 or video decoder 30, may apply a neighboring block based disparity vector (NBDV) generation process for purposes of deriving a disparity vector for a current block of the current picture, wherein the NBDV generation process relies on motion vectors of both spatial neighboring blocks and temporal neighboring blocks for deriving the disparity vector for the current block of the current picture relative to at least one of the set of reference views. The NBDV generation process further comprises determining one or more candidate pictures including the temporal neighboring blocks, wherein selecting at least a first candidate picture from a group of pictures to determine if a temporal neighboring block in the candidate picture contains a disparity motion vector that refers to an inter-view reference picture belonging to one of the set of reference views based on the properties of each of the picture of the group of pictures, wherein the properties further consisting at least one of the following: whether the picture is a random access picture, the temporal level of the picture, and the display order of the picture.

The techniques may also include determining whether a neighboring block contains a disparity motion vector that refers to an inter-view reference picture belonging to one of the set of reference views, and determining the disparity vector for a current block of a current picture, as part of the NBDV generation, based on the disparity motion vector if at least one neighboring block contains a disparity motion vector. In some examples, if a picture which is a random access picture is chosen to be the first candidate picture and if no picture is a random access picture, a picture with the lowest temporal level is chosen to be the first candidate picture. In some examples, if two pictures are both random access pictures or with lowest temporal level values and are being considered to be chosen to be the first candidate picture, the one with a smaller picture order count distance to the current picture is chosen.

In some examples, the group of pictures can be the pictures of the same view in DPB, or the pictures in a union of reference picture subsets of the current picture or the pictures in the reference picture lists of the current picture. In some examples, the temporal neighboring blocks only to up to two candidate pictures in the first view, and the two pictures include the first candidate picture. The second candidate picture comprises a co-located picture used for determining a temporal motion vector predictor (TMVP) as part of advanced motion vector prediction (AMVP) mode or merge/skip mode.

In some examples, the techniques, being implemented by video encoder 20 and video decoder 30, include determining whether at least one block in the one of the candidate pictures is inter-predicted with a disparity motion vector, and if none of the blocks in the one of the candidate pictures is not inter-predicted with the disparity motion vector, determining whether at least one block the other picture of the candidate pictures is inter-predicted with a disparity motion vector.

In some examples, determining a disparity vector may include checking implicit disparity vectors from the spatial neighboring blocks without checking the implicit disparity vectors from temporal neighboring blocks. In some examples, no implicit disparity vectors need to be stored with any picture in the DPB.

The following disclosure describes some example ways in which to implement the example techniques described in this disclosure. The following is meant to assist with understanding and should not be considered limiting.

As described above, video encoder 20 and video decoder 30 may evaluate blocks in the selected candidate pictures to determine whether any of these blocks are inter-predicted with a disparity motion vector. The following pseudo code provides one example manner in which to evaluate blocks in the selected candidate pictures.

Four corners and the center index of a CPU, denoted as 5BlockCPU.

```
for(i=0;i<5;i++){
    if(5BlockCPU[i] contains a disparity motion vector dmv)
    {
        the disparity vector is set to dmv
        return ;
    }
}
Four corners and the center index of a CLCU, denoted as 5BlockCLCU.
for(i=0;i<5;i++){
    if(5BlockCLCU[i] contains a disparity motion vector dmv )
    {
        the disparity vector is set to dmv
        return ;
    }
}
```

The following pseudo code is directed for the example illustrated in FIG. 9. In some examples, the checking order can be varied with a coding condition (e.g., a view ID). Also, in this example, video encoder 20 and video decoder 30 may evaluate only blocks within the CPU.

```
If (the center block, i.e., pos. A shown in FIG. 9, contains a
disparity motion vector dmv)
{
    the disparity vector is set to dmv
    return ;
}
    If (the bottom right block, i.e., pos. B shown in FIG. 9,
contains a disparity motion vector dmv)
{
    the disparity vector is set to dmv
    return ;
}
```

The following describes example implementations for the IDV of the current view component. If the a block of the five spatially neighboring blocks (FIG. 6) contains an implicit disparity vector and it is coded as the skip mode, video encoder 20 and video decoder 30 may return the implicit disparity vector as the final disparity vector for the current block.

The blocks of these five positions (FIG. 6) are denoted as 5BlocksIDV, and, idmv_flag[i] remarks existence of an IDV for each block position. If a position contains an IDV, the flag is signaled to true. Otherwise, it is false.

The following pseudo code applies to search out the disparity vector, done jointly together with the SDV process in FIG. 6. The order may be same as that of FIG. 6 or different.

```
for (i = 0; i<5; i++)
    if ( idmv_flag[i]) {
```

```
        the disparity vector is set equal to the implicit disparity
vector of 5BlocksIDV[i]
            return;
        }
```

In some examples, the checking of five implicit disparity vectors may be same as above. However, the checking of the five implicit disparity vectors is invoked right after the checking of disparity motion vectors in the spatial neighboring blocks and before checking of the disparity motion vectors in the candidate list of pictures. Alternatively, the checking of the five IDVs in the spatial neighboring blocks may be invoked after all the checking of disparity motion vectors in the spatial neighboring blocks and the blocks in the candidate pictures identified in the candidate list of pictures.

In some examples, the techniques may be similar to the above example, however, video encoder 20 and video decoder 30 may check for the implicit disparity vectors in the spatial neighboring blocks jointly with the checking of the disparity motion vectors in the spatial neighboring blocks.

The blocks of these five positions are denoted as 5Spatial-Blocks, and, idmv_flag[i] remarks existence of an IDV for each block position. If a position contains an IDV, the flag is signaled to true. Otherwise, it is false.

The following pseudo code applies to search out the disparity vector, done jointly together with the SDV process in FIG. 6.

```
for (i = 0; i<5; i++) {
    if (5SpatialBlocks [i] contains a disparity motion vector dmv) {
        the disparity vector is set equal to the dmv
        return;
    }
    else if ( idmv_flag[i]) {
        the disparity vector is set to the implicit disparity vector of
5SpatialBlocks [i]
        return;
    }
}
```

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding a bitstream that includes multi-view video data that includes multiple views, the method comprising:
   applying a neighboring block based disparity vector (NBDV) generation process for purposes of deriving a disparity vector for a current block of a current picture of the video data, wherein the NBDV generation process relies on motion vectors of neighboring blocks for deriving the disparity vector for the current block of the current picture relative to another view of the multiview video data,
   wherein applying the NBDV generation process comprises:
      determining whether one or more random access point view component (RAPVC) pictures are available;
      selecting a candidate picture from the one or more RAPVC pictures based on the determination that at least one of the RAPVC pictures is available, or
      selecting the candidate picture from one or more pictures having a lowest temporal identification value based on the determination that no RAPVC picture is available;
      determining whether a video block in the selected candidate picture is inter-predicted with a disparity motion vector, wherein the disparity motion vector refers to a block in a view other than a view that includes the selected candidate picture of the multiview video data; and
      determining the disparity vector for the current block of the current picture, as part of the NBDV generation, based on the disparity motion vector based on the video block in the selected candidate picture of the multiview video data being inter-predicted with the disparity motion vector; and
   inter-prediction decoding the current block based on the disparity vector.

2. The method of claim 1, wherein the candidate picture comprises a second candidate picture, the method further comprising:
   receiving information indicative of a first candidate picture,
   wherein selecting the candidate picture comprises selecting the second candidate picture different from the first candidate picture, and
   wherein a number of candidate pictures is limited to no more than two candidate pictures including the first candidate picture and the second candidate picture.

3. The method of claim 2, wherein the first candidate picture comprises a co-located picture used for determining a temporal motion vector predictor (TMVP) as part of advanced motion vector prediction (AMVP) mode or merge/skip mode.

4. The method of claim 2, further comprising:
   determining whether a block in the first candidate picture is inter-predicted with a disparity motion vector,
   wherein determining whether the video block in the selected candidate picture is inter-predicted with the disparity motion vector comprises determining whether the video block in the second candidate picture is inter-predicted with the disparity motion vector based on the block in the first candidate picture not being inter-predicted with a disparity motion vector.

5. The method of claim 1, wherein determining whether one or more RAPVC pictures are available comprises determining whether one or more RAPVC pictures are available in a first or second reference picture list.

6. The method of claim 1, wherein selecting the candidate picture from one or more pictures having the lowest temporal identification value comprises:
   based on there being only one picture having the lowest temporal identification value in a first or second reference picture list, selecting that picture having the lowest temporal identification value as the candidate picture; or
   based on there being a plurality of pictures having the lowest temporal identification value in the first or second reference picture list, selecting a picture having the lowest temporal identification from among the plurality of pictures having the lowest temporal identification value, as the candidate picture, that is closest in distance based on display order to the current picture.

7. The method of claim 6, further comprising:
   receiving information indicative of another candidate picture, wherein selecting the candidate picture from the one or more pictures having the lowest temporal identification value comprises:
based on two pictures having the lowest temporal identification value being equally distant to the current picture and being closest in distance to the current picture from among the pictures having the lowest temporal identification value, selecting a picture from between the two pictures having the lowest temporal identification value, as the candidate picture, based on a position of the other candidate picture relative to the current picture.

8. The method of claim 1, wherein selecting the candidate picture from the one or more RAPVC pictures comprises:
based on only one RAPVC picture being available in a first or second reference picture list, selecting that RAPVC picture as the candidate picture; or
based on a plurality of RAPVC pictures being available in the first or second reference picture list, selecting an RAPVC picture from among the plurality of RAPVC pictures, as the candidate picture, that is closest in distance based on display order to the current picture.

9. The method of claim 8, further comprising:
receiving information indicative of another candidate picture,
wherein selecting the candidate picture from the one or more RAPVC pictures comprises:
based on two RAPVC pictures being equally distant to the current picture and being closest in distance to the current picture from among available RAPVC pictures, selecting a RAPVC picture from between the two RAPVC pictures, as the candidate picture, based on a position of the other candidate picture relative to the current picture.

10. The method of claim 1,
wherein selecting the candidate picture from the one or more RAPVC pictures comprises selecting the candidate picture from the one or more RAPVC pictures identified in at least one of a decoded picture buffer (DPB), a reference picture set (RPS), pictures among the RPS that can be used to inter-predict the current picture, and a reference picture list of the current picture and
wherein selecting the candidate picture from the one or more pictures having the lowest temporal identification value comprises selecting the candidate picture from the one or more pictures having the lowest temporal identification value identified in at least one of the DPB, RPS, the pictures among the RPS that can be used to inter-predict the current picture, and the reference picture list of the current picture.

11. The method of claim 1, wherein inter-prediction decoding the current block based on the disparity vector comprises one of:
inter-prediction decoding the current block as part of inter-view motion prediction; or
inter-prediction decoding the current block as part of inter-view residual prediction.

12. The method of claim 1, further comprising:
removing implicit disparity vectors from a decoded picture buffer (DPB) for all blocks that are not in the current picture,
wherein applying the NBDV generation process comprises determining the disparity vector for the current block without considering any of the implicit disparity vectors for blocks that are not in the current picture.

13. A method for encoding multiview video data that includes multiple views in bitstream, the method comprising:
applying a neighboring block based disparity vector (NBDV) generation process for purposes of deriving a disparity vector for a current block of a current picture of the video data, wherein the NBDV generation process relies on motion vectors of neighboring blocks for deriving the disparity vector for the current block of the current picture relative to another view of the multiview video data,
wherein applying the NBDV generation process comprises:
determining whether one or more random access point view component (RAPVC) pictures are available;
selecting a candidate picture from the one or more RAPVC pictures based on the determination that at least one of the RAPVC pictures is available, or
selecting the candidate picture from one or more pictures having a lowest temporal identification value based on the determination that no RAPVC picture is available;
determining whether a video block in the selected candidate picture is inter-predicted with a disparity motion vector, wherein the disparity motion vector refers to a block in a view other than a view that includes the selected candidate picture of the multiview video data; and
determining the disparity vector for the current block of the current picture, as part of the NBDV generation, based on the disparity motion vector based on the video block in the selected candidate picture of the multiview video data being inter-predicted with the disparity motion vector; and
inter-prediction encoding the current block based on the disparity vector.

14. The method of claim 13, wherein the candidate picture comprises a second candidate picture, the method further comprising:
signaling information indicative of a first candidate picture,
wherein selecting the candidate picture comprises selecting the second candidate picture different from the first candidate picture, and
wherein a number of candidate pictures is limited to no more than two candidate pictures including the first candidate picture and the second candidate picture.

15. The method of claim 14, wherein the first candidate picture comprises a co-located picture used for determining a temporal motion vector predictor (TMVP) as part of advanced motion vector prediction (AMVP) mode or merge/skip mode.

16. The method of claim 13, further comprising:
signaling information indicative of another candidate picture,
wherein selecting the candidate picture from the one or more pictures having the lowest temporal identification value comprises:
based on there being only one picture having the lowest temporal identification value in a first or second reference picture list, selecting that picture having the lowest temporal identification value as the candidate picture;
based on there being a plurality of pictures having the lowest temporal identification value in the first or second reference picture list, selecting a picture having the lowest temporal identification from among the plurality of pictures having the lowest temporal identification value, as the candidate picture, that is closest in distance based on display order to the current picture; or based on two pictures having the lowest temporal identification value are equally distant to the current picture and are closest in distance to the current picture from among the pictures having the lowest temporal identification value, selecting a picture from between the two pictures having the lowest temporal identification value, as the candidate picture, based on a position of the other candidate picture relative to the current picture.

17. The method of claim 13, further comprising:
signaling information indicative of another candidate picture,
wherein selecting the candidate picture from the one or more RAPVC pictures comprises:
based on there being only one RAPVC picture that is available in a first or second reference picture list, selecting that RAPVC picture as the candidate picture;
based on a plurality of RAPVC pictures being available in the first or second reference picture list, selecting an RAPVC picture from among the plurality of RAPVC pictures, as the candidate picture, that is closest in distance based on display order to the current picture; or
based on two RAPVC pictures being equally distant to the current picture and being closest in distance to the current picture from among available RAPVC pictures, selecting a RAPVC picture from between the two RAPVC pictures, as the candidate picture, based on a position of the other candidate picture relative to the current picture.

18. The method of claim 13, further comprising:
removing implicit disparity vectors from a decoded picture buffer (DPB) for all blocks that are not in the current picture,
wherein applying the NBDV generation process comprises determining the disparity vector for the current block without considering any of the implicit disparity vectors for blocks that are not in the current picture.

19. A device for coding video data for multiview video, the device comprising:
a memory unit configured to store the video data of a current picture;
a video coder configured to:
apply a neighboring block based disparity vector (NBDV) generation process for purposes of deriving a disparity vector for a current block of the current picture, wherein the NBDV generation process relies on motion vectors of neighboring blocks for deriving the disparity vector for the current block of the current picture relative to another view of the multiview video data,
wherein, to apply the NBDV generation process, the video coder is configured to:
determine whether one or more random access point view component (RAPVC) pictures are available;
select a candidate picture from the one or more RAPVC pictures based on the determination that at least one of the RAPVC pictures is available, or
select the candidate picture from one or more pictures having a lowest temporal identification value based on the determination that no RAPVC picture is available;
determine whether a video block in the selected candidate picture is inter-predicted with a disparity motion vector, wherein the disparity motion vector refers to a block in a view other than a view that includes the selected candidate picture of the multiview video data; and
determine the disparity vector for the current block of the current picture, as part of the NBDV generation, based on the disparity motion vector based on the video block in the selected candidate picture of the multiview video data being inter-predicted with the disparity motion vector, and
wherein the video coder is configured to inter-prediction code the current block based on the disparity vector.

20. The device of claim 19, wherein the candidate picture comprises a second candidate picture, and wherein the video coder is configured to:
code information indicative of a first candidate picture,
wherein, to select the candidate picture, the video coder is configured to select the second candidate picture different from the first candidate picture, and
wherein a number of candidate pictures is limited to no more than two candidate pictures including the first candidate picture and the second candidate picture.

21. The device of claim 20, wherein the first candidate picture comprises a co-located picture used for determining a temporal motion vector predictor (TMVP) as part of advanced motion vector prediction (AMVP) mode or merge/skip mode.

22. The device of claim 20, wherein the video coder is configured to:
determine whether a block in the first candidate picture is inter-predicted with a disparity motion vector,
wherein, to determine whether the video block in the selected candidate picture is inter-predicted with the disparity motion vector, the video coder is configured to determine whether the video block in the second candidate picture is inter-predicted with disparity motion vector based on the block in the first candidate picture not being inter-predicted with a disparity motion vector.

23. The device of claim 19, wherein, to determine whether one or more RAPVC pictures are available, the video coder is configured to determine whether one or more RAPVC pictures in a first or second reference picture list are available.

24. The device of claim 19, wherein the video coder is configured to code information indicative of another candidate picture, and wherein, to select the candidate picture from the one or more pictures having the lowest temporal identification value, the video coder is configured to:
based on there being only one picture having the lowest temporal identification value in a first or second reference picture list, select that picture having the lowest temporal identification value as the candidate picture;
based on there being a plurality of pictures having the lowest temporal identification value, select a picture having the lowest temporal identification from among the plurality of pictures having the lowest temporal identification value, as the candidate picture, that is closest in distance based on display order to the current picture; or
based on two pictures having the lowest temporal identification value being equally distant to the current picture and being closest in distance to the current picture from among the pictures having the lowest temporal identification value, select a picture from between the two pictures having the lowest temporal identification value, as the candidate picture, based on a position of the other candidate picture relative to the current picture.

25. The device of claim 19, wherein the video coder is configured to code information indicative of another candidate picture, and wherein, to select the candidate picture from the one or more RAPVC pictures, the video coder is configured to:
- based on only one RAPVC picture being available, select that RAPVC picture as the candidate picture;
- based on a plurality of RAPVC pictures being available, select an RAPVC picture from among the plurality of RAPVC pictures, as the candidate picture, that is closest in distance based on display order to the current picture; or
- based on two RAPVC pictures being equally distant to the current picture and being closest in distance to the current picture from among available RAPVC pictures, select a RAPVC picture from between the two RAPVC pictures, as the candidate picture, based on a position of the other candidate picture relative to the current picture.

26. The device of claim 19,
wherein, to select the candidate picture from one or more RAPVC pictures, the video coder is configured to select the candidate picture from the one or more RAPVC pictures identified in at least one of a decoded picture buffer (DPB), a reference picture set (RPS), pictures among the RPS that can be used to inter-predict the current picture, and a reference picture list of the current picture, and
wherein, to select the candidate picture from one or more pictures having the lowest temporal identification value, the video coder is configured to select the candidate picture from the one or more pictures having the lowest temporal identification value identified in at least one of the DPB, RPS, the pictures among the RPS that can be used to inter-predict the current picture, and the reference picture list of the current picture.

27. The device of claim 19, wherein the video coder is configured to:
- inter-prediction code the current block as part of inter-view motion prediction; or
- inter-prediction code the current block as part of inter-view residual prediction.

28. The device of claim 19, wherein the video coder is configured to:
- remove implicit disparity vectors from a decoded picture buffer (DPB) for all blocks that are not in the current picture,
- wherein, to apply the NBDV generation process, the video coder is configured to determine the disparity vector for the current block without considering any of the implicit disparity vectors for blocks that are not in the current picture.

29. The device of claim 19, wherein the device comprises at least one of: a microprocessor, an integrated circuit (IC), a wireless communication device, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a video teleconferencing device, and a video streaming device, a camera to capture the current picture, or a display to display the current picture.

30. A non-transitory computer-readable storage medium having instructions stored thereon that when executed by one or more processors of a device for video coding for multiview video cause the one or more processors to:
- apply a neighboring block based disparity vector (NBDV) generation process for purposes of deriving a disparity vector for a current block of a current picture, wherein the NBDV generation process relies on motion vectors of neighboring blocks for deriving the disparity vector for the current block of the current picture relative to another view of the multiview video data,
wherein the instructions that cause the one or more processors to apply the NBDV generation process comprise instructions that cause the one or more processors to:
- determine whether one or more random access point view component (RAPVC) pictures are available;
- select a candidate picture from the one or more RAPVC pictures based on the determination that at least one of the RAPVC pictures is available, or
- select the candidate picture from one or more pictures having a lowest temporal identification value based on the determination that no RAPVC picture is available;
- determine whether a video block in the selected candidate picture is inter-predicted with a disparity motion vector, wherein the disparity motion vector refers to a block in a view other than a view that includes the selected candidate picture of the multiview video data; and
- determine the disparity vector for the current block of the current picture, as part of the NBDV generation, based on the disparity motion vector based on the video block in the selected candidate picture of the multiview video data being inter-predicted with the disparity motion vector, and
wherein the instructions cause the one or more processors to inter-prediction code the current block based on the disparity vector.

31. The non-transitory computer-readable storage medium of claim 30, further comprising instructions that cause the one or more processors to:
- remove implicit disparity vectors from a decoded picture buffer (DPB) for all blocks that are not in the current picture,
- wherein the instructions that cause the one or more processors to apply the NBDV generation process comprise instructions that cause the one or more processors to determine the disparity vector for the current block without considering any of the implicit disparity vectors for blocks that are not in the current picture.

32. A device for coding video data for multiview video, the device comprising:
- means for applying a neighboring block based disparity vector (NBDV) generation process for purposes of deriving a disparity vector for a current block of a current picture, wherein the NBDV generation process relies on motion vectors of neighboring blocks for deriving the disparity vector for the current block of the current picture relative to another view of the multiview video data,
wherein the means for applying the NBDV generation process comprises:
- means for determining whether one or more random access point view component (RAPVC) pictures are available;
- means for selecting a candidate picture from the one or more RAPVC pictures based on the determination that at least one of the RAPVC pictures is available, or
- means for selecting the candidate picture from one or more pictures having a lowest temporal identification value based on the determination that no RAPVC picture is available;
- means for determining whether a video block in the selected candidate picture is inter-predicted with a disparity motion vector, wherein the disparity motion vector refers to a block in a view other than a view that includes the selected candidate picture of the multiview video data; and means for determining the disparity vector for the current block of the current picture, as part of the NBDV generation, based on the disparity motion vector based on the video block in the selected candidate picture of the multiview video data being inter-predicted with the disparity motion vector, and the device further comprising means for inter-prediction coding the current block based on the disparity vector.

33. The device of claim 32, further comprising:

means for removing implicit disparity vectors from a decoded picture buffer (DPB) for all blocks that are not in the current picture, wherein the means for applying the NBDV generation process comprises means for determining the disparity vector for the current block without considering any of the implicit disparity vectors for blocks that are not in the current picture.

\* \* \* \* \*